(12) United States Patent
Wu et al.

(10) Patent No.: US 11,978,912 B2
(45) Date of Patent: May 7, 2024

(54) ATOMICALLY DISPERSED PLATINUM-GROUP METAL-FREE CATALYSTS AND METHOD FOR SYNTHESIS OF THE SAME

(71) Applicants: The Research Foundation for The State University of New York, Buffalo, NY (US); Giner, Inc., Newton, MA (US)

(72) Inventors: Gang Wu, Clarence Center, NY (US); Hui Xu, Acton, MA (US); Shengwen Liu, Buffalo, NY (US); Shuo Ding, Boston, MA (US)

(73) Assignees: The Research Foundation for the State University of New York, Amherst, NY (US); Giner, Inc., Newton, MA (US)

( * ) Notice: Subject to any disclaimer, the term of this patent is extended or adjusted under 35 U.S.C. 154(b) by 47 days.

(21) Appl. No.: 17/531,461

(22) Filed: Nov. 19, 2021

(65) Prior Publication Data
US 2022/0190356 A1 Jun. 16, 2022

Related U.S. Application Data

(60) Provisional application No. 63/115,963, filed on Nov. 19, 2020.

(51) Int. Cl.
*H01M 4/90* (2006.01)
*H01M 8/10* (2016.01)

(52) U.S. Cl.
CPC ....... *H01M 4/9075* (2013.01); *H01M 4/9016* (2013.01); *H01M 2008/1095* (2013.01)

(58) Field of Classification Search
CPC ............. H01M 4/9075; H01M 4/9016; H01M 2008/1095; B01J 31/1691

(Continued)

(56) References Cited

U.S. PATENT DOCUMENTS 3,282,875 A 11/1966 Connolly et al.
4,470,889 A 9/1984 Ezzell et al.
(Continued)

FOREIGN PATENT DOCUMENTS

AU 2017203318 A1 6/2017
CN 109378482 A 2/2019
(Continued)

OTHER PUBLICATIONS

International Search Report dated Feb. 8, 2022, from PCT Application No. PCT/US21/60195, the corresponding PCT application to the present application.
(Continued)

*Primary Examiner* — Patricia L. Hailey
(74) *Attorney, Agent, or Firm* — KRIEGSMAN & KRIEGSMAN

(57) ABSTRACT

Atomically dispersed platinum-group metal-free catalyst and method for synthesizing the same. According to one embodiment, the catalyst is made by a method in which, in a first step, a metal oxide/zeolitic imidazolate frameworks (ZIF) composite is formed by combining (i) nanoparticles of an oxide of at least one of iron, cobalt, nickel, manganese, and copper, (ii) a hydrated zinc salt, and (iii) an imidazole. Then, in a second step, the metal oxide/ZIF composite is thermally activated, i.e., carbonized, to form an M-N—C catalyst. Thereafter, the M-N—C catalyst may be mixed with a quantity of ammonium chloride, and then the M-N—C/NH$_4$Cl mixture may be pyrolyzed. The foregoing NH$_4$Cl treatment may improve the intrinsic activity of the catalyst. Then, a thin layer of nitrogen-doped carbon may be added to NH$_4$Cl-treated M-N—C catalyst by chemical vapor deposition (CVD). Such CVD treatment may improve the stability of the catalyst.

47 Claims, 55 Drawing Sheets

(58) Field of Classification Search
USPC .......................................................... 502/185
See application file for complete search history.

(56) References Cited

U.S. PATENT DOCUMENTS

| | | | |
|---|---|---|---|
| 4,478,695 | A | 10/1984 | Ezzell et al. |
| 6,492,431 | B1 | 12/2002 | Cisar |
| 9,595,727 | B2 | 3/2017 | Mittelsteadt et al. |
| 9,825,308 | B1 * | 11/2017 | Liu ...................... H01M 4/8657 |
| 10,998,550 | B2 * | 5/2021 | Wang ..................... H01M 4/587 |
| 2015/0340705 | A1 | 11/2015 | Tylus et al. |
| 2017/0232431 | A1 | 8/2017 | Jeong et al. |
| 2017/0279109 | A1 | 9/2017 | Wang |
| 2018/0316009 | A1 | 11/2018 | Park et al. |
| 2019/0020028 | A1 | 1/2019 | Wang et al. |
| 2019/0060888 | A1 | 2/2019 | Liu et al. |
| 2019/0067706 | A1 | 2/2019 | Liu et al. |
| 2019/0152995 | A1 | 5/2019 | Gunasekaran et al. |
| 2019/0386318 | A1 | 12/2019 | Li et al. |
| 2021/0316289 | A1 | 10/2021 | Ma et al. |
| 2022/0416260 | A1 * | 12/2022 | Wu ....................... H01M 4/8882 |
| 2023/0067623 | A1 * | 3/2023 | Stahl ....................... H01M 4/90 |
| 2023/0271840 | A1 | 8/2023 | Wu et al. |

FOREIGN PATENT DOCUMENTS

| | | | | |
|---|---|---|---|---|
| CN | 110302821 | A | | 10/2019 |
| CN | 111403757 | A | | 7/2020 |
| CN | 112005413 | A | * 11/2020 | .............. B01J 27/24 |
| CN | 112310418 | A | | 2/2021 |
| EP | 3597800 | A1 | | 1/2020 |
| WO | WO-2012107838 | A1 | * 8/2012 | .......... H01M 4/8828 |
| WO | 2014105407 | A1 | | 7/2014 |
| WO | WO-2018232054 | A1 | * 12/2018 | .............. C01B 17/00 |
| WO | WO-2021000217 | A1 | * 1/2021 | .............. B01J 27/24 |
| WO | WO-2021118707 | A1 | * 6/2021 | .............. B01J 27/24 |
| WO | 2022015888 | A2 | | 1/2022 |

OTHER PUBLICATIONS

Written Opinion dated Feb. 8, 2022, from PCT Application No. PCT/US21/60195, the corresponding PCT application to the present application.

U.S. Appl. No. 17/464,458, inventors Gang Wu et al., filed Sep. 1, 2021 (available in USPTO's IFW system).

Zhang et al., "Engineering nanostructures of PGM-free oxygen-reduction catalysts using metal-organic frameworks," Nano Energy, 31:331-350 (2017).

Li et al., "Atomically dispersed manganese catalysts for oxygen reduction in proton-exchange membrane fuel cells," Nature Catalysis, 1:935-945 (Oct. 29, 2018).

Yang et al., "Uniform Supported Metal Nanocrystal Catalysts Prepared by Slurry Freeze-Drying," Chem. Mat., 33(1):256-265 (Dec. 24, 2020).

Chen et al., "High-Platinum-Content Catalysts on Atomically Dispersed and Nitrogen Coordinated Single Manganese Site Carbons for Heavy-Duty Fuel Cells," Journal of The Electrochemical Society, 169(3):034510 (Mar. 2022).

Qiao et al., "Atomically dispersed single iron sites for promoting Pt and Pt3Co fuel cell catalysts: performance and durability improvements," Energy Environ. Sci., 14:4948-4960 (Jul. 26, 2021).

Chen et al., "Atomically Dispersed MnN4 Catalysts via Environmentally Benign Aqueous Synthesis for Oxygen Reduction: Mechanistic Understanding of Activity and Stability Improvements," ACS Catalysis, 10(18):10523-10534 (Sep. 3, 2020).

Abstract of Guo et al., "Promoting Atomically Dispersed MnN4 Sites via Sulfur Doping for Oxygen Reduction: Unveiling Intrinsic Activity and Degradation in Fuel Cells," ACS Nano, 15(4):6886-6899 (Mar. 31, 2021).

Abstract of Qiao et al., "3D porous graphitic nanocarbon for enhancing the performance and durability of Pt catalysts: a balance between graphitization and hierarchical porosity," Energy & Environmental Science, 12:2830-2841 (2019).

Abstract of Liu et al., "Chemical Vapor Deposition for Atomically Dispersed and Nitrogen Coordinated Single Metal Site Catalysts," Angewandte Chemie International Edition, 59(48):21698-21705 (Aug. 21, 2020).

* cited by examiner

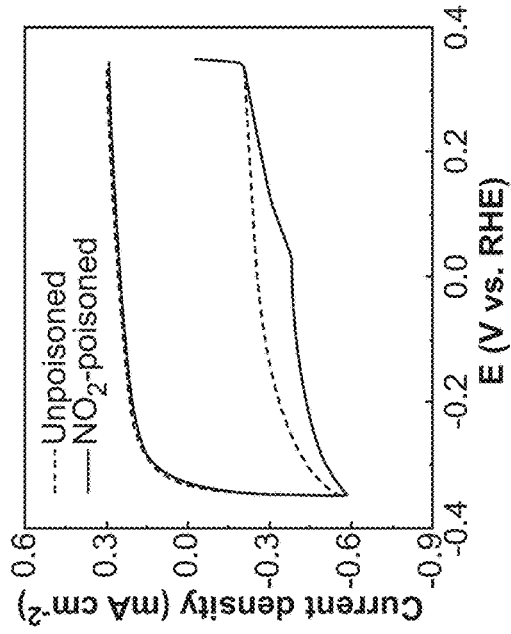
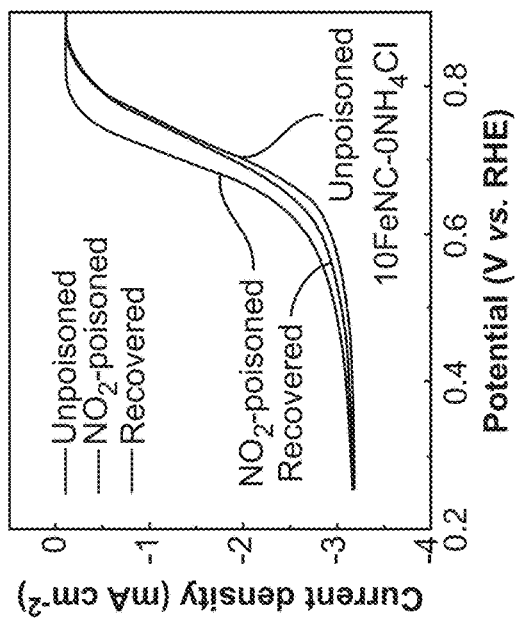
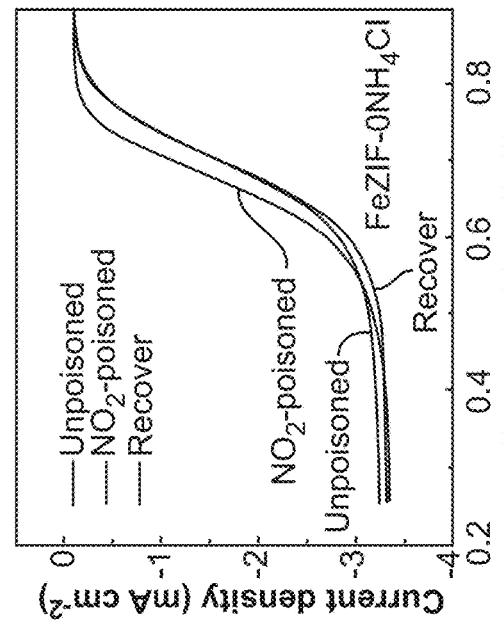
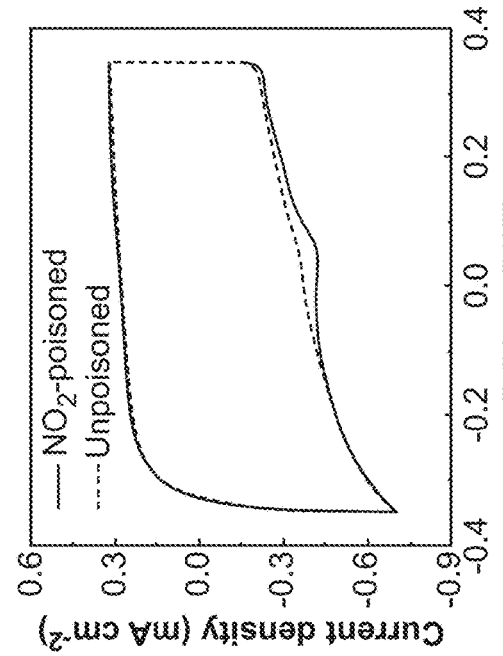

| Scattering paths | CN | R (Å) | $E_0$ (eV) | $\sigma^2$ (Å$^2$) | R-facotr |
|---|---|---|---|---|---|
| Fe-N | 4 | 1.93(1) | -5(1) | 0.0078(9) | 0.018 |
| Fe-C | 8 | 2.96(1) | | 0.0078(1) | |
| Fe-N-C | 16 | 3.13(2) | | 0.0040(6) | |
| Fe-N | 4 | 3.37(2) | | 0.0065(8) | |
| Fe-N-N | 16 | 3.86(2) | | 0.0008(7) | |
| Fe-N-N | 4 | 3.86(2) | | 0.0008(7) | |
| Fe-C | 6 | 4.19(2) | | 0.0184(6) | |
| Fe-N-C | 12 | 4.22(2) | | 0.0107(2) | |

FIG. 9

| Scattering paths | CN | R (Å) | $E_0$ (eV) | $\sigma^2$ (Å$^2$) | R-factor |
|---|---|---|---|---|---|
| Fe-N | 4.2(0.9) | 2.02(2) | 0.5(1) | 0.0082(8) | 0.038 |
| Fe-C | 9.1(1.7) | 3.04(7) | | 0.0197(6) | |
| Fe-N-C | 18.2(3.5) | 3.26(7) | | 0.0132(9) | |

FIG. 10

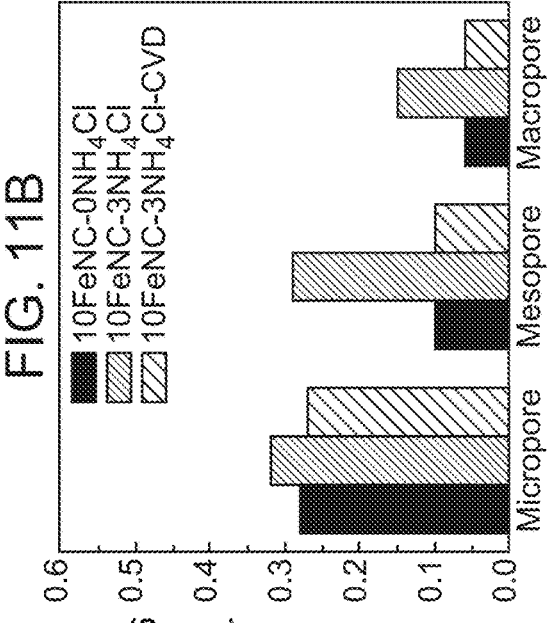
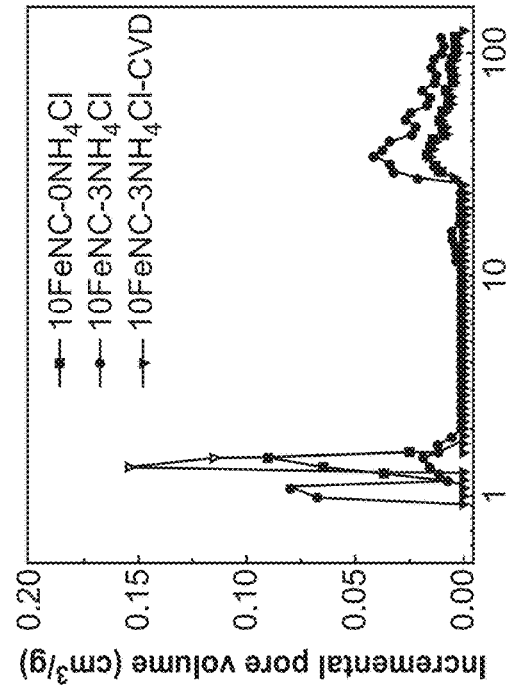
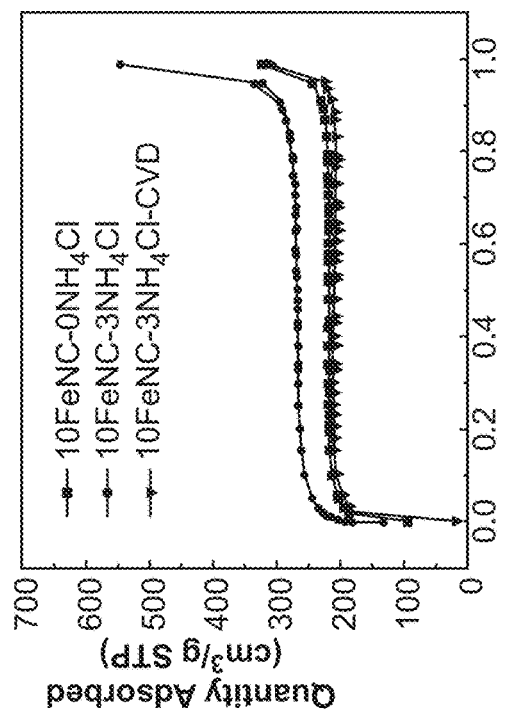
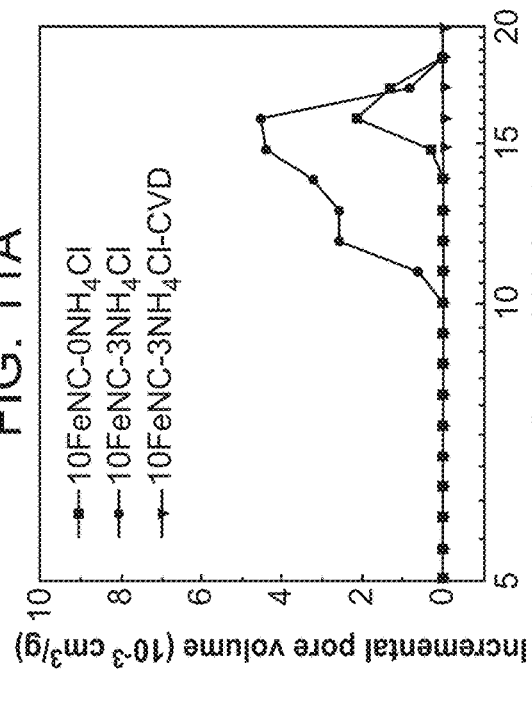

| Sample | $V_{micro}$ | | $V_{meso}$ | | $V_{macro}$ | | $V_{total}$ | $S_{BET}$ |
|---|---|---|---|---|---|---|---|---|
| | cm$^3$g$^{-1}$ | % | cm$^3$g$^{-1}$ | % | cm$^3$g$^{-1}$ | % | cm$^3$g$^{-1}$ | m$^2$g$^{-1}$ |
| 10FeNC-0NH$_4$Cl | 0.28 | 63.64 | 0.10 | 22.73 | 0.06 | 13.64 | 0.44 | 684.2 |
| 10FeNC-3NH$_4$Cl | 0.32 | 42.11 | 0.29 | 38.16 | 0.15 | 19.74 | 0.76 | 809.1 |
| 10FeNC-3NH$_4$Cl-CVD | 0.27 | 62.79 | 0.10 | 23.26 | 0.06 | 13.95 | 0.43 | 668.6 |

FIG. 12

| Sample | C(at%) | N(at%) | O(at%) | Fe(at%) |
|---|---|---|---|---|
| 10FeNC-0NH₄Cl | 93.2 | 4.1 | 2.2 | 0.5 |
| 10FeNC-3NH₄Cl | 94.2 | 3.2 | 2.0 | 0.6 |
| 10FeNC-3NH₄Cl-CVD | 92.9 | 4.0 | 2.7 | 0.4 |

FIG. 20

| Sample | Graphitic N (%) | Pyridinic N (%) | FeN$_4$, Nitriles (%) | Oxidized N (%) |
|---|---|---|---|---|
| 10FeNC-0NH$_4$Cl | 0.17 | 0.09 | 0.05 | 0.09 |
| 10FeNC-3NH$_4$Cl | 0.11 | 0.07 | 0.06 | 0.06 |
| 10FeNC-3NH$_4$Cl-CVD | 0.19 | 0.11 | 0.04 | 0.06 |

FIG. 21

| Sample | Graphitic N (%) | Pyridinic N (%) | FeN$_4$, Nitriles (%) | Oxidized N (%) |
|---|---|---|---|---|
| 10FeNC-0NH$_4$Cl | 0.17 | 0.09 | 0.05 | 0.09 |
| 10FeNC-3NH$_4$Cl | 0.11 | 0.07 | 0.06 | 0.06 |
| 10FeNC-3NH$_4$Cl-CVD | 0.19 | 0.11 | 0.04 | 0.06 |

FIG. 22

| Sample | C(at%) | N(at%) | O(at%) | Fe(at%) |
|---|---|---|---|---|
| 10FeNC-0NH₄Cl | 93.2 | 4.1 | 2.2 | 0.5 |
| 10FeNC-1NH₄Cl | 93.5 | 3.4 | 2.7 | 0.4 |
| 10FeNC-3NH₄Cl | 94.2 | 3.2 | 2.0 | 0.6 |
| 10FeNC-6NH₄Cl | 93.2 | 2.8 | 3.5 | 0.5 |

FIG. 24

| Sample | C(at%) | N(at%) | O(at%) | Fe(at%) |
|---|---|---|---|---|
| 10FeNC-0NH₄Cl | 93.2 | 4.1 | 2.2 | 0.5 |
| 10FeNC-1NH₄Cl | 93.5 | 3.4 | 2.7 | 0.4 |
| 10FeNC-3NH₄Cl | 94.2 | 3.2 | 2.0 | 0.6 |
| 10FeNC-6NH₄Cl | 93.2 | 2.8 | 3.5 | 0.5 |

FIG. 25

| Sample | C(at%) | N(at%) | O(at%) | Fe(at%) |
|---|---|---|---|---|
| 10FeNC-0NH₄Cl | 93.2 | 4.1 | 2.2 | 0.5 |
| 10FeNC-1NH₄Cl | 93.5 | 3.4 | 2.7 | 0.4 |
| 10FeNC-3NH₄Cl | 94.2 | 3.2 | 2.0 | 0.6 |
| 10FeNC-6NH₄Cl | 93.2 | 2.8 | 3.5 | 0.5 |

FIG. 26

| Sample | $V_{micro}$ | | $V_{meso}$ | | $V_{macro}$ | | $V_{total}$ | $S_{BET}$ |
| --- | --- | --- | --- | --- | --- | --- | --- | --- |
| | cm³g⁻¹ | % | cm³g⁻¹ | % | cm³g⁻¹ | % | cm³g⁻¹ | m²g⁻¹ |
| 10FeNC-0NH₄Cl | 0.28 | 63.64 | 0.10 | 22.73 | 0.06 | 13.64 | 0.44 | 684.2 |
| 10FeNC-1NH₄Cl | 0.31 | 44.93 | 0.24 | 34.78 | 0.14 | 20.29 | 0.69 | 777.8 |
| 10FeNC-3NH₄Cl | 0.32 | 42.11 | 0.29 | 38.16 | 0.15 | 19.74 | 0.76 | 809.1 |
| 10FeNC-6NH₄Cl | 0.39 | 45.88 | 0.31 | 36.47 | 0.15 | 17.65 | 0.85 | 941.1 |

FIG. 28

| Catalyst | Pyrolysis temperature (°C) | Half-wave potential/V vs. (RHE) | Electrolyte disk rotation rate/rpm | Fuel cell performance | |
|---|---|---|---|---|---|
| | | | | Current density @0.9 V /mA $H_2$-$O_2$ | Current density @0.8 V /mA $H_2$-air |
| 10FeNC-3NH$_4$Cl | 1100 | 0.915 | 0.5 M $H_2SO_4$, 900 | 44.2 | 151 |
| 0.17CVD/Fe-N-C-kat | 1000 | 0.835 | 0.5 M $H_2SO_4$, 900 | 27 | 105 |
| (CM+PANI) Fe-C | 900 | 0.80 | 0.5 M $H_2SO_4$, 900 | 16 | 75 |
| Zn(eIm)$_2$TPIP | 900 | 0.78 | 0.1 M $HClO_4$, 1600 | - | - |
| Fe-PAN-EN hydrogel | 900 | 0.83 | 0.5 M $H_2SO_4$, 900 | - | - |
| 1.5Fe-ZIF | 1100 | 0.88 | 0.5 M $H_2SO_4$, 900 | 18 | 68 |
| TPI@Z8(SiO$_2$)-650-C | 650/1000 | 0.823 | 0.5 M $H_2SO_4$, 1600 | 22 | 105 |
| Fe/TPTZ/ZIF-8 | - | - | - | 4 | 96 |
| ZIF-NC-0.5Fe-700 | 1100/700 | 0.84 | 0.5 M $H_2SO_4$, 900 | 30 | 78 |
| FeN$_x$/GM | 900 | 0.80 | 0.5 M $H_2SO_4$, 900 | 13 | 70 |
| FeCl$_2$-/NC-1000 | 1000 | 0.80 | 0.1 M $HClO_4$, 1600 | 15 | 37 |

FIG. 30

| Sample | C(at%) | N(at%) | O(at%) | Fe(at%) |
|---|---|---|---|---|
| 5FeNC-3NH₄Cl | 93.7 | 3.4 | 2.3 | 0.6 |
| 10FeNC-3NH₄Cl | 94.2 | 3.2 | 2.0 | 0.6 |
| 20FeNC-3NH₄Cl | 93.6 | 3.0 | 2.7 | 0.7 |

FIG. 41

| Sample | Graphitic N(%) | Pyridinic N(%) | FeN$_4$, Nitriles (%) | Oxidized N (%) |
|---|---|---|---|---|
| 5FeNC-3NH$_4$Cl | 37.0 | 20.3 | 15.2 | 27.5 |
| 10FeNC-3NH$_4$Cl | 38.0 | 20.7 | 20.4 | 20.9 |
| 20FeNC-3NH$_4$Cl | 39.3 | 16.1 | 15.8 | 28.9 |

FIG. 42

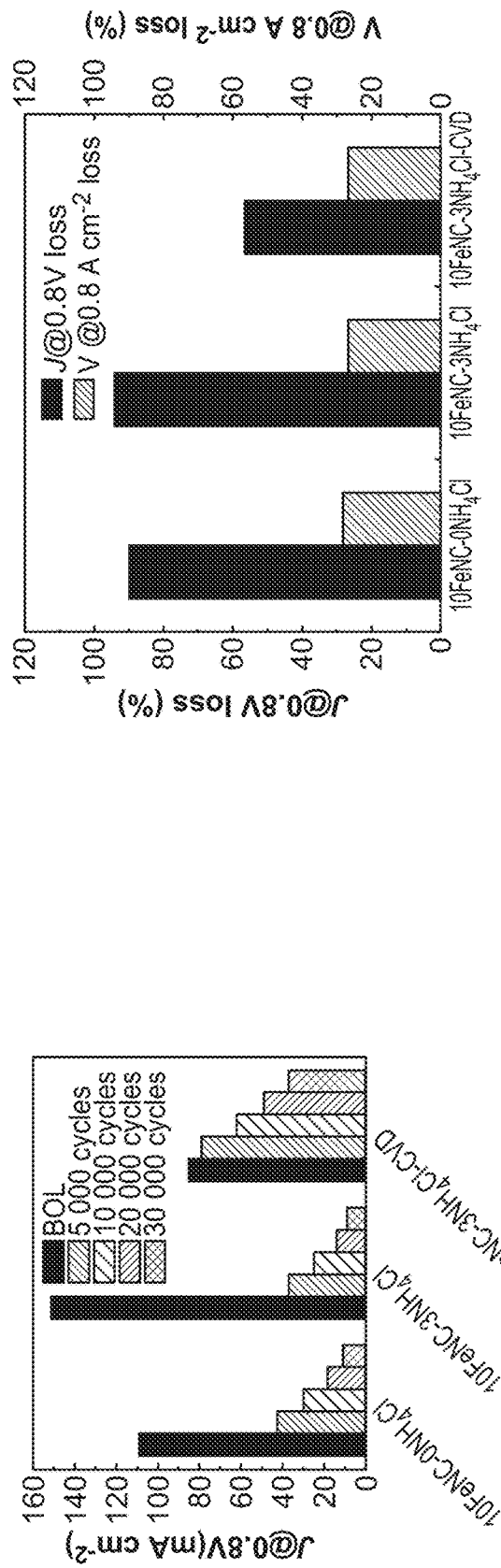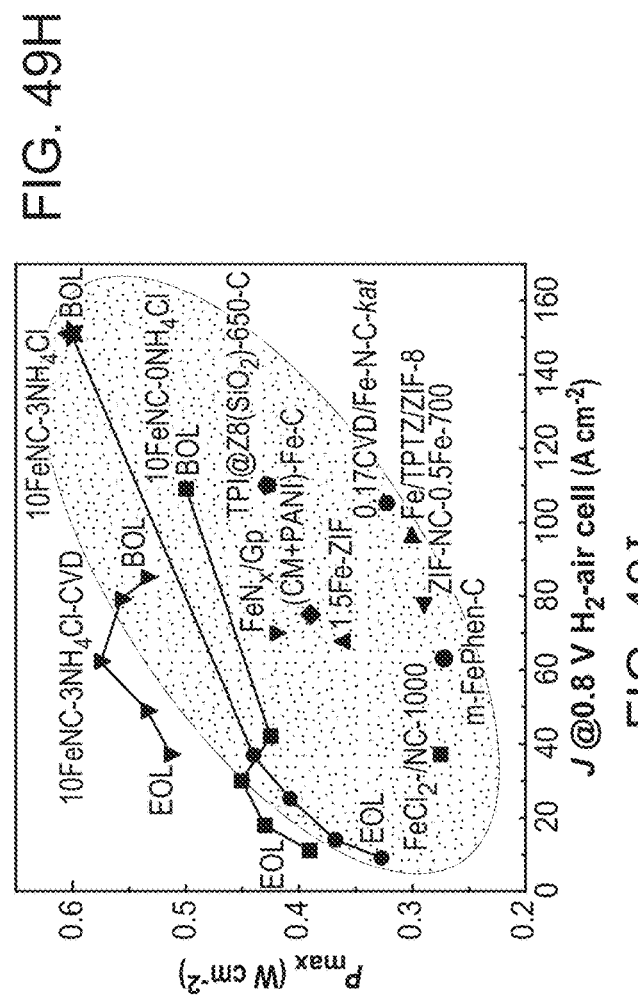
FIG. 49H
FIG. 49I
FIG. 49G

| Cycles | 10FeNC-0NH₄Cl | | 10FeNC-3NH₄Cl | | 10FeNC-3NH₄Cl-CVD | |
|---|---|---|---|---|---|---|
| | Current density (mA cm⁻²) | Peak power density (mW cm⁻²) | Current density (mA cm⁻²) | Peak power density (mW cm⁻²) | Current density (mA cm⁻²) | Peak power density (mW cm⁻²) |
| BOL | 109 | 500 | 151 | 601 | 85 | 535 |
| 5 000 | 42 | 425 | 37 | 440 | 79 | 557 |
| 10 000 | 30 | 450 | 25 | 408 | 62 | 575 |
| 20 000 | 18 | 430 | 14 | 368 | 49 | 535 |
| 30 000 | 11 | 390 | 9 | 327 | 37 | 514 |

FIG. 53

ATOMICALLY DISPERSED PLATINUM-GROUP METAL-FREE CATALYSTS AND METHOD FOR SYNTHESIS OF THE SAME

CROSS-REFERENCE TO RELATED APPLICATIONS

The present application claims the benefit under 35 U.S.C. 119(e) of U.S. Provisional Patent Application No. 63/115,963, inventors Gang Wu et al., filed Nov. 19, 2020, the disclosure of which is incorporated herein by reference in its entirety.

FEDERALLY SPONSORED RESEARCH OR DEVELOPMENT

This invention was made with government support under grant numbers DE-EE0008075, DE-EE0008076, and DE-EE0008417 awarded by the Department of Energy. The government has certain rights in the invention.

BACKGROUND OF THE INVENTION

The present invention relates generally to catalysts suitable for catalyzing the oxygen reduction reaction in proton-exchange membrane fuel cells and relates more particularly to catalysts of the aforementioned type that are platinum-group metal (PGM)-free and also to a method for the synthesis of such catalysts.

Fuel cells, particularly proton exchange membrane (PEM) fuel cells, represent a promising sustainable and clean energy conversion technology for a number of different applications including, but not limited to, the field of transportation. In a PEM fuel cell, the chemical energy of a fuel, typically hydrogen, and of an oxidizing agent, typically oxygen, is converted into electricity through a pair of redox reactions. Where oxygen is used as the oxidizing agent, the redox reaction involving oxygen is often referred to as the oxygen reduction reaction and typically results in the reduction of oxygen to water. As can be appreciated, the oxygen reduction reaction represents a critical process in the operation of a PEM fuel cell and requires an effective and durable catalyst to attain efficient energy conversion. Typically, platinum-group metals (i.e., platinum and five other noble, precious metal elements clustered with platinum in the periodic table) have been used as such a catalyst, and such metals have shown promising performance and durability in real applications. Unfortunately, however, the high cost and scarcity of platinum-group metals have limited their large-scale deployment in PEM fuel cells and have driven efforts to find to platinum-group metal (PGM)-free catalysts for PEM fuel cells.

One approach to developing a platinum-group metal (PGM)-free catalyst involves using earth-abundant elements and, more specifically, involves forming atomically dispersed metal single sites coordinated with nitrogen (typically as $N_4$) and embedded within a carbon matrix to create metal-nitrogen-carbon (M-N—C) catalysts. In these catalysts, the atomic $MN_4$ moieties, which are generally dispersed and embedded in micropores of the carbon matrix, are identified as oxygen reduction reaction active sites, as evidenced by advanced spectroscopic characterizations and first-principles calculations. Typically, the metal in such M-N—C catalysts is a first row transition metal, such as iron, nickel, manganese, cobalt, or copper. Many such M-N—C catalysts, particularly Fe—N—C, have shown considerable promise for use in the oxygen reduction reaction in acidic media.

In general, the production of M-N—C catalysts includes two stages, namely, the synthesis of a catalyst precursor and, then, the high temperature treatment or carbonization of the catalyst precursor to form active sites to be occupied by $MN_4$ moieties. See, for example, Zhang et al., "Engineering nanostructures of PGM-free oxygen-reduction catalysts using metal-organic frameworks," Nano Energy, 31:331-350 (2017), which is incorporated herein by reference. Current M-N—C catalysts are derived from zinc-based zeolitic imidazolate frameworks (ZIFs), a subfamily of metal-organic frameworks (MOFs). An example of a ZIF is 2-methylimidazole zinc salt (ZIF-8), which is typically in crystal form. ZIF-8-derived carbon materials synthesized via carbonization at high temperature (e.g., 1100° C.) possess an abundance of micropores and defects. The abundance of micropores and defects is favorable for hosting a high density of $MN_4$ sites with atomic dispersion in carbon.

Although M-N—C catalysts, particularly Fe—N—C catalysts, have shown much promise for use in the oxygen reduction reaction, the overall performance of existing Fe—N—C catalysts has been unsatisfactory. This has largely been attributable to an undesirably low $FeN_4$ active site density. Increasing the density of $FeN_4$ active sites in an Fe—N—C catalyst remains a significant challenge because merely raising the Fe content in a precursor will simply induce isolated Fe atoms to migrate and to agglomerate, forming Fe nanoparticles and compounds, instead of leading to a desired increase in $FeN_4$ active site density.

Recently, a zinc-based zeolite imidazole framework (ZIF-8) was employed to encapsulate an Fe-dual pyridine coordinated complex as a precursor to achieving an Fe—N—C catalyst with a high density of $FeN_4$ active sites. While such an approach shows some promise in increasing active site density, the present inventors believe that there is still room for improvement. For example, for Fe—N—C catalysts, in particular, and for M-N—C catalysts, in general, the present inventors believe that it may be desirable not only to improve the active site density of the catalyst but also to improve the intrinsic activity and stability of its active sites.

SUMMARY OF THE INVENTION

It is an object of the present invention to provide a new technique for making platinum-group metal (PGM)-free catalysts.

It is another object of the present invention to provide a technique as described above that overcomes at least some of the shortcomings associated with existing techniques for making such catalysts.

Therefore, according to one aspect of the invention, there is provided a method of preparing a catalyst, the method comprising the steps of (a) incorporating nanoparticles of a metal oxide into a zeolitic imidazolate frameworks (ZIF) nanocrystal to form a metal oxide/ZIF composite, wherein the metal oxide comprises an oxide of at least one of metal that is selected from the group consisting of iron, cobalt, nickel, manganese, and copper; and (b) then, pyrolyzing the metal oxide/ZIF composite to form an M-N—C catalyst.

In a more detailed feature of the invention, the nanoparticles may be ultrafine nanoparticles having an average size of about 5 nm.

In a more detailed feature of the invention, the metal oxide may comprise $Fe_2O_3$ nanoparticles.

In a more detailed feature of the invention, the ZIF may be selected from the group consisting of ZIF-7, ZIF-8, and ZIF-11.

In a more detailed feature of the invention, the ZIF may be ZIF-8.

In a more detailed feature of the invention, the pyrolyzing step may comprise heating the metal oxide/ZIF composite at a temperature of at least about 500° C.

In a more detailed feature of the invention, the pyrolyzing step may comprise heating the metal oxide/ZIF composite at a temperature of at least about 700° C.

In a more detailed feature of the invention, the pyrolyzing step may comprise heating the metal oxide/ZIF composite at a temperature in the range of about 700° C.-1100° C. for about 1 hour in an Ar gas environment.

In a more detailed feature of the invention, the method may further comprise, after step (b), mixing a quantity of the M-N—C catalyst with a quantity of $NH_4Cl$; and then, pyrolyzing the M-N—C/$NH_4Cl$ mixture.

In a more detailed feature of the invention, the M-N—C may be Fe—N—C.

In a more detailed feature of the invention, the quantities of Fe—N—C catalyst and $NH_4Cl$ may be mixed together in a mass ratio of $NH_4Cl$ to FeNC of up to 10:1.

In a more detailed feature of the invention, the quantities of Fe—N—C catalyst and $NH_4Cl$ may be mixed together in a mass ratio of $NH_4Cl$ to FeNC of 3:1.

In a more detailed feature of the invention, the method may further comprise, after pyrolyzing the M-N—C/$NH_4Cl$ mixture, adding carbon species or nitrogen-doped carbon species to the $NH_4Cl$-treated M-N—C catalyst by chemical vapor deposition (CVD).

In a more detailed feature of the invention, the carbon species or nitrogen-doped carbon species may be added as a surface layer having a thickness ranging from a monolayer up to about 1 nm.

In a more detailed feature of the invention, the M-N—C may be Fe—N—C, and the quantities of Fe—N—C catalyst and $NH_4Cl$ may be mixed together in a mass ratio of $NH_4Cl$ to FeNC of up to 10:1.

In a more detailed feature of the invention, the quantities of Fe—N—C catalyst and $NH_4Cl$ may be mixed together in a mass ratio of $NH_4Cl$ to FeNC of 3:1.

According to another aspect of the invention, there is provided a method of preparing a catalyst, the method comprising the steps of (a) combining (i) nanoparticles of a metal oxide, wherein the metal oxide comprises an oxide of at least one of metal that is selected from the group consisting of iron, cobalt, nickel, manganese, and copper, (ii) a hydrated zinc salt, and (iii) an imidazole to form a metal oxide/ZIF composite; and (b) then, pyrolyzing the metal oxide/ZIF composite to form an M-N—C catalyst.

In a more detailed feature of the invention, the metal oxide may comprise $Fe_2O_3$.

In a more detailed feature of the invention, the hydrated zinc salt may comprise zinc nitrate hexahydrate.

In a more detailed feature of the invention, the imidazole may comprise 2-methylimidazole.

In a more detailed feature of the invention, the combining step may comprise preparing a first solution and a second solution, the first solution may comprise the metal oxide and the hydrated zinc salt in methanol, the second solution may comprise the imidazole in methanol, and then mixing the first solution and the second solution.

In a more detailed feature of the invention, the metal oxide/ZIF composite may comprise an $Fe_2O_3$@ZIF-8 composite.

In a more detailed feature of the invention, the pyrolyzing step may comprise heating the metal oxide/ZIF composite at a temperature of at least about 500° C.

In a more detailed feature of the invention, the pyrolyzing step may comprise heating the metal oxide/ZIF composite at a temperature of at least about 700° C.

In a more detailed feature of the invention, the pyrolyzing step may comprise heating the metal oxide/ZIF composite at a temperature in the range of about 700° C.-1100° C. in an Ar gas environment.

In a more detailed feature of the invention, the method may further comprise, after step (b), mixing a quantity of the M-N—C catalyst with a quantity of $NH_4Cl$; and then, pyrolyzing the M-N—C/$NH_4Cl$ mixture.

In a more detailed feature of the invention, the M-N—C may be Fe—N—C.

In a more detailed feature of the invention, the quantities of Fe—N—C catalyst and $NH_4Cl$ may be mixed together in a mass ratio of $NH_4Cl$ to FeNC of up to 10:1.

In a more detailed feature of the invention, the quantities of Fe—N—C catalyst and $NH_4Cl$ may be mixed together in a mass ratio of $NH_4Cl$ to FeNC of 3:1.

In a more detailed feature of the invention, the method may further comprise, after pyrolyzing the M-N—C/$NH_4Cl$ mixture, adding carbon species or nitrogen-doped carbon species to the $NH_4Cl$-treated M-N—C catalyst by chemical vapor deposition (CVD).

In a more detailed feature of the invention, the carbon species or nitrogen-doped carbon species may be added as a surface layer having a thickness ranging from a monolayer up to about 1 nm.

In a more detailed feature of the invention, the M-N—C may be Fe—N—C, and the quantities of Fe—N—C catalyst and $NH_4Cl$ may be mixed together in a mass ratio of $NH_4Cl$ to FeNC of up to 10:1.

In a more detailed feature of the invention, the quantities of Fe—N—C catalyst and $NH_4Cl$ may be mixed together in a mass ratio of $NH_4Cl$ to FeNC of 3:1.

In a more detailed feature of the invention, the carbon species or nitrogen-doped carbon species may be added to the $NH_4Cl$-treated M-N—C catalyst by chemical vapor deposition (CVD) of a ZIF.

In a more detailed feature of the invention, the carbon species or nitrogen-doped carbon species may be added to the $NH_4Cl$-treated M-N—C catalyst by chemical vapor deposition (CVD) of ZIF-8.

The present invention is also directed at catalysts made by the above methods.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication or may omit certain features for purposes of clarity. In the drawings wherein like reference numeral represent like parts:

FIG. 4A is a graph depicting linear sweep voltammetry (LSV) curves before, during, and after nitrile adsorption in a 0.5 M acetate buffer at pH 5.2 for a 10FeNC-1100 catalyst, with catalyst loading of 0.27 mg $cm^{-2}$;

FIG. 4B is a graph depicting linear sweep voltammetry (LSV) curves before, during, and after nitrile adsorption in a 0.5 M acetate buffer at pH 5.2 for a FeZIF-1100 catalyst, with catalyst loading of 0.27 mg $cm^{-2}$;

FIG. 4C is a graph depicting cyclic voltammetry (CV) curves before and during nitrile adsorption in the nitrile reductive stripping region for a 10FeNC-1100 catalyst, with catalyst loading of 0.27 mg $cm^{-2}$;

FIG. 4D is a graph depicting cyclic voltammetry (CV) curves before and during nitrile adsorption in the nitrile reductive stripping region for a FeZIF-1100 catalyst, with catalyst loading of 0.27 mg $cm^{-2}$;

FIG. 9 is a table displaying fitting parameters of an FePc (iron(III) phthalocyanine) standard, wherein CN represents coordination number, R represents distance, $E_0$ represents energy shift, and $\sigma^2$ ($Å^2$) represents mean-square disorder (the single digit numbers in parentheses representing last digit errors);

FIG. 10 is a table displaying fitting parameters of an Fe—N—C catalyst, wherein CN represents coordination number, R represents distance, $E_0$ represents energy shift, and $\sigma^2$ ($Å^2$) represents mean-square disorder (the single digit numbers in parentheses representing last digit errors and the numbers in parentheses for CN representing full errors);

FIG. 11A is a graph depicting $N_2$ adsorption/desorption for 10FeNC-0$NH_4Cl$, 10FeNC-3$NH_4Cl$ and 10FeNC-3$NH_4Cl$-CVD catalysts;

FIGS. 11B and 11C are graphs depicting pore distribution plots for 10FeNC-0$NH_4Cl$, 10FeNC-3$NH_4Cl$ and 10FeNC-3$NH_4Cl$-CVD catalysts;

FIG. 11D is a graph comparing porosity for 10FeNC-0$NH_4Cl$, 10FeNC-3$NH_4Cl$ and 10FeNC-3$NH_4Cl$-CVD catalysts;

FIG. 12 is a table displaying pore distributions and specific surface areas of 10FeNC—O$NH_4Cl$, 10FeNC-3$NH_4Cl$, and 10FeNC-3$NH_4Cl$-CVD catalysts;

FIG. 20 is a table displaying elemental quantification of 10FeNC-0$NH_4Cl$, 10FeNC-3$NH_4Cl$, and 10FeNC-3$NH_4Cl$-CVD catalysts using XPS;

FIG. 21 is a table displaying nitrogen is peak fitting results for 10FeNC-0$NH_4Cl$, 10FeNC-3$NH_4Cl$, and 10FeNC-3$NH_4Cl$-CVD catalysts;

FIG. 22 is a table displaying carbon is peak fitting results for 10FeNC-0$NH_4Cl$, 10FeNC-3$NH_4Cl$, and 10FeNC-3$NH_4Cl$-CVD catalysts;

FIG. 24 is a table displaying elemental quantification of 10FeNC-0NH$_4$Cl, 10FeNC-1NH$_4$Cl, 10FeNC-3NH$_4$Cl, and 10FeNC-6NH$_4$Cl catalysts using XPS;

FIG. 25 is a table displaying nitrogen 1s peak fitting results for 10FeNC-0NH$_4$Cl, 10FeNC-1NH$_4$Cl, 10FeNC-3NH$_4$Cl, and 10FeNC-6NH$_4$Cl catalysts;

FIG. 26 is a table displaying carbon 1s peak fitting results for 10FeNC-0NH$_4$Cl, 10FeNC-1NH$_4$Cl, 10FeNC-3NH$_4$Cl, and 10FeNC-6NH$_4$Cl catalysts;

FIG. 28 is a table displaying pore distribution and Brunauer-Emmett-Teller (BET) surface areas of 10FeNC-0NH$_4$Cl, 10FeNC-1NH$_4$Cl, 10FeNC-3NH$_4$Cl, and 10FeNC-6NH$_4$Cl catalysts;

FIG. 30 is a table providing a comparing the 10FeNC-3NH$_4$Cl catalyst of the present invention with other Fe—N—C catalysts;

FIG. 41 is a table displaying elemental quantification of 5FeNC-3NH$_4$Cl, 10FeNC-3NH$_4$Cl, and 20FeNC-3NH$_4$Cl catalysts using X-ray photoelectron spectroscopy (XPS);

FIG. 42 is a table displaying Nitrogen 1 s peak fitting results for 5FeNC-3NH$_4$Cl, 10FeNC-3NH$_4$Cl, and 20FeNC-3NH$_4$Cl catalysts;

FIG. 49G is a graph comparing current density loss at 0.8 V in $H_2$-air cell for 10FeNC—0NH$_4$Cl, 10FeNC-3NH$_4$Cl, and 10FeNC-3NH$_4$Cl-CVD catalysts at different cycles;

FIG. 49H is a graph comparing the percentage of current density loss at 0.8 V and the percentage of voltage loss at 0.8 A cm$^{-2}$ in an $H_2$-air cell for 10FeNC-0NH$_4$Cl, 10FeNC-3NH$_4$Cl, and 10FeNC-3NH$_4$Cl-CVD catalysts;

FIG. 49I is a graph comparing the activities of various catalysts in proton-exchange membrane fuel cells (PEMFCs) (the star denoting the U.S. Department of Energy target);

FIG. 53 is a table showing a comparison in current density loss at 0.8 V and peak power density loss in a $H_2$-air cell for 10FeNC-0NH$_4$Cl, 10FeNC-3NH$_4$Cl and 10FeNC-3NH$_4$Cl-CVD catalyst cathodes;

DETAILED DESCRIPTION OF THE INVENTION

Figure 1:
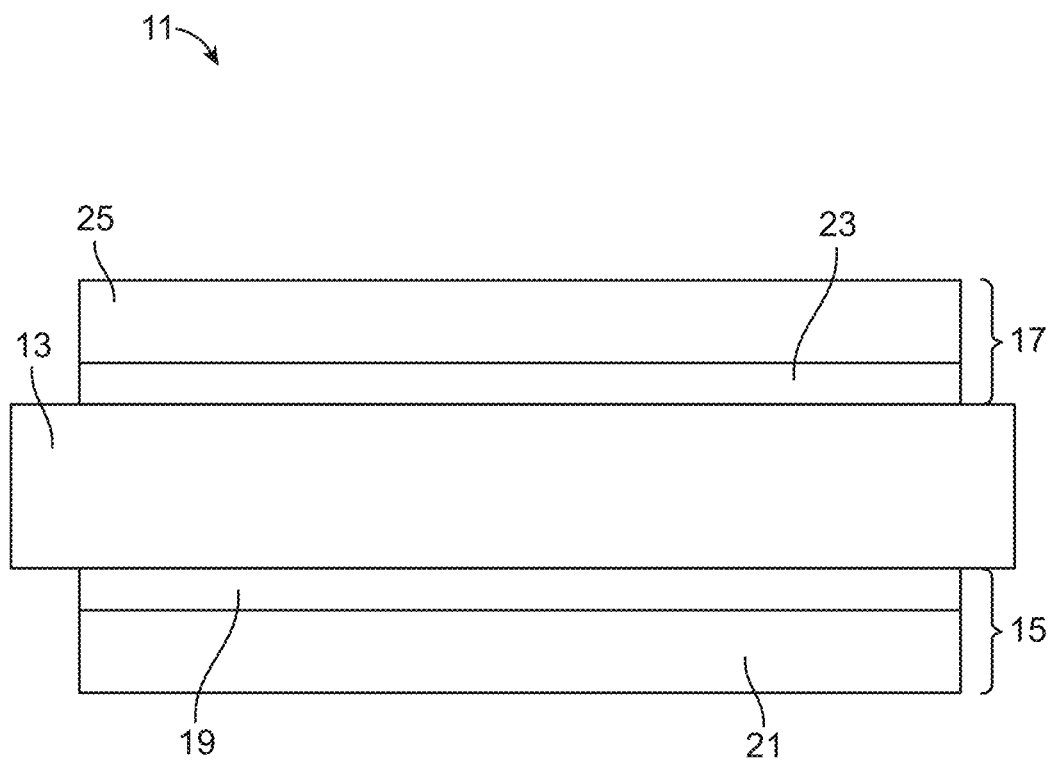
FIG. 1 is a simplified front view of one embodiment of a membrane electrode assembly constructed according to the present invention.

According to one aspect of the invention, there is provided a novel method for making platinum-group metal-free (PGM) catalysts and, in particular, a PGM-free catalyst of the M-N—C type, wherein M is a metal preferably selected from the group consisting of iron, cobalt, nickel, manganese, and copper, wherein N is nitrogen, and wherein C is carbon.

In one embodiment, the method may comprise (a) incorporating nanoparticles of a metal oxide into a zeolitic imidazolate frameworks (ZIF) nanocrystal to form a metal oxide/ZIF composite, wherein the metal oxide comprises an oxide of at least one metal that is preferably selected from the group consisting of iron, cobalt, nickel, manganese, and copper; and (b) then, thermally activating, i.e., carbonizing, the metal oxide/ZIF composite to form an M-N—C catalyst.

More specifically, the method may comprise (a) combining (i) nanoparticles of a metal oxide, wherein the metal oxide comprises an oxide of at least one metal that is preferably selected from the group consisting of iron, cobalt, nickel, manganese, and copper, (ii) a hydrated zinc salt, and (iii) an imidazole to form a metal oxide/ZIF composite; and (b) then, thermally activating, i.e., carbonizing, the metal oxide/ZIF composite to form an M-N—C catalyst.

Preferably, the M-N—C catalyst is then subjected to one or more treatment steps. For example, the M-N—C catalyst may be mixed with a quantity of ammonium chloride, and then the M-N—C/NH$_4$Cl mixture may be pyrolyzed. The foregoing NH$_4$Cl treatment may serve to improve the intrinsic activity of the catalyst.

Preferably, following such NH$_4$Cl treatment, a thin layer of carbon or nitrogen-doped carbon may be added to the NH$_4$Cl-treated M-N—C catalyst by chemical vapor deposition (CVD). Such CVD treatment may serve to improve the stability of the catalyst. In fact, M-N—C catalysts synthesized by the above-described method, including the NH$_4$Cl and CVD treatment steps, have been found to exhibit significantly enhanced activity, stability and fuel cell performance.

The metal oxide nanoparticles used to form the above-described metal oxide/ZIF composite may comprise ultrafine nanoparticles. Such ultrafine nanoparticles may have an average size of, for example, about 5 nm. The metal oxide may comprise one or more metal oxides and may comprise an oxide of iron, for example, $Fe_2O_3$.

The hydrated zinc salt used to form the above-described metal oxide/ZIF composite may comprise, for example, one or more hydrated zinc salts, such as a hydrated zinc nitrate, and, more specifically, may comprise zinc nitrate hexahydrate.

The imidazole used to form the above-described metal oxide/ZIF composite may comprise one or more imidazoles and may comprise, for example, 2-methylimidazole. The ZIF used to form the above-described metal oxide/ZIF composite may comprise one or more ZIFs and preferably comprises ZIF-8 but may alternatively or additionally comprise ZIF-7, ZIF-11, and/or one or more other suitable ZIFs.

The metal oxide/ZIF composite described above may be formed by a method that comprises forming a first mixture and a second mixture. (The order in which the first mixture and the second mixture are formed may be of no consequence. Accordingly, the first mixture may be formed before the second mixture, the first mixture may be formed after the second mixture, the first mixture may be formed concurrently with the second mixture, etc.) In one embodiment, the first mixture may comprise (i) a quantity of metal oxide nanoparticles, such as $Fe_2O_3$ ultrafine nanoparticles, (ii) a quantity of a hydrated metal salt, such as zinc nitrate hexahydrate, and (iii) a quantity of a first solvent, the first solvent being suitable for dissolving and/or dispersing the metal oxide nanoparticles and the hydrated metal salt. The first solvent may comprise, for example, methanol and/or another suitable solvent. The second mixture may comprise (i) a quantity of an imidazole, such as 2-methylimidazole, and (ii) a quantity of a second solvent, the second solvent being suitable for dissolving and/or dispersing the imidazole. The second solvent may comprise, for example, methanol and/or another suitable solvent.

The aforementioned method may additionally comprise combining the first mixture and the second mixture to form a third mixture. In one embodiment, the third mixture may be mixed and heated, preferably mixed and heated concurrently, for a period of time. For example, the third mixture may be mixed and heated at a temperature of about 60° C. for a period of about 24 hours. The result of the foregoing process may be the formation of a precipitate in the form of a metal oxide/ZIF composite, such as an $Fe_2O_3$@ZIF-8 composite.

The aforementioned method may further comprise isolating the metal oxide/ZIF composite. In one embodiment, such isolating may comprise collecting the above-mentioned metal oxide/ZIF composite precipitate, washing the metal oxide/ZIF composite precipitate, for example, with ethanol, and then drying the metal oxide/ZIF composite precipitate, for example, at 60° C. in a vacuum oven.

The above-described thermal activation of the metal oxide/ZIF composite may comprise heating the metal oxide/ZIF composite at an elevated temperature for a period of time in a desired environment. For example, such heating may be at a temperature of at least about 500° C., more preferably at a temperature of at least about 700° C., and even more preferably at a temperature in the range of about 700° C.-1100° C. In one embodiment, such heating may be for a duration of about 1 hour and may take place in an Ar gas environment.

Without wishing to be limited to any particular theory of the invention, it is believed that forming a metal oxide/ZIF composite and then, thermally activating the metal oxide/ZIF composite to form an M-N—C catalyst results in an Fe—N—C catalyst (or, more generally, an M-N—C catalyst) with a high density of $FeN_4$ active sites and, in at least some cases, a higher density of $FeN_4$ active sites than can typically be attained using conventional techniques. This is, at least in part, believed to be because the spatial confinement and low diffusion capability of solid-state $Fe_2O_3$ in a ZIF nanocrystal limits the diffusion and agglomeration of Fe atoms to form larger Fe or $Fe_2O_3$ nanoparticles. During carbonization, Fe atoms are directly released from $Fe_2O_3$ and are captured by surrounding defect nitrogen. Therefore, $Fe_2O_3$ directly converts to $FeN_4$ active sites, thereby leading to a high density of $FeN_4$ active sites in the final Fe—N—C catalyst.

According to another aspect of the invention, the intrinsic activity of an Fe—N—C catalyst (or, more generally, an M-N—C catalyst), such as one made by the foregoing method, may be increased by post-treating the Fe—N—C catalyst (or, more generally, the M-N—C catalyst) with $NH_4Cl$ so as to create carbon defects in the catalyst. More specifically, according to one embodiment, such $NH_4Cl$ treatment may comprise (a) mixing a quantity of the Fe—N—C catalyst with a quantity of $NH_4Cl$ powder; and (b) then, pyrolyzing the Fe—N—C/$NH_4Cl$ mixture. The catalyst resulting from the aforementioned $NH_4Cl$ treatment may sometimes be referred to herein as an FeNC—$NH_4Cl$ or FeNC-AC catalyst (or, alternatively, as an FeNC–$xNH_4Cl$ or FeNC-xAC catalyst wherein x denotes the mass ratio of $NH_4Cl$ to FeNC and may be an integer, such as 0, 1, 3, 6, 10, etc.) or, more generally, as an MNC—$NH_4Cl$ or MNC-AC catalyst (or, alternatively, as an MNC–$xNH_4Cl$ or MNC-AC catalyst).

The aforementioned mixing step may comprise grinding the Fe—N—C catalyst with the $NH_4Cl$ powder until a well-blended mixture is obtained.

The aforementioned pyrolyzing step may comprise heating the Fe—N—C/$NH_4Cl$ mixture at an elevated temperature for a period of time in a desired environment. For example, such heating may be at a temperature of about 1100° C. In one embodiment, such heating may be for a duration of about 1 hour and may take place in an Ar gas environment.

Without wishing to be limited to any particular theory of the invention, it is believed that $NH_4Cl$ treatment of the Fe—N—C catalyst causes substantial carbon defects to be formed in the FeNC—$NH_4Cl$ catalyst. Such defects are believed to result in a consequent alteration of the electronic structure of $FeN_4$ active sites and in a decrease in the absorption energy between oxygen reduction reaction (ORR) intermediates and $FeN_4$ active sites, thus leading to an improved intrinsic activity of $FeN_4$ active sites and superior ORR activity of the Fe—N—C catalyst. More specifically, it is believed that, during pyrolysis, $NH_4Cl$ decomposes to $NH_3$ and HCl gas. These gases both produce substantial internal stress and etch the carbon, thus creating a multitude of micropores and defects in the carbon structure. The HCl likely further dissociates at high temperatures to form $H_2$ and $Cl_2$ gases, and the $Cl_2$ gas reacts with residual Fe aggregates in catalysts and facilitates the formation of atomically-dispersed Fe sites.

According to still another aspect of the invention, the stability of an Fe—N—C catalyst (or, more generally, an M-N—C catalyst), particularly an FeNC—$NH_4Cl$ catalyst (or, more generally, an MNC—$NH_4Cl$ catalyst), may be increased by post-treating the Fe—N—C catalyst, particularly FeNC—$NH_4Cl$ (or, more generally, the M-N—C or MNC—$NH_4Cl$ catalyst) by chemical vapor deposition (CVD) of carbon species or nitrogen-doped carbon species (e.g., pyridinic nitrogen, graphitic nitrogen, and zigzag-edged graphene) onto the catalyst. The catalyst resulting from the aforementioned CVD treatment may sometimes be referred to herein as an FeNC—$NH_4Cl$-CVD catalyst (or, more generally, as an MNC—$NH_4Cl$-CVD catalyst). Although CVD treatment may be used with an M-N—C catalyst that has not undergone $NH_4Cl$ treatment, for example, to increase the stability of the catalyst, such an approach may not be desirable in some cases as it may result in significantly lower activity.

In one embodiment, such CVD treatment may comprise placing a quantity of the catalyst, for example, an FeNC—$NH_4Cl$ catalyst (or, more generally, an MNC—$NH_4Cl$ catalyst), and a quantity of a ZIF, for example, ZIF-8, on a high-temperature alumina combustion boat located at downstream and upstream directions, respectively, in a tube furnace. The tube furnace may be heated to a suitable temperature, such as 1100° C., under a stream of argon for a period of time, such as 1 hour. The CVD treatment may result in a very thin layer (e.g., ranging from a monolayer or double layer of carbon atoms up to about 1 nm in thickness) of carbon species or nitrogen-doped (e.g., about 3.5 at. % N) carbon species.

Without wishing to be limited to any particular theory of the invention, it is believed that the above-described CVD treatment of a Fe—N—C catalyst, particularly an FeNC—$NH_4Cl$ catalyst, results in the repair (i.e., reduction in number) of at least some of the carbon defects that are present in the surface layer of the catalyst, particularly those defects that were created by $NH_4Cl$ treatment.

The CVD-treated catalyst has a slightly reduced surface area; nevertheless, the CVD-treated catalyst still retains significant porosity at multiple scales. More importantly, however, the repair of such defects by CVD treatment brings about a higher graphitized carbon structure, resulting in a significantly improved stability of the catalyst both in an acid electrolyte and membrane electrode assemblies (MEAs). More specifically, it is believed that the CVD treatment of the present invention serves to convert some of the active/unstable S1 sites ($FeN_4C_{12}$) into stable S2 sites ($FeN_4C_{10}$). Consequently, by administering to an Fe—N—C catalyst of the present invention both $NH_4Cl$ treatment and CVD treatment, one may obtain a catalyst possessing both desirable activity and stability characteristics. In fact, one such Fe—N—C—$NH_4$—Cl-CVD catalyst according to the present invention achieved a respectable activity of 33 mA $cm^{-2}$ at 0.9 $V_{IR-free}$ ($O_2$) and high hydrogen-air fuel cell performance (85 mA $cm^{-2}$ at 0.8 V and peak power density of 535 mW $cm^{-2}$) while losing only 30 mV (5.1%) at 0.8 A $cm^{-2}$ and 21 $mWcm^{-2}$ (3.9%) after a standard accelerated stress test (30,000 square-wave voltage cycles under Hz/air), meeting the challenging U.S. Department of Energy 2025 stability target for proton-exchange membrane fuel cell (PEMFC) cathodes for transportation applications. Stability was further verified during a long-term steady-state fuel cell life test (>300 hours) at a practical voltage of 0.67 V.

In short, the above-described techniques of catalyst formation, $NH_4Cl$ treatment, and CVD treatment enable the intuitive design of Fe—N—C catalysts with high $FeN_4$ active site density and/or high intrinsic activity and/or high stability. Using $Fe_2O_3$ as the Fe source and then applying $NH_4Cl$ treatment effectively improves oxygen reduction reaction (ORR) activity; moreover, subsequently applying CVD treatment improves the stability of the catalyst. Furthermore, such characteristics are easily tunable because it is facile to alter the carbon structure of Fe—N—C catalysts to the extent desired by selectively creating carbon defects via $NH_4Cl$ treatment and/or selectively repairing at least some of the carbon defects using CVD.

Referring now to FIG. 1, there is shown a simplified front view of one embodiment of a membrane electrode assembly constructed according to the present invention, the membrane electrode assembly being represented generally by reference numeral 11. (For simplicity and clarity, certain components of membrane electrode assembly 11 that are not critical to the understanding of the present invention are either not shown or described herein or are shown and/or described herein in a simplified manner.)

Membrane electrode assembly (MEA) 11, which may be suitable for use in, for example, a fuel cell or other electrochemical cell, may comprise a proton exchange membrane (also sometimes referred to as a solid polymer electrolyte membrane) (PEM) 13. PEM 13 is preferably a non-porous, ionically-conductive, electrically-non-conductive, liquid permeable and substantially gas-impermeable membrane. PEM 13 may consist of or comprise a homogeneous perfluorosulfonic acid (PFSA) polymer. Said PFSA polymer may be formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et. al., issued Sep. 11, 1984; U.S. Pat. No. 4,478,695, inventors Ezzell et. al., issued Oct. 23, 1984; U.S. Pat. No. 6,492,431, inventor Cisar, issued Dec. 10, 2002; and U.S. Pat. No. 9,595,727 B2, inventors Mittelsteadt et al., issued Mar. 14, 2017, all of which are incorporated herein by reference in their entireties. A commercial embodiment of a PFSA polymer electrolyte membrane is manufactured by The Chemours Company FC, LLC (Fayetteville, N.C.) as NAFION™ extrusion cast PFSA polymer membrane.

MEA 11 may further comprise an anode 15 and a cathode 17. Anode 15 and cathode 17 may be positioned along two opposing major faces of PEM 13. In the present embodiment, anode 15 is shown positioned along the bottom face of PEM 13, and cathode 17 is shown positioned along the top face of PEM 13; however, it is to be understood that the positions of anode 15 and cathode 17 relative to PEM 13 could be reversed.

Anode 15, in turn, may comprise an anode electrocatalyst layer 19 and an anode support 21. Anode electrocatalyst layer 19 may be positioned in direct contact with PEM 13, and, in the present embodiment, is shown as being positioned directly below and in contact with the bottom side of PEM 13. Anode electrocatalyst layer 19 defines the electrochemically active area of anode 15 and preferably is sufficiently porous and electrically- and ionically-conductive to sustain a high rate of surface oxidation reaction. Anode electrocatalyst layer 19, which may be an anode electrocatalyst layer of the type conventionally used in a PEM-based fuel cell, may comprise electrocatalyst particles in the form of a finely divided electrically-conductive and, optionally, ionically-conductive material (e.g., a metal powder) which can sustain a high rate of electrochemical reaction. The electrocatalyst particles may be distributed within anode electrocatalyst layer 19 along with a binder, which is preferably ionically-conductive, to provide mechanical fixation.

Anode support 21, which may be an anode support of the type conventionally used in a PEM-based fuel cell, preferably is sufficiently porous to allow fluid (gas and/or liquid) transfer between anode electrocatalyst layer 19 and some fluid conveying tube, cavity, or structure. Anode support 21 is preferably electrically-conductive to provide electrical connectivity between anode electrocatalyst layer 19 and an anode current collector or similar structure. Anode support 21 is also preferably ionically-non-conductive. Anode support 21 may be positioned in direct contact with anode electrocatalyst layer 19 and, in the present embodiment, is shown as being positioned directly below anode electrocatalyst layer 19 such that anode electrocatalyst layer 19 may be sandwiched between and in contact with PEM 13 and anode support 21. Anode support 21 may be dimensioned to entirely cover a surface (e.g., the bottom surface) of anode electrocatalyst layer 19, and, in fact, anode 15 may be fabricated by depositing anode electrocatalyst layer 19 on anode support 21.

Cathode 17 may comprise a cathode electrocatalyst layer 23 and a cathode support 25. Cathode electrocatalyst layer 23 may be positioned in direct contact with PEM 13, and, in the present embodiment, is shown as being positioned directly above and in contact with the top of PEM 13. Cathode electrocatalyst layer 23 defines the electrochemically active area of cathode 17 and preferably is sufficiently porous and electrically- and ionically-conductive to sustain a high rate of surface reduction reaction. Cathode electrocatalyst layer 23 may comprise an M—N—C catalyst of the present invention and may be in the form of particles of said catalyst along with a suitable binder, which is preferably ionically-conductive, to provide mechanical fixation.

Cathode support 25, which may be a cathode support of the type conventionally used in a PEM-based fuel cell and may be, for example, a film or sheet of porous carbon, preferably is sufficiently porous to allow fluid (gas and/or liquid) transfer between cathode electrocatalyst layer 23 and some fluid conveying tube, cavity, or structure. In addition, cathode support 25 is electrically-conductive to provide electrical connectivity between cathode electrocatalyst layer 23 and a cathode current collector. Cathode support 25 is also preferably ionically-non-conductive. Cathode support 25 may be positioned in direct contact with cathode electrocatalyst layer 23 and, in the present embodiment, is shown as being positioned directly above cathode electrocatalyst layer 23 such that cathode electrocatalyst layer 23 may be sandwiched between and in contact with PEM 13 and cathode support 25. Cathode support 25 may be dimensioned to entirely cover a surface (e.g., the top surface) of cathode electrocatalyst layer 23, and, in fact, cathode 17 may be fabricated by depositing cathode electrocatalyst layer 23 on cathode support 25.

The following examples are given for illustrative purposes only and are not meant to be a limitation on the invention described herein or on the claims appended hereto.

Example 1: Catalyst Formation Using $Fe_2O_3$

As alluded to above, traditional approaches to making Fe—N—C catalysts rely on $Fe^{3+}$ or molecular Fe as iron sources. These types of iron sources easily induce diffusion and agglomeration and form larger iron-based nanoparticles during subsequent high-temperature pyrolysis—a result that is undesirable. By contrast, due to the spatial confinement and low diffusion capability of solid-state $Fe_2O_3$ nanoparticles, Fe atoms directly released from $Fe_2O_3$ and captured by surrounding defect nitrogen are believed to lead to a higher $FeN_4$ site density in a resultant Fe—N—C catalyst. Accordingly, one aspect of the present invention is the use of $Fe_2O_3$ as a new Fe source to generate atomic $FeN_4$ sites.

Figure 2:
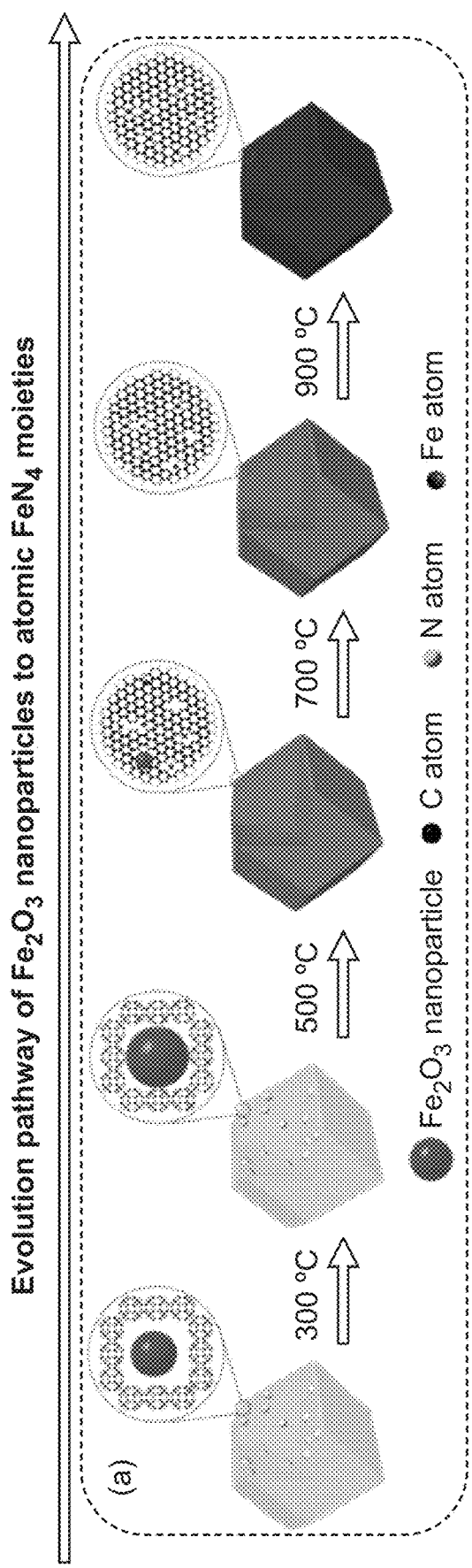
FIG. 2 is a schematic representation of the evolution pathway of $Fe_2O_3$ nanoparticles to atomic $FeN_4$ moieties taking place in one embodiment of a method for synthesizing a platinum-group metal (PGM)-free catalyst, for example, an Fe—N—C catalyst, in accordance with the present invention.

Referring now to FIG. 2, there is schematically shown a representation of the evolution pathway of $Fe_2O_3$ nanoparticles to atomic $FeN_4$ moieties taking place during performance of the method of the present invention, as exemplified in one embodiment of said method. Pursuant to said method, the following steps were performed: First, $Fe_2O_3$ nanoparticles were incorporated into a ZIF nanocrystal, such as a ~100 nm ZIF-8 nanocrystal. This was done by mixing a 2-methylimidazole solution with a $Fe_2O_3/Zn(NO_3)_2$ solution. Following such mixing, the ZIF-8 crystal grew around the $Fe_2O_3$ nanoparticles to form a $10Fe_2O_3$@ZIF-8 composite (wherein 10 represents 10 mg $Fe_2O_3$ added as in Example 5 below).

To understand the conversion mechanism of $Fe_2O_3$ nanoparticles to atomic $FeN_4$ sites, environmental transmission electron microscopy, E-TEM, was used to observe in situ the evolutionary pathway. The evolution from $Fe_2O_3$ to atomic $FeN_4$ sites was traced in a temperature window from 25° C. to 900° C. under an Ar atmosphere. The initial $10Fe_2O_3$@ZIF-8 composite with $Fe_2O_3$ nanoparticles anchored on the surface of the ZIF-8 nanocrystal was clearly observed at 25° C. Increasing the temperature to 300° C., the structure of $Fe_2O_3$ and of the $10Fe_2O_3$@ZIF-8 composite remained the same. An electron energy loss (EEL) point spectrum confirmed that ultrafine particles (~5 nm) in the composite were iron oxide nanoparticles. When the temperature at which the $10Fe_2O_3$@ZIF-8 composite was heated was raised to 500° C., a $Fe_2O_3$ nanoparticle observed in a high resolution transmission electron microscopy (HR-TEM) image disappeared. Corresponding aberration-corrected high angle annular dark-field scanning transmission electron microscopy (HAADF-STEM) images showed nearly all $Fe_2O_3$ vanished, and the vanished $Fe_2O_3$ is believed to have transformed into single Fe atoms distributed in the carbon lattice.

Meanwhile, in addition to abundant $Fe_2O_3$ vanishing, ZIF-8 nanocrystals decomposed and converted into nitrogen-doped carbon nanoparticles. In the locations of the ZIF-8-derived nitrogen-doped carbon matrix where single Fe atoms and Fe—$O_x$ moieties were sparsely distributed, mobile single Fe atoms could be easily captured by defect nitrogen to form atomic $FeN_4$ sites if the temperature was raised further. The temperature was further increased to 700° C. to study the $FeN_4$ site formation mechanism. HAADF-STEM images of the sample pyrolyzed at 700° C. were carefully examined and confirmed the absence of $Fe_2O_3$ clusters and nanoparticles. More bright dots associated with single Fe atoms in the corresponding HAADF-STEM image were observed, which resulted from the conversion of the undecomposed $Fe_2O_3$. By placing an electron probe on an isolated bright spot, the EEL point signals corresponding to Fe and N were detected simultaneously, illustrating that single Fe atoms captured by adjacent defect nitrogen and then atomic $FeN_x$ sites were subsequently formed. This observation is consistent with reports that $FeN_x$ sites are generated above 600° C.

Figure 3B:
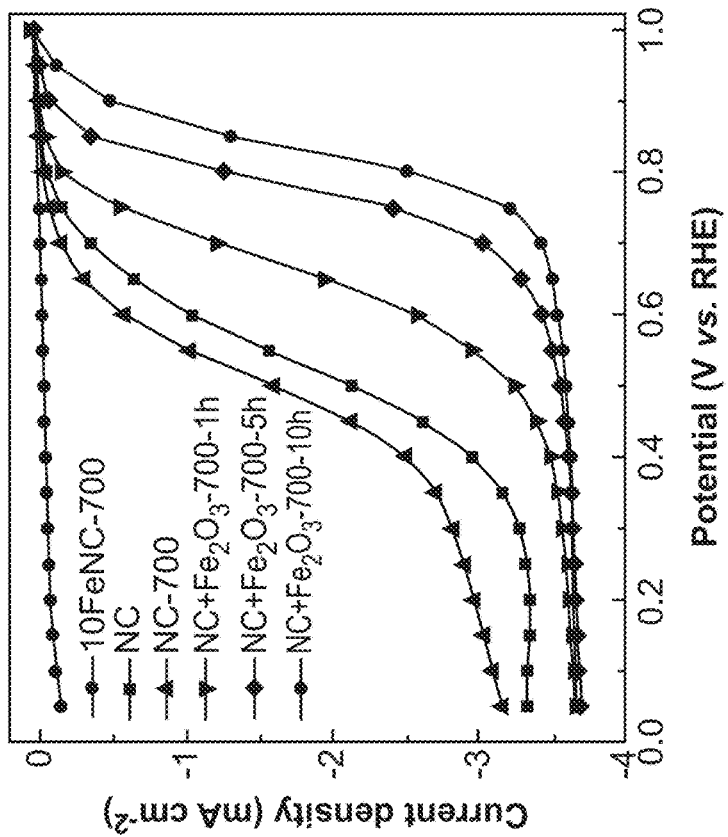
FIG. 3B is a graph depicting the steady-state oxygen reduction reaction polarization plots of 10FeNC-700, nitrogen doped carbon (NC), and catalysts derived from pyrolysis of an $NC/Fe_2O_3$ composite at 700° C. for 1 hour, 5 hours, and 10 hours.
Figure 3A:
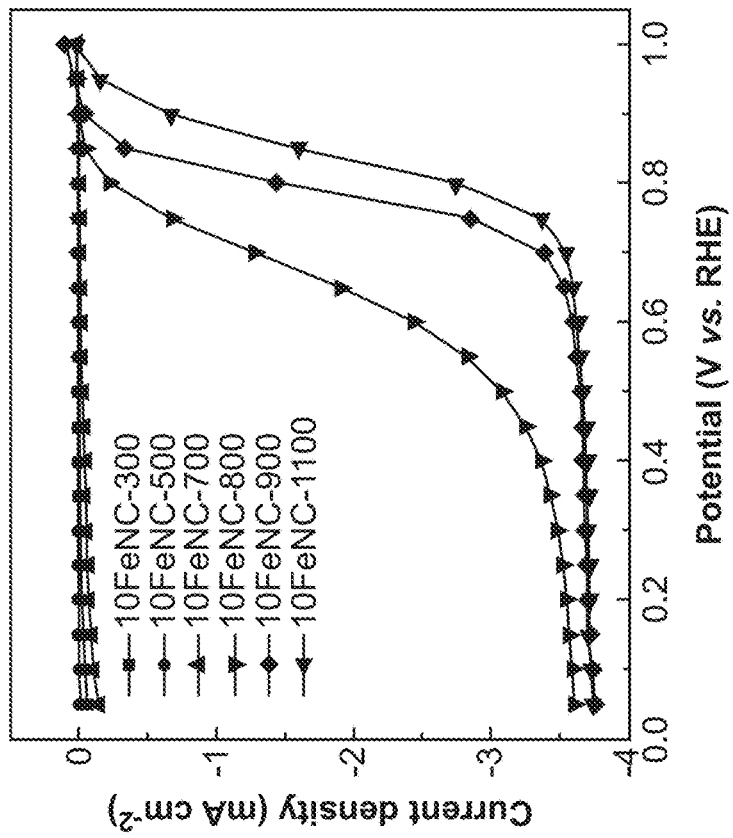
FIG. 3A is a graph depicting the steady-state oxygen reduction reaction polarization plots of 10FeNC-T catalysts pyrolyzed at different temperatures (T=300° C., 500° C., 700° C., 800° C., 900° C., and 1100° C.)

Referring now to FIGS. 3A and 3B, there are shown steady-state oxygen reduction reaction (ORR) polarization plots of (a) 10FeNC-T catalysts pyrolyzed at different temperatures (T=300° C., 500° C., 700° C., 800° C., 900° C., and 1100° C.), and (b) various catalysts including 10FeNC-700 (the suffix "-700" and similar suffixes used herein denoting the pyrolysis temperature used), nitrogen doped carbon (NC), and catalysts derived from pyrolysis of an NC/$Fe_2O_3$ composite at 700° C. for 1 hour, 5 hours, and 10 hours. The NC/$Fe_2O_3$ composite of FIG. 3B was prepared by physical mixing of NC and $Fe_2O_3$ nanoparticles. As can be seen, the $10Fe_2O_3$@ZIF-8 composite pyrolyzed at 700° C. (10FeNC-700) did not exhibit ORR activity, but pyrolysis of the NC/$Fe_2O_3$ composite at 700° C. showed outstanding ORR activity. Combined with the in-situ E-TEM observation of the evolution pathway of $Fe_2O_3$ converted into atomic FeN$_4$ sites from the pyrolysis of the 10Fe$_2$O$_3$@ZIF-8 composite, the results illustrate that the FeN$_4$ sites have been generated at 700° C., but the low conductivity of the 10FeNC-700 catalyst leads to its extremely low ORR activity.

Referring back now to FIG. 2, after increasing the temperature to 900° C., single Fe atoms were homogeneously distributed in the more graphitized carbon structure of the derived 10FeNC-900. The stable Fe—N coordination was verified using the EEL point spectrum. Observation by in-situ E-TEM provides substantially direct evidence of evolution from all Fe$_2$O$_3$ to atomic FeN$_4$ sites, including breakage of the Fe—O bond leading to Fe$_2$O$_3$ decomposition and the capture of mobile single Fe atoms by defect nitrogen to form Fe—N bonds.

Therefore, in contrast to the traditional viewpoint that iron or iron oxide species formation is detrimental to generating a high density of FeN$_4$ active sites in Fe—N—C catalysts, it has been found that optimized Fe$_2$O$_3$ content surrounded by sufficient defect nitrogen is beneficial for synthesis of an Fe—N—C catalyst with a high density of FeN$_4$ active sites. Traditional Fe-based molecules as iron sources readily lead to the formation of larger Fe or Fe$_2$O$_3$ particles in the final Fe—N—C catalyst; however, larger Fe$_2$O$_3$ particles are unable to coordinate with nitrogen, leading to a loss of Fe and a low utilization of Fe atoms. When ultrafine solid-state Fe$_2$O$_3$ nanoparticles are confined in the ZIF-8 nanocrystals, a more stable form of Fe$_2$O$_3$ with low diffusion capability not only prevents the formation of larger Fe$_2$O$_3$ particles but also is able to decompose to Fe atoms during pyrolysis, with the single Fe atoms captured by the surrounding excess defect nitrogen leading to the formation of FeN$_4$ active sites. FIGS. 4A through 4D provide a comparison of the FeN$_4$ site density (SD) of a 10FeNC-1100 catalyst prepared from 10Fe$_2$O$_3$@ZIF-8 composite and a FeZIF-1100 catalyst fabricated using the traditional Fe$^{3+}$ as the Fe source. As can be seen, the 10FeNC-1100 catalyst presents a higher FeN$_4$ active site density (SD=1.49×10$^{-4}$ µmol g$^{-1}$) than does the FeZIF-1100 catalyst (SD=8.30×10$^{-5}$ µmol g$^{-1}$). The FeN$_4$ active site density of the 10FeNC-1100 catalyst prepared from 10Fe$_2$O$_3$@ZIF-8 composite is also much higher than that of reported Fe—N—C catalysts. In summary, the maximum utilization of Fe atoms in the present technique leads to a high density of FeN$_4$ active sites in the resultant Fe—N—C catalyst.

Example 2: Controlling Carbon Defects Via NH$_4$Cl and CVD

Using the hypothesis that introducing a desired amount of carbon defects into the carbon structure of an Fe—N—C catalyst enables one to regulate the electronic structure of anchored FeN$_4$ active sites, the present inventors believe that regulating the content of carbon defects in Fe—N—C catalysts is important in promoting oxygen reduction reaction (ORR) activity and kinetic current density, for example, at 0.9 V vs. reversible hydrogen electrode (RHE). (It is to be understood that references herein to Fe—N—C catalysts may be broadened to include M-N—C catalysts in general.) However, a significant challenge is to synthesize Fe—N—C catalysts with controllable amounts of carbon defects.

Figure 5:
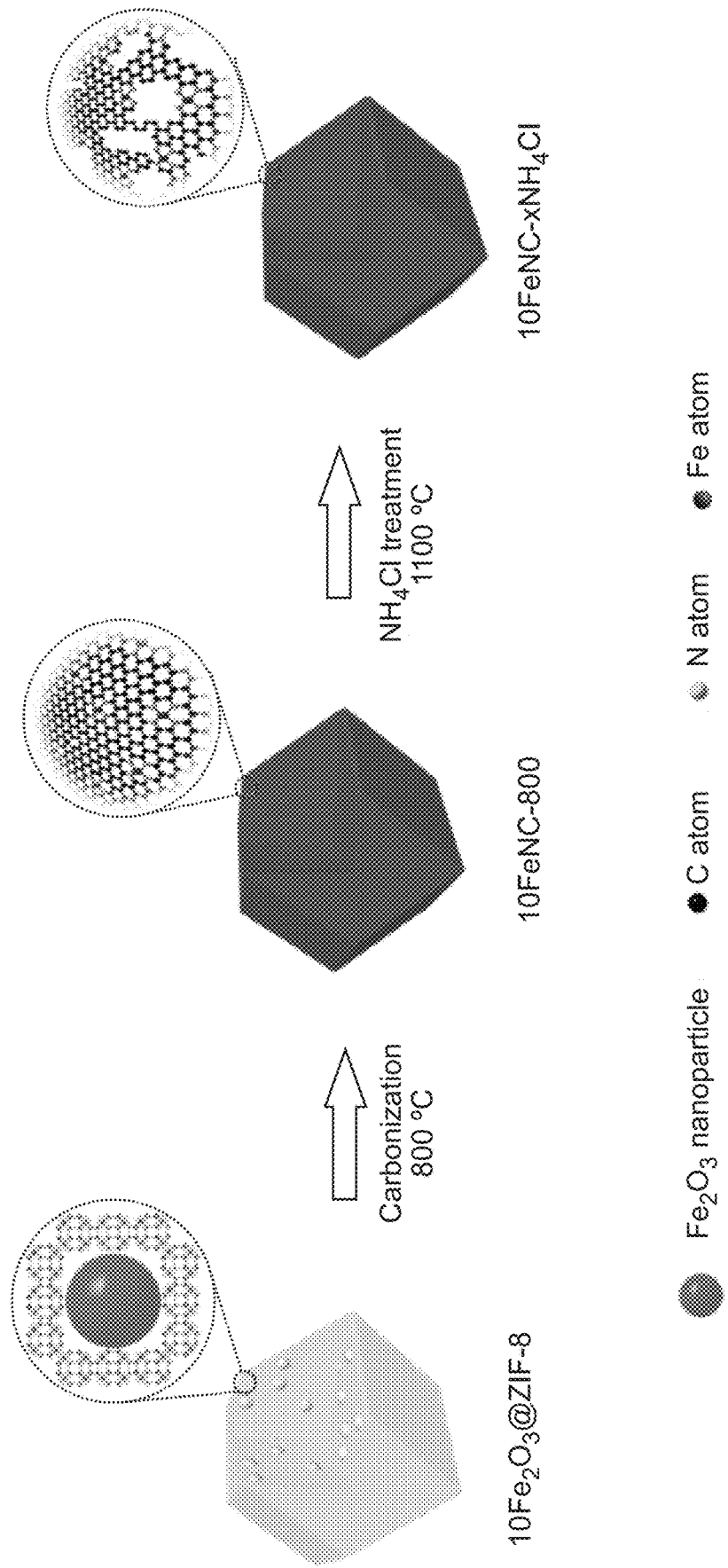
FIG. 5 is a schematic representation of the synthesis of 10FeNC–$xNH_4Cl$ (x=0, 1, 3, 6) catalysts via $NH_4Cl$ treatment, where x represents the mass ratio of $NH_4Cl$ to 10FeNC-800 and where a 10FeNC-0$NH_4Cl$ catalyst is fabricated without $NH_4Cl$ being added in the second pyrolysis.

NH$_4$Cl salt is capable of creating carbon defects and micropores in the carbon plane of Fe—N—C catalysts; thus, NH$_4$Cl may be employed as an agent to create carbon defects in an Fe—N—C catalyst. A schematic illustration of a process for creating carbon defects in a 10FeNC-800 catalyst using NH$_4$Cl treatment is shown in FIG. 5. When NH$_4$Cl salt is mixed with the 10FeNC-800 catalyst, it starts to decompose and to release a significant amount of NH$_3$ and HCl gases during the subsequent pyrolysis process. The gases trapped by the 10FeNC-800 catalyst produce substantial internal stress and then cause the 10FeNC-800 catalyst to expand, which the present inventors believe contributes to the formation of a more microporous architecture and leads to carbon removal therefrom. In addition, the released NH$_3$ continues to etch the carbon structure, causing more carbon defects and increasing the porosity of the catalyst. Consequently, different amounts of NH$_4$Cl treatment on a 10FeNC-800 catalyst are expected to induce the resultant 10FeNC-xNH$_4$Cl catalysts (x=0, 1, 3, and 6 represent the mass ratio of NH$_4$Cl to 10FeNC-800) to display distinct porosities and carbon defects, which can be characterized and confirmed by Raman spectroscopy, carbon electron energy loss spectra (EELs), and porosity analysis.

On the other hand, chemical vapor deposition (CVD) of carbon species onto the catalyst may be used to repair at least some of the carbon defects created by NH$_4$Cl treatment.

Figure 7:
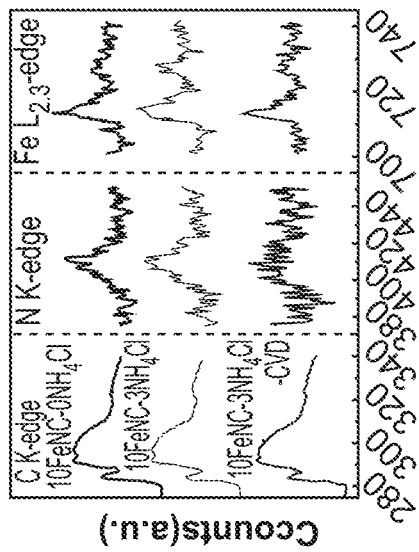
FIG. 7 is a graph depicting electron energy loss (EEL) point spectra from certain atomic sites in 10FeNC-0$NH_4Cl$, 10FeNC-3$NH_4Cl$, and 10FeNC-3$NH_4Cl$-CVD catalysts to determine possible Fe—N coordination in the catalysts.
Figure 6:
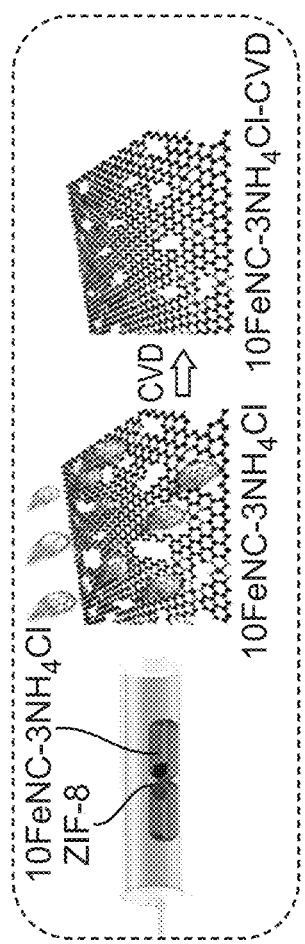
FIG. 6 is a schematic representation of the synthesis of a 10FeNC-3$NH_4Cl$-CVD catalyst by chemical vapor deposition (CVD) of carbon species into a 10FeNC-3$NH_4Cl$ catalyst.
Figure 8:
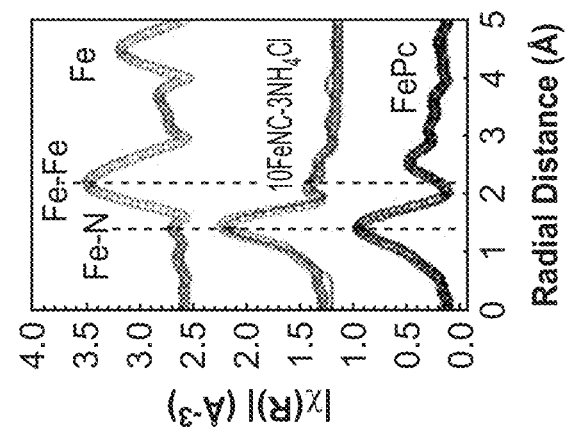
FIG. 8 is a graph depicting Fourier transform extended X-ray absorption fine structure (EXAFS) spectra in R-space for a 10FeNC-3$NH_4Cl$ catalyst, as well as for Fe and FePc (iron(III) phthalocyanine) reference samples.

To illustrate the role of NH$_4$Cl in the formation of carbon defects in an Fe—N—C catalyst and of chemical vapor deposition of carbon species in the repair of carbon defects in NH$_4$Cl-treated Fe—N—C catalysts, three representative catalysts were prepared, namely a 10FeNC-0NH$_4$Cl catalyst (i.e., no NH$_4$Cl or CVD treatment), a 10FeNC-3NH$_4$Cl catalyst (i.e., NH$_4$Cl treatment but no CVD treatment), and a 10FeNC-3NH$_4$Cl-CVD catalyst (i.e., both NH$_4$Cl treatment and CVD treatment). The schematic synthesis of these three catalysts is shown in FIGS. 5 and 6. The atomic structure of each of the three catalysts was analyzed by aberration-corrected high angle annular dark-field scanning transmission electron microscopy (HAADF-STEM). The HAADF-STEM images validated the absence of Fe-containing clusters in these three catalysts. Single Fe atoms (visible as bright dots) were uniformly dispersed in the carbon matrix with randomly oriented graphitic domains. This result demonstrates that single Fe atoms, converted from Fe$_2$O$_3$, were distributed in these catalysts. Furthermore, electron energy loss spectra (EELS), depicted in FIG. 7, show that both Fe and N were detected simultaneously at the atomic level, indicating that single Fe sites are likely coordinated by nitrogen. X-ray absorption spectroscopy (XAS) further confirmed the atomic dispersion of Fe sites in the catalyst, and the local coordination number was also quantified. The Fe K-edge X-ray absorption near edge structure (XANES) and extended X-ray absorption fine structure (EXAFS) show that Fe in the 10FeNC-3NH$_4$Cl catalyst has the same oxidization state and local structures as the standard FePc containing a well-defined Fe—N$_4$ coordination structure (see FIG. 8). Also, only a peak around 1.3 Å is observed, without an additional peak around 2.1 Å that would be associated with a metallic Fe—Fe scattering path in the Fourier transforms of the EXAFS (FT-EXAFS). The similarity further suggests the atomic dispersion of Fe sites in the Fe—N—C catalysts without Fe nanoclusters. However, the scattering peak around 1.3 Å could stand for either Fe—C, Fe—N, or Fe—O coordinations. Considering the confirmation of Fe—N coordination at the atomic level from the EEL and the very similar spectra of Fe—N—C and FePc, a modeled-based EXAFS fitting was carried out, which showed that Fe is coordinated with 4 N atoms (see FIGS. 9 and 10). This agrees with the results from the atomic-level spectroscopic analysis and further verifies that well-dispersed atomic Fe sites were coordinated with N.

The carbon structures of the 10FeNC-0NH$_4$Cl, 10FeNC-3NH$_4$Cl, and 10FeNC-3NH$_4$Cl-CVD catalysts were further characterized by high-resolution transmission electron microscopy (HR-TEM) and carbon K-edged EELs. The HR-TEM images revealed that the carbon structures of these three catalysts are composed of numerous randomly oriented several atom-thick carbon layers of relatively well-ordered carbon atoms. The most obvious difference in bright field high angle annular dark-field HAADF-STEM images of these catalysts is the areal density of randomly oriented graphene sheets. Both the 10FeNC-0NH$_4$Cl catalyst and the 10FeNC-3NH$_4$Cl catalyst have very thin regions at their edges. Strikingly, the 10FeNC-3NH$_4$Cl catalyst has a decreased number of stacked carbon layers in its fringe. Meanwhile, more disordered carbon atoms are clearly presented, suggesting a substantial number of carbon layers are etched and decomposed during NH$_4$Cl treatment. By contrast, the 10FeNC-3NH$_4$Cl-CVD catalyst has a thick region at its edge with a large number of stacked carbon layers. Its fringe has longer and denser stacked carbon layers than that of the 10FeNC-0NH$_4$Cl and 10FeNC-3NH$_4$Cl catalysts, which is attributable to the successful chemical vapor deposition of carbon species into the carbon matrix of the 10FeNC-3NH$_4$Cl catalyst, thus leading to the repair of carbon defects and the formation of denser, stacked carbon layers. Much larger regions of intensively stacked carbon layers in the 10FeNC-3NH$_4$Cl-CVD catalyst are expected to show a smaller surface area and pore volume than that of the 10FeNC-0NH$_4$Cl and 10FeNC-3NH$_4$Cl catalysts, which was also verified by specific surface area and pore distribution characterization (see FIGS. 11A through 11D and FIG. 12).

Figure 13:
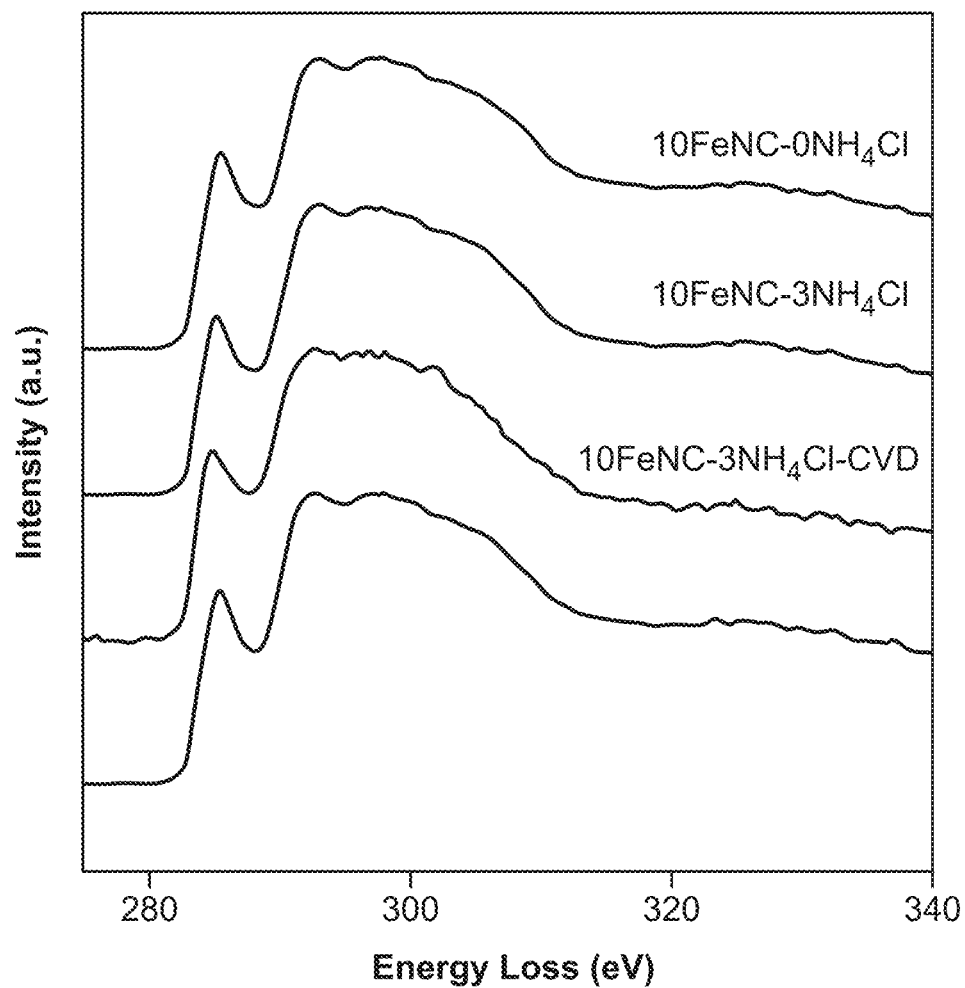
FIG. 13 is a graph depicting carbon K-edge EELS of 10FeNC-0$NH_4Cl$, 10FeNC-3$NH_4Cl$ and 10FeNC-3$NH_4Cl$-CVD catalysts.
Figure 14:
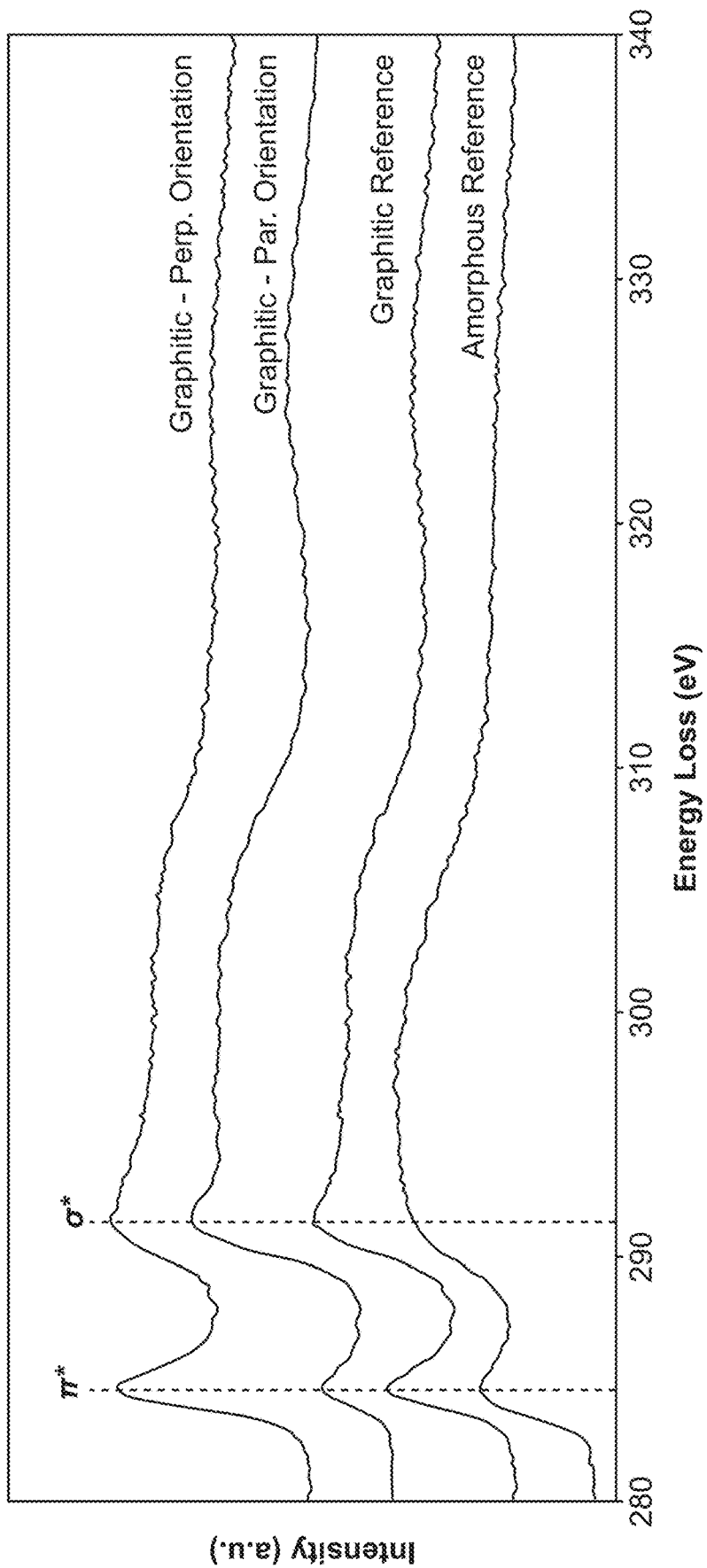
FIG. 14 is a graph depicting orientational carbon K-edge EELS of a multi-walled carbon nanotube, as well as of graphitic and amorphous references.

Further evidence that the thicker regions are composed of these single layers of well-ordered carbon atoms are seen in EELS. For example, FIGS. 7 and 13 show EELS spectra of the carbon K-edge obtained from the 10FeNC-0NH$_4$Cl, 10FeNC-3NH$_4$Cl and 10FeNC-3NH$_4$Cl-CVD catalysts. The sharp π* peak at 285 eV is associated with the presence of sp$^2$-bonded carbon, and the σ* peak at 292 eV is determined by sp$^3$ bonding contributions. Meanwhile, C—H bonds give rise to transitions to C—H σ* states centered at around 287 eV, which indicates partially graphitized carbon structures for these catalysts. The presence of amorphous carbon or sp$^3$-bonded carbon would be expected to depress the sharp π* peak. The sp$^2$ content has been used as a simple parameter to evaluate chemical bonding and, consequently, development of graphitic structure in the carbon material. A measure of the sp$^2$ character could be a very useful additional parameter to characterize carbon defects in these catalysts. A method for quantifying the sp$^2$ bonding fraction in a carbon film is described in Berger et al., "Eels analysis of vacuum arc-deposited diamond-like films," *Phil. Mag. Lett.*, 57:285-290 (1988), which is incorporated herein by reference. In this regard, sp$^2$ content values of 0.92, 0.86 and 0.95 were measured for 10FeNC-0NH$_4$Cl, 10FeNC-3NH$_4$Cl, and 10FeNC-3NH$_4$Cl-CVD catalysts, respectively. The incident angle of electron beam to the graphite crystal effects upon carbon K-edge feature has been demonstrated, which is true for the graphitized carbon if only a limited number of crystallites are irradiated while, in an amorphous material, all bond orientations are present. Therefore, it is necessary to remove the orientation effect from the graphitized material and, thus, to allow a comparison between spectra, especially in the case of carbon K-edge of carbon materials with a relatively high graphitized 10FeNC-3NH$_4$Cl-CVD catalyst. In the present instance, graphitic sheets parallel and perpendicular to the beam were also clearly identified in the case of a multi-walled carbon nanotube (see FIG. 14). Along with orientational mapping of these three catalysts, their corresponding EELS with incident beam parallel/perpendicular to orientation of carbon layers were performed to give an accurate determination of their graphitization degree.

Figure 16:
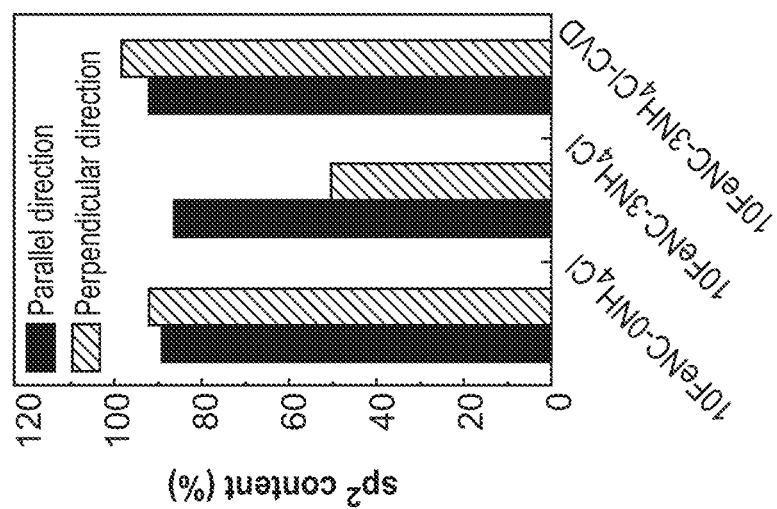
FIG. 16 is a graph comparing the $sp^2$ content in 10FeNC-0$NH_4Cl$, 10FeNC-3$NH_4Cl$ and 10FeNC-3$NH_4Cl$-CVD catalysts.
Figure 15:
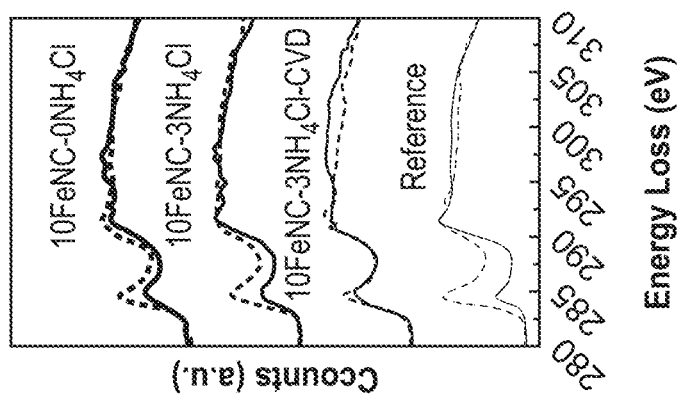
FIG. 15 is a graph depicting a carbon K-edge EELS spectrum of parallel (dashed line) and perpendicular (solid line) types of 10FeNC-0$NH_4Cl$, 10FeNC-3$NH_4Cl$ and 10FeNC-3$NH_4Cl$-CVD catalysts, as well as a reference sample.

The corresponding carbon K-edge spectra were recorded with respect to electron beam parallel/perpendicular to orientation of carbon layers (see FIG. 15). The sp$^2$ content in EELS taken in the "incident beam parallel to carbon layer orientation" and "incident beam perpendicular to carbon layer orientation" is plotted in FIG. 16. The sp$^2$ content calculated for the two directions shows their sp$^2$ content larger in the perpendicular direction than in the parallel direction. The sp$^2$ content values of 0.92, 0.86 and 0.95 were calculated for the 10FeNC-0NH$_4$Cl, 10FeNC-3NH$_4$Cl, and 10FeNC-3NH$_4$Cl-CVD catalysts, respectively, in the incident beam perpendicular to carbon layer orientation, indicating that NH$_4$Cl treatment is capable of lowering the graphitization degree of carbon structure of the catalyst whereas CVD of carbon species brings higher graphitized carbon due to the repair of carbon defects.

Figure 17:
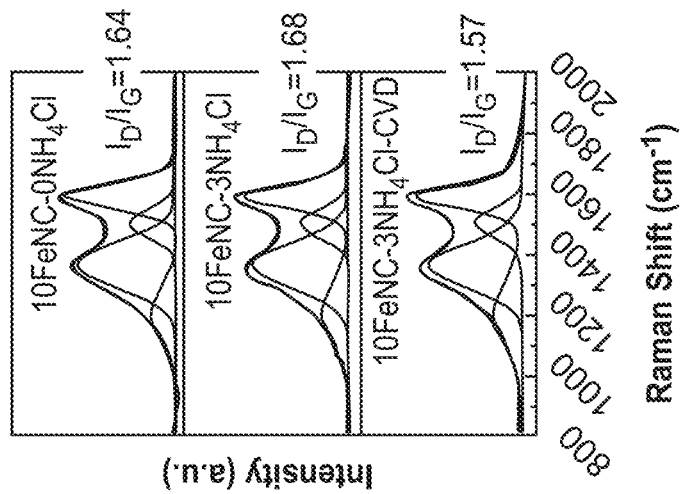
FIG. 17 is a graph depicting the Raman spectra of 10FeNC-0$NH_4Cl$, 10FeNC-3$NH_4Cl$ and 10FeNC-3$NH_4Cl$-CVD catalysts.
Figure 18:
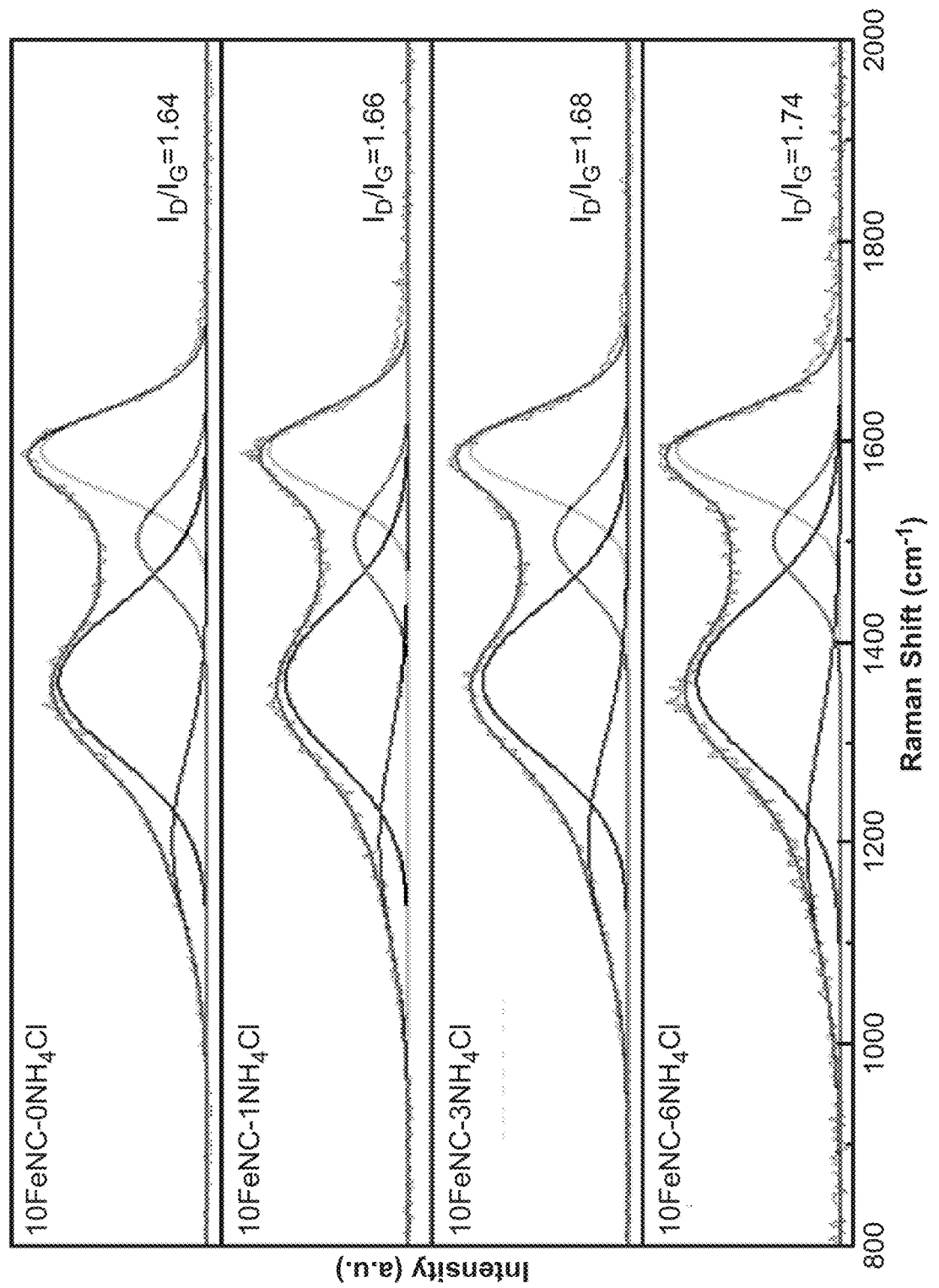
FIG. 18 is a graph depicting the Raman spectra of 10FeNC-0$NH_4Cl$, 10FeNC-1$NH_4Cl$, 10FeNC-3$NH_4Cl$, and 10FeNC-6$NH_4Cl$ catalysts.
Figure 19A:
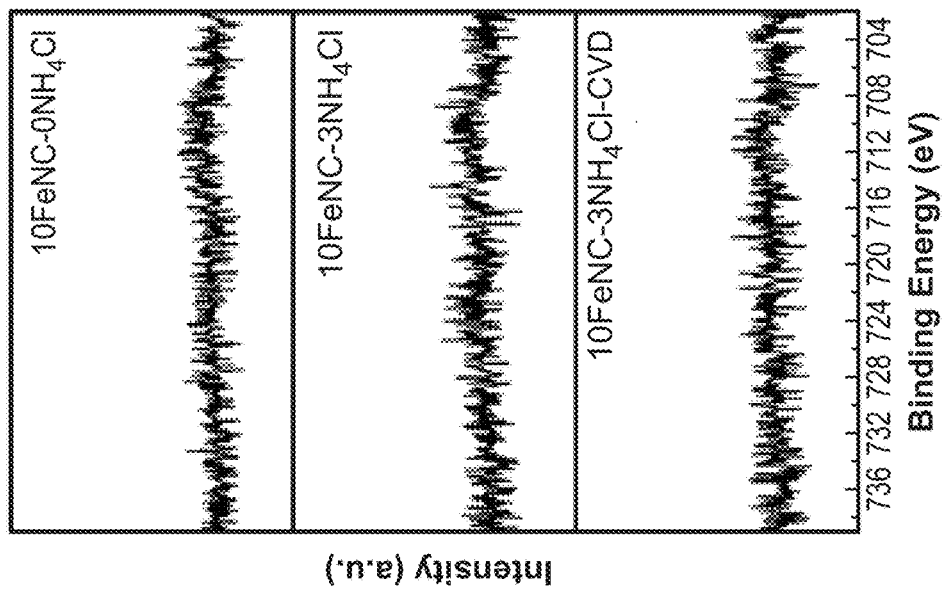
FIG. 19A is a graph depicting X-ray photoelectron spectroscopy (XPS) analysis of nitrogen doping for 10FeNC-0$NH_4Cl$, 10FeNC-3$NH_4Cl$ and 10FeNC-3$NH_4Cl$-CVD catalysts.
Figure 19B:
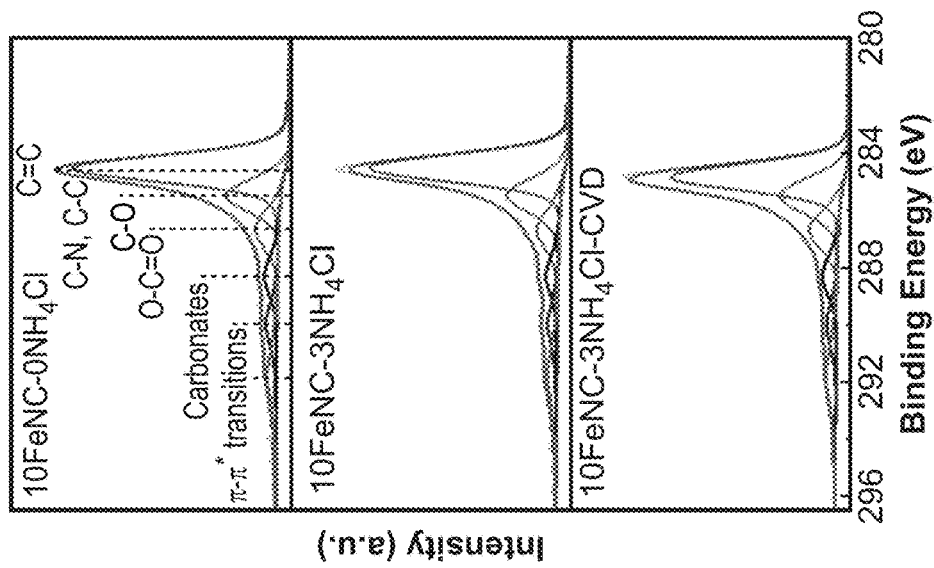
FIG. 19B is a graph depicting X-ray photoelectron spectroscopy (XPS) analysis of carbon structure for 10FeNC-0$NH_4Cl$, 10FeNC-3$NH_4Cl$ and 10FeNC-3$NH_4Cl$-CVD catalysts.
Figure 19C:
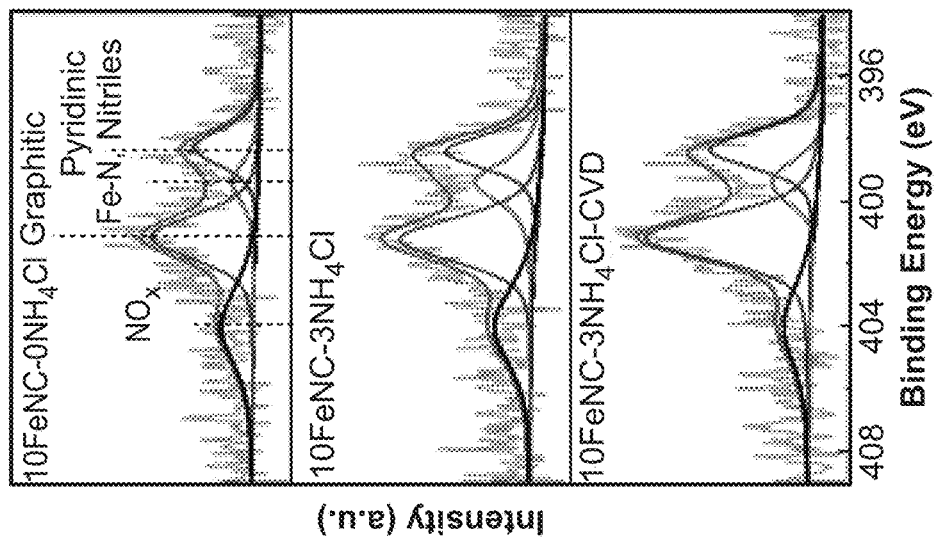
FIG. 19C is a graph depicting X-ray photoelectron spectroscopy (XPS) analysis of iron species for 10FeNC-0$NH_4Cl$, 10FeNC-3$NH_4Cl$ and 10FeNC-3$NH_4Cl$-CVD catalysts.
Figure 23C:
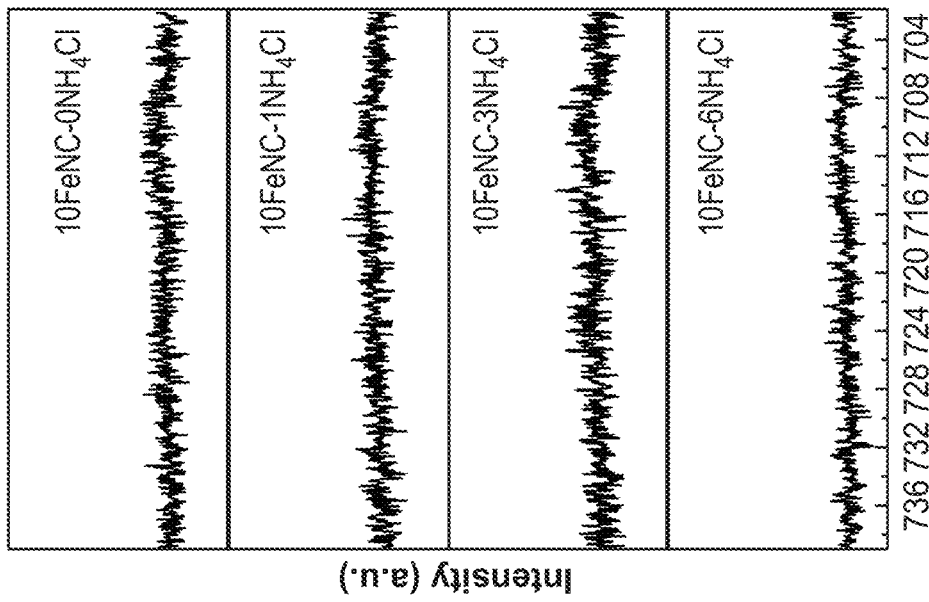
FIG. 23C is a graph depicting XPS analysis of iron species for 10FeNC-0$NH_4Cl$, 10FeNC-1$NH_4Cl$, 10FeNC-3$NH_4Cl$, and 10FeNC-6$NH_4Cl$ catalysts.
Figure 23B:
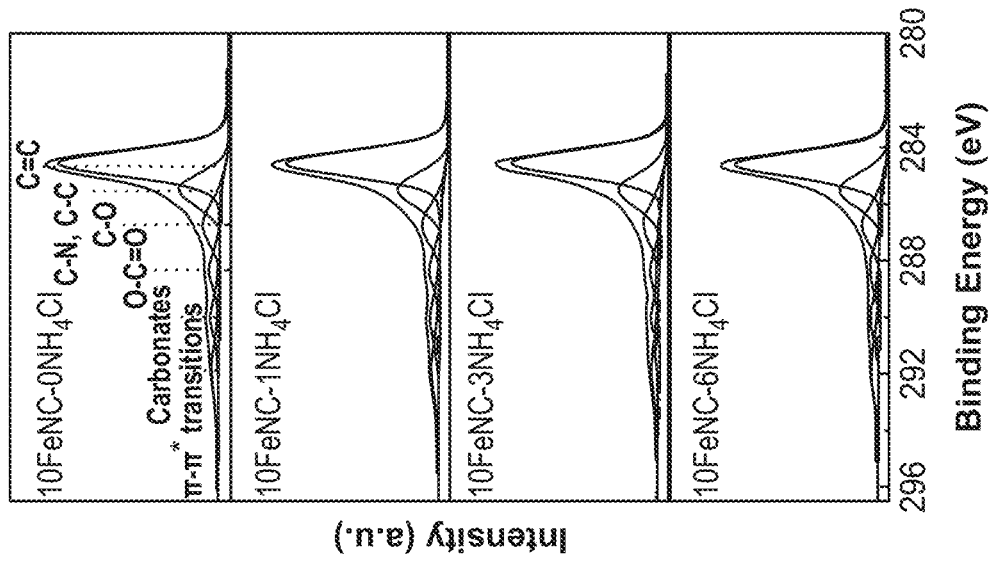
FIG. 23B is a graph depicting XPS analysis of carbon structure for 10FeNC-0$NH_4Cl$, 10FeNC-1$NH_4Cl$, 10FeNC-3$NH_4Cl$, and 10FeNC-6$NH_4Cl$ catalysts.
Figure 23A:
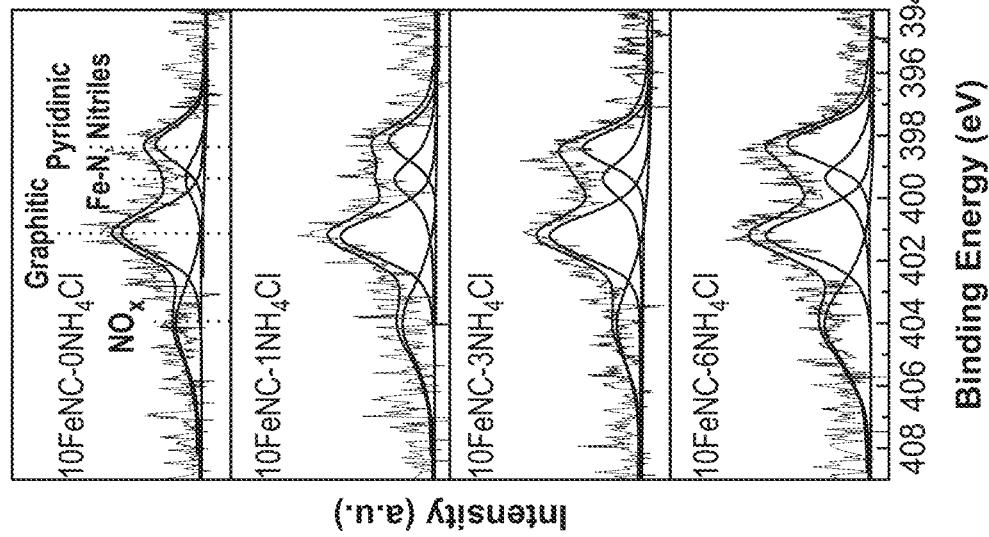
FIG. 23A is a graph depicting XPS analysis of nitrogen doping for 10FeNC-0$NH_4Cl$, 10FeNC-1$NH_4Cl$, 10FeNC-3$NH_4Cl$, and 10FeNC-6$NH_4Cl$ catalysts.
Figure 27B:
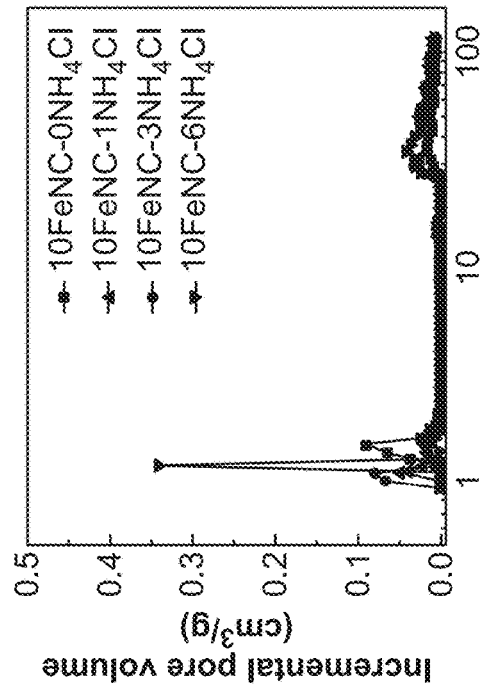
FIGS. 27B and 27C are graphs depicting pore distribution plots of 10FeNC-0NH$_4$Cl, 10FeNC-1NH$_4$Cl, 10FeNC-3NH$_4$Cl and 10FeNC-6NH$_4$Cl catalysts.
Figure 27D:
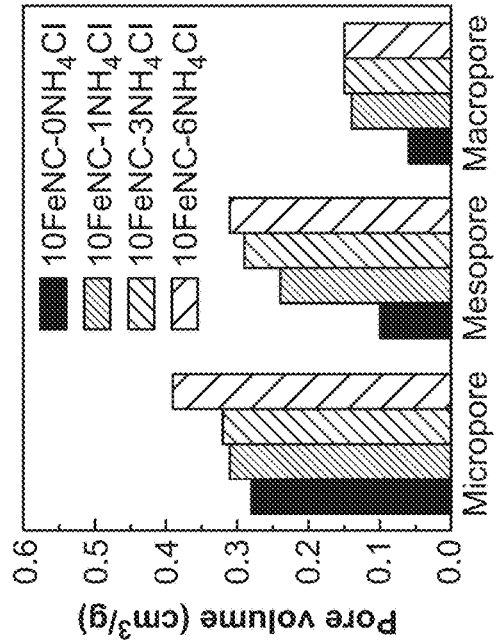
FIG. 27D is a graph comparing porosity for 10FeNC-0NH$_4$Cl, 10FeNC-1NH$_4$Cl, 10FeNC-3NH$_4$Cl and 10FeNC-6NH$_4$Cl catalysts.
Figure 27A:
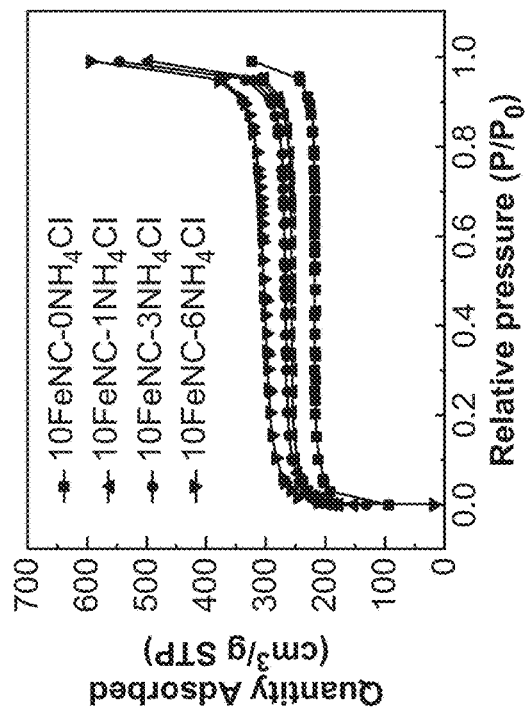
FIG. 27A is a graph depicting N$_2$ adsorption/desorption plots of 10FeNC-0NH$_4$Cl, 10FeNC-1NH$_4$Cl, 10FeNC-3NH$_4$Cl and 10FeNC-6NH$_4$Cl catalysts.
Figure 27C:
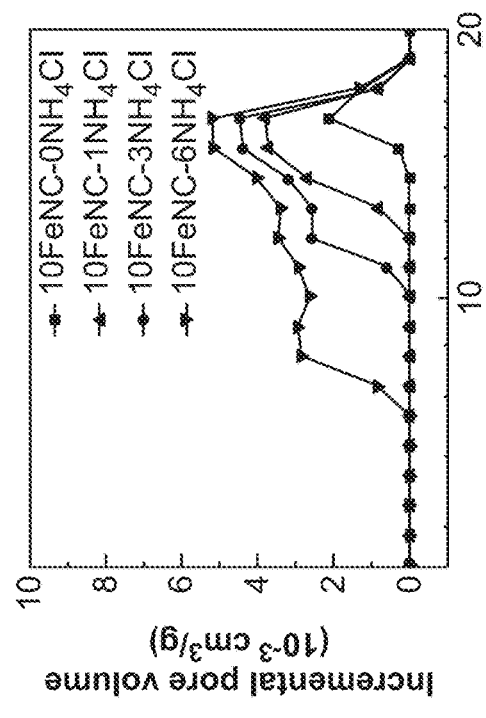

Raman spectroscopy, XIS, and N$_2$ adsorption-desorption experiments were conducted to evaluate the variation of carbon defects in the 10FeNC-0NH$_4$Cl, 10FeNC-3NH$_4$Cl, and 10FeNC-3NH$_4$Cl-CVD catalysts. As shown in FIG. 17, compared to a slightly low $I_D/I_G$ ratio (1.64) for the 10FeNC-0NH$_4$Cl catalyst, the 10FeNC-3NH$_4$Cl catalyst presents a higher $I_D/I_G$ ratio (1.68), which demonstrates that NH$_4$Cl treatment is effective for producing carbon defects in the carbon structure of the Fe—N—C catalyst. By contrast, the 10FeNC-3NH$_4$Cl-CVD catalyst shows the lowest $I_D/I_G$ ratio (1.57), suggesting that abundant carbon defects of the 10FeNC-3NH$_4$Cl catalyst were repaired after the chemical vapor deposition of carbon species into it. The same tendency is observed in FIG. 18, where the ratio of $I_D/I_G$ rises with the higher amount of NH$_4$Cl used in the 10FeNC–xNH$_4$Cl (x=0, 1, 3, and 6) catalysts, indicating that more carbon defects were generated with more NH$_4$Cl utilization. The contents and chemical state of nitrogen in the 10FeNC-0NH$_4$Cl, 10FeNC-3NH$_4$Cl, and 10FeNC-3NH$_4$Cl-CVD catalysts were studied by XPS (see FIGS. 19A through 19C, FIG. 20, FIG. 21, and FIG. 22).

Nitrogen 1s spectra of these three catalysts show three well-separated peaks, which originate from the dominant pyridinic-N (~398.3 eV), graphitic-N (~401.1 eV), Fe—N (~399.4 eV) and oxidized-N (~404.0 eV). Relative to a 10FeNC-0NH$_4$Cl catalyst, which contains 0.17% graphitic nitrogen, the graphitic nitrogen content decreased to 0.11% in 10FeNC-3NH$_4$Cl after NH$_4$Cl treatment. Remarkably, after chemical vapor deposition of carbon species onto the 10FeNC-3NH$_4$Cl catalyst, the graphitic nitrogen rose to 0.19% for the 10FeNC-3NH$_4$Cl-CVD catalyst, which is even higher than that of the 10FeNC-0NH$_4$Cl catalyst. In the meantime, the sp$^2$ content in the carbon structure of these three catalysts was detected from carbon 1s spectra and followed an order of 10FeNC-3NH$_4$Cl<10FeNC-0NH$_4$Cl<10FeNC-3NH$_4$Cl-CVD. The variation of graphitic nitrogen and sp$^2$ content in these three catalysts results from NH$_4$Cl treatment producing carbon defects in the catalysts and chemical vapor deposition of carbon species repairing carbon defects in the catalysts, which is in perfect agreement with the results of carbon EELs and Raman spectra. Correspondingly, it was also found that more carbon defects were generated in the 10FeNC–xNH$_4$Cl catalysts (x=0, 1, 3, and 6) with a gradual increase in the amount of NH$_4$Cl used (see FIGS. 23A through 23C, FIG. 24, FIG. 25, and FIG. 26).

Because different amounts of carbon defects were produced in the different 10FeNC–xNH$_4$Cl catalysts, a corresponding variation in the respective porosities of these catalysts was expected to occur.

To investigate the variation in porosities of the 10FeNC-0NH$_4$Cl, 10FeNC-3NH$_4$Cl, and 10FeNC-3NH$_4$Cl-CVD catalysts, N$_2$ adsorption-desorption experiments were performed (see FIGS. 23A through 23C, FIG. 26, and FIGS. 27A through 27D). Compared to 10FeNC-0NH$_4$Cl (684.2 m$^2$ g$^{-1}$), which was without NH$_4$Cl treatment, the Brunauer-Emmett-Teller (BET) surface area (809.1 m$^2$ g$^{-1}$) of the 10FeNC-3NH$_4$Cl catalyst was enlarged. Meanwhile, the increment of micropore and mesopore volume after NH$_4$Cl treatment suggests a relatively high percentage of carbon atoms were eliminated in the 10FeNC-3NH$_4$Cl catalyst. However, the 10FeNC-3NH$_4$Cl-CVD catalyst, which was derived from the chemical vapor deposition of carbon species into the 10FeNC-3NH$_4$Cl catalyst, showed decreased BET surface area (668.6 m$^2$ g$^{-1}$) and decreased micropore and mesopore volume. This result is attributable to the deposition of carbon species into the catalyst so that substantial carbon defects were successfully repaired, which is consistent with the carbon EELs, Raman spectra, and XPS analysis results. More significantly, a higher BET surface area and pore volume were achieved with a higher x value in 10FeNC–xNH$_4$Cl (x=0, 1, 3, and 6) catalysts, indicating the micro/mesopore-construction capability of NH$_4$Cl (see FIGS. 11A through 11D, FIGS. 27A through 27D, and FIG. 28). It is acknowledged that FeN$_4$ active sites are hosted in micropores (1-2 nm); however, dominant micropores in catalysts render most FeN$_4$ active sites unavailable because the ionomer hardly penetrates these micropores to build robust three-phase interfaces for the oxygen reduction reaction (ORR). Therefore, NH$_4$Cl treatment of Fe—N—C catalysts is believed to provide an effective approach to optimize porosity in catalysts and make it favorable for site accessibility and mass transport in a Fe—N—C cathode.

Example 3: Activities and Stabilities of Catalysts

Figure 31:
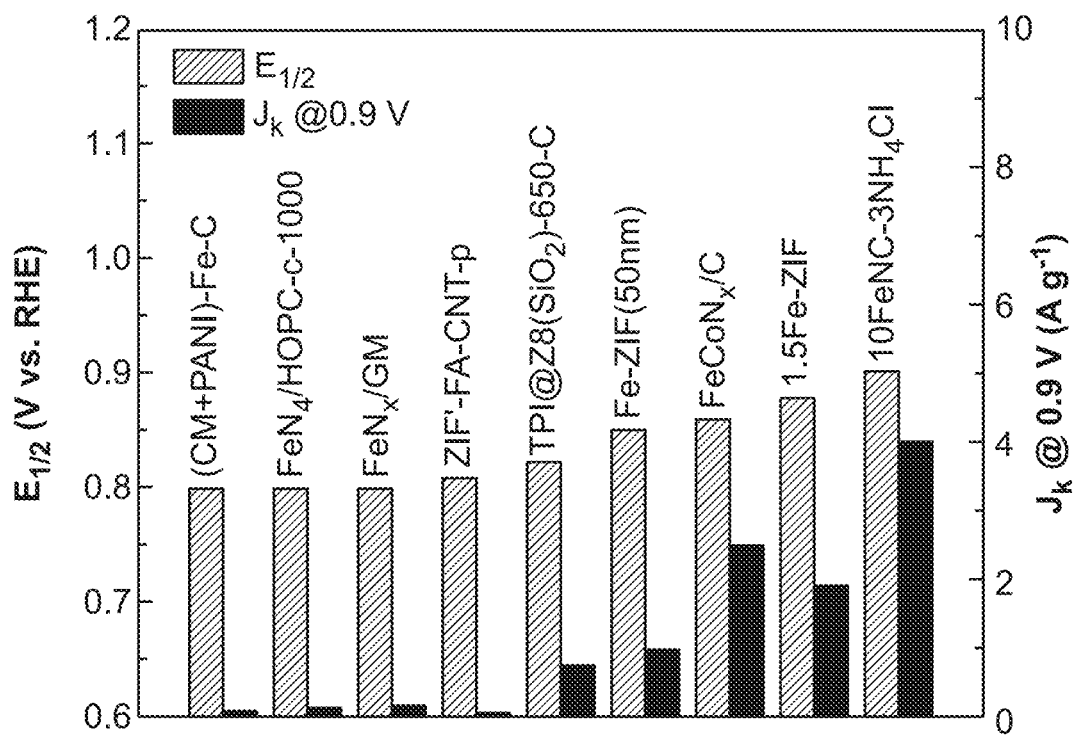
FIG. 31 is a graph comparing kinetic current densities at 0.9 V vs. RHE of a 10FeNC-3NH$_4$Cl catalyst, as well as reported (CM+PANI)—Fe—C, FeN$_4$/HOPC-c-1000, FeN$_x$/GM, ZIF'-FA-CNT-p, TPI@Z8SiO$_2$-650-C, Fe—ZIF (50 nm), FeCoN/C, and 1.5Fe—ZIF catalysts.

The oxygen reduction reaction (ORR) activities of various catalysts were evaluated by using a rotating ring-disk electrode (RRDE) in 0.5 M H$_2$SO$_4$ electrolyte. The ORR activities of 10FeNC-0NH$_4$Cl, 10FeNC-3NH$_4$Cl, and 10FeNC-3NH$_4$Cl-CVD catalysts were first assessed. Referring to FIGS. 29A through 29F and specifically to FIG. 29A, after NH$_4$Cl treatment, the 10FeNC-3NH$_4$Cl catalyst exhibited superior high E$_{1/2}$, reaching to 0.902 V vs. RHE, which is much higher than that of commercial Pt/C (E$_{1/2}$=0.85 V) and of 10FeNC-0NH$_4$Cl (E$_{1/2}$2=0.84 V), and which is higher than previously reported Fe—N—C catalysts (see FIG. 30). Though the current density of the 10FeNC-3NH$_4$Cl catalyst was measured at 900 rpm, it still generated an ultrahigh kinetic current density of 4.0 mA cm$^{-2}$ at 0.9 V, which is much higher than most reported Fe—N—C catalysts (see FIG. 31). By contrast, as compared to the best-performing 10FeNC-3NH$_4$Cl catalyst, the 10FeNC-3NH$_4$Cl-CVD catalyst exhibited a decreased E$_{1/2}$ of 0.846 V, illustrating that repairing carbon defects damages the intrinsic activity of FeN$_4$ active sites. All of the catalysts yielded low peroxide <2% (see FIG. 29B), indicating a complete four-electron ORR pathway.

Figure 32:
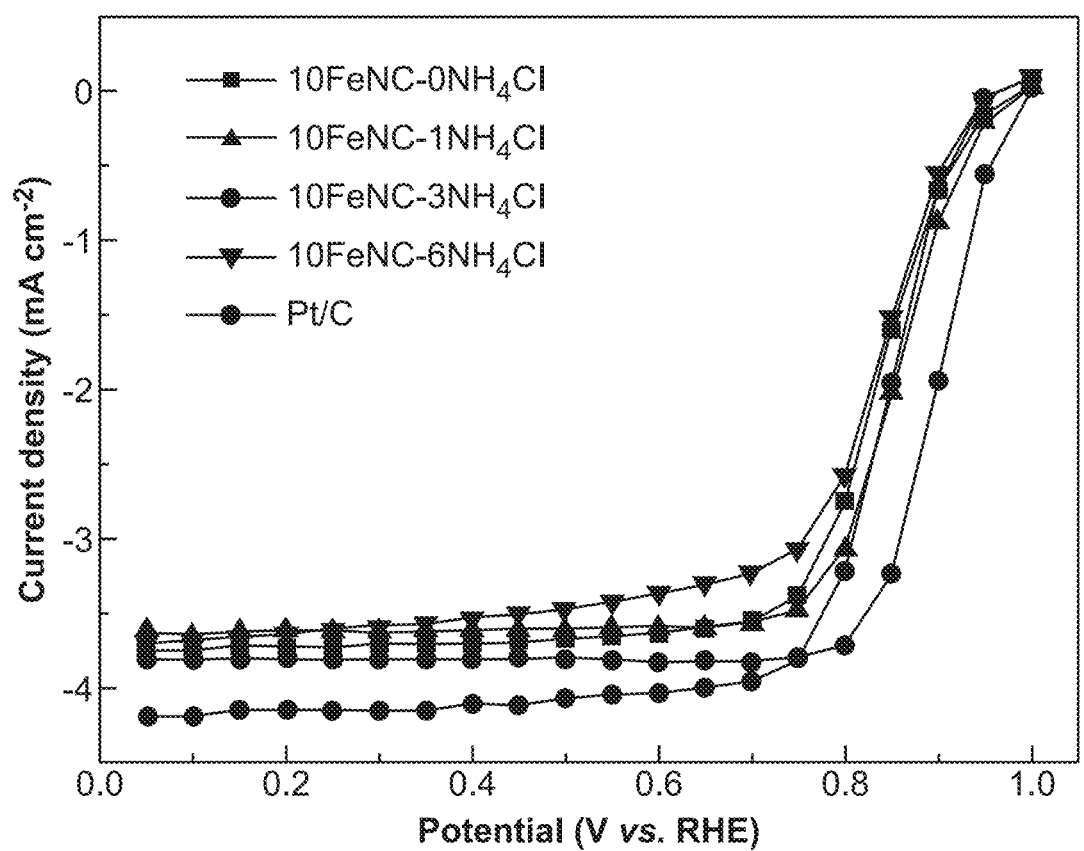
FIG. 32 is a graph comparing steady-state ORR polarization plots of 10FeNC-0NH$_4$Cl, 10FeNC-1NH$_4$Cl, 10FeNC-3NH$_4$Cl, 10FeNC-6NH$_4$Cl and Pt/C catalysts.
Figure 33A:
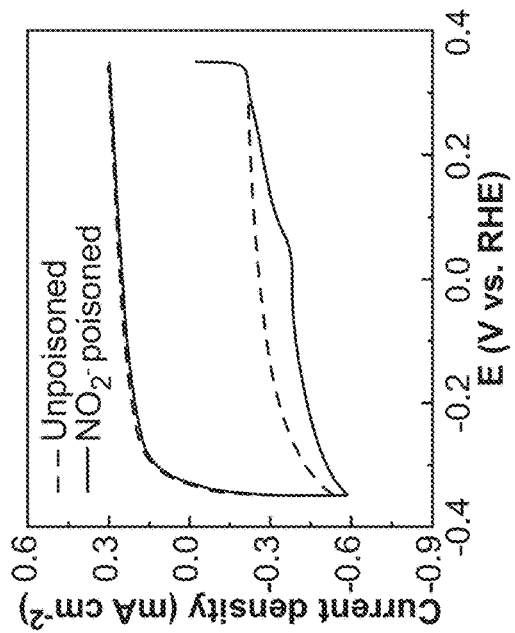
FIG. 33A is a graph depicting linear sweep voltammetry (LSV) curves before, during, and after nitrile adsorption in a 0.5 M acetate buffer at pH 5.2 for a 10FeNC-0NH$_4$Cl catalyst, with catalyst loading of 0.27 mg cm$^{-2}$.
Figure 33B:
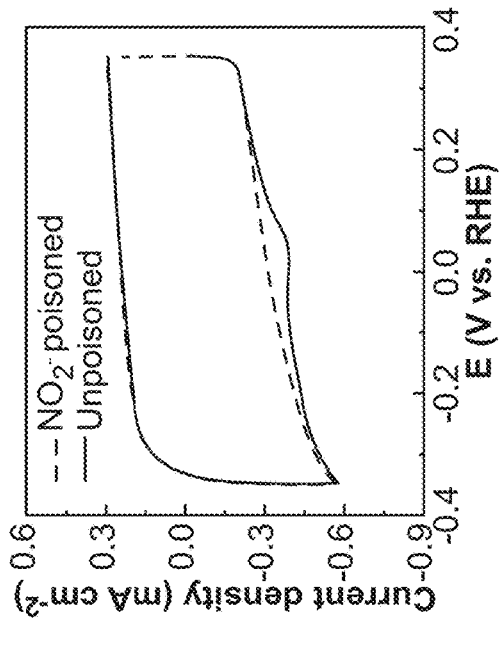
FIG. 33B is a graph depicting cyclic voltammetry (CV) curves before and during nitrile adsorption in the nitrile reductive stripping region for a 10FeNC-0NH$_4$Cl catalyst, with catalyst loading of 0.27 mg cm$^{-2}$.
Figure 33C:
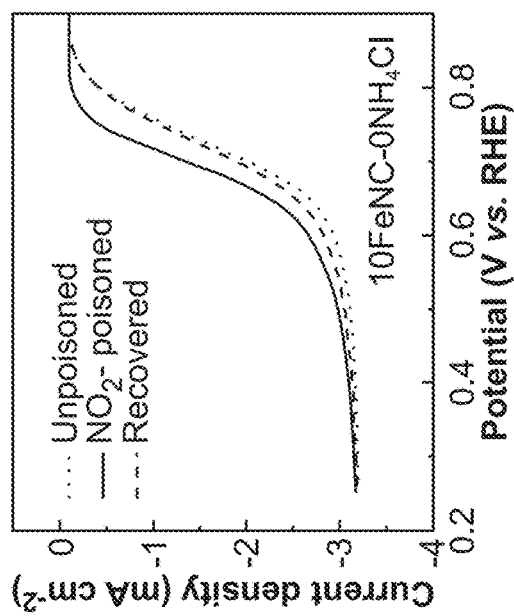
FIG. 33C is a graph depicting linear sweep voltammetry (LSV) curves before, during, and after nitrile adsorption in a 0.5 M acetate buffer at pH 5.2 for a 10FeNC-1NH$_4$Cl catalyst, with catalyst loading of 0.27 mg cm$^{-2}$.
Figure 33D:
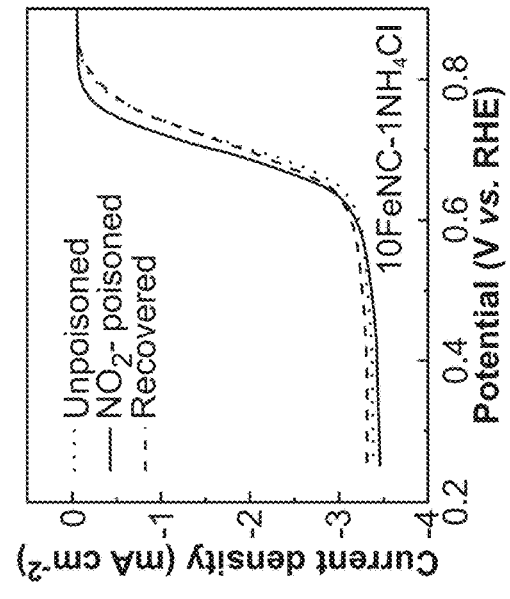
FIG. 33D is a graph depicting cyclic voltammetry (CV) curves before and during nitrile adsorption in the nitrile reductive stripping region for a 10FeNC-1NH$_4$Cl catalyst, with catalyst loading of 0.27 mg cm$^{-2}$.
Figure 33E:
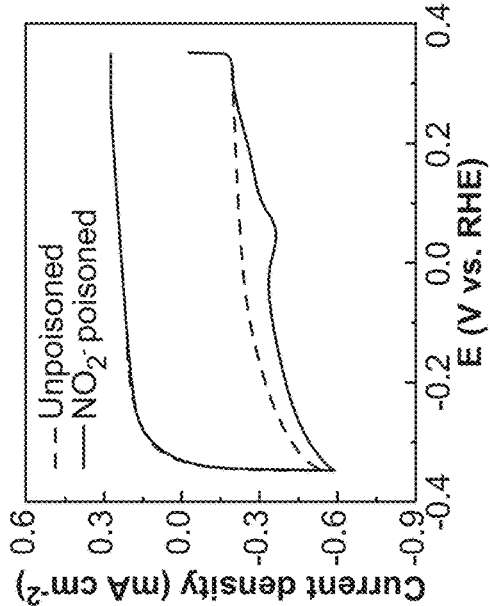
FIG. 33E is a graph depicting linear sweep voltammetry (LSV) curves before, during, and after nitrile adsorption in a 0.5 M acetate buffer at pH 5.2 for a 10FeNC-3NH$_4$Cl catalyst, with catalyst loading of 0.27 mg cm$^{-2}$.
Figure 33F:
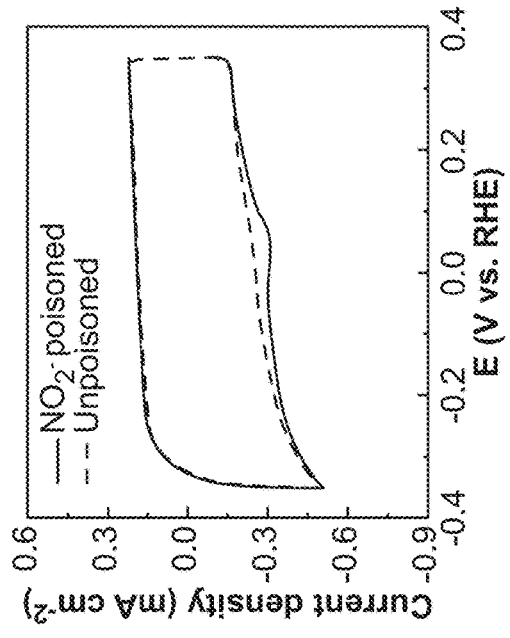
FIG. 33F is a graph depicting cyclic voltammetry (CV) curves before and during nitrile adsorption in the nitrile reductive stripping region for a 10FeNC-3NH$_4$Cl catalyst, with catalyst loading of 0.27 mg cm$^{-2}$.
Figure 33G:
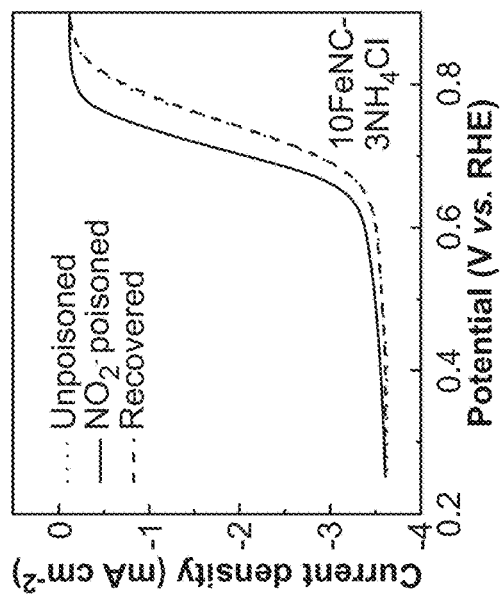
FIG. 33G is a graph depicting linear sweep voltammetry (LSV) curves before, during, and after nitrile adsorption in a 0.5 M acetate buffer at pH 5.2 for a 10FeNC-6NH$_4$Cl catalyst, with catalyst loading of 0.27 mg cm$^{-2}$.
Figure 33H:
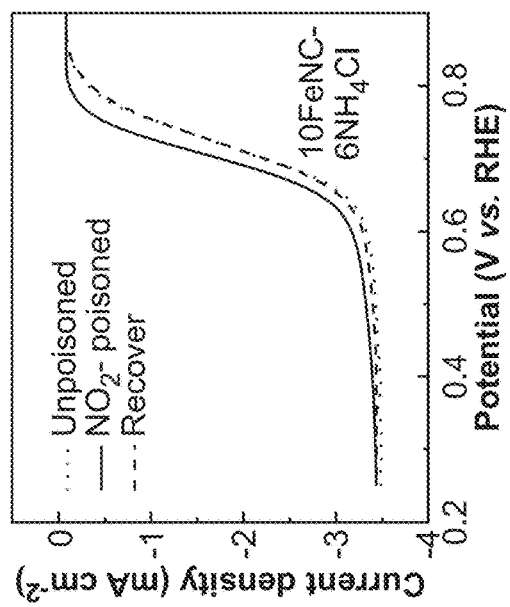
FIG. 33H is a graph depicting cyclic voltammetry (CV) curves before and during nitrile adsorption in the nitrile reductive stripping region for a 10FeNC-6NH$_4$Cl catalyst, with catalyst loading of 0.27 mg cm$^{-2}$.
Figure 34A:
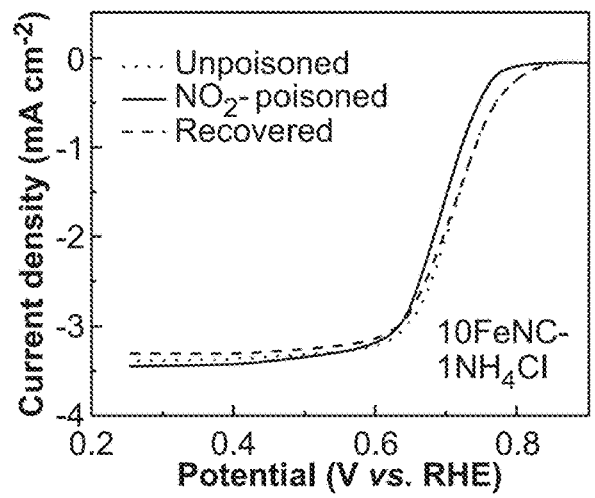
FIG. 34A is a graph depicting linear sweep voltammetry (LSV) curves before, during, and after nitrile adsorption in a 0.5 M acetate buffer at pH 5.2 for a 10FeNC-0NH$_4$Cl catalyst, with catalyst loading of 0.27 mg cm$^{-2}$.
Figure 34B:
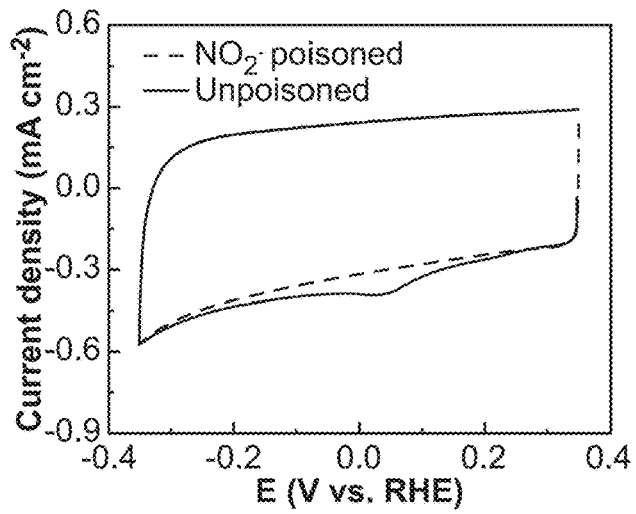
FIG. 34B is a graph depicting cyclic voltammetry (CV) curves before and during nitrile adsorption in the nitrile reductive stripping region for a 10FeNC-0NH$_4$Cl catalyst, with catalyst loading of 0.27 mg cm$^{-2}$.
Figure 34C:
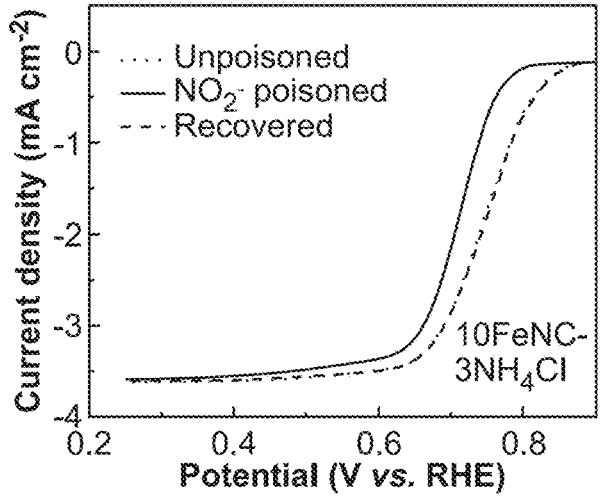
FIG. 34C is a graph depicting linear sweep voltammetry (LSV) curves before, during, and after nitrile adsorption in a 0.5 M acetate buffer at pH 5.2 for a 10FeNC-3NH$_4$Cl catalyst, with catalyst loading of 0.27 mg cm$^{-2}$.
Figure 34D:
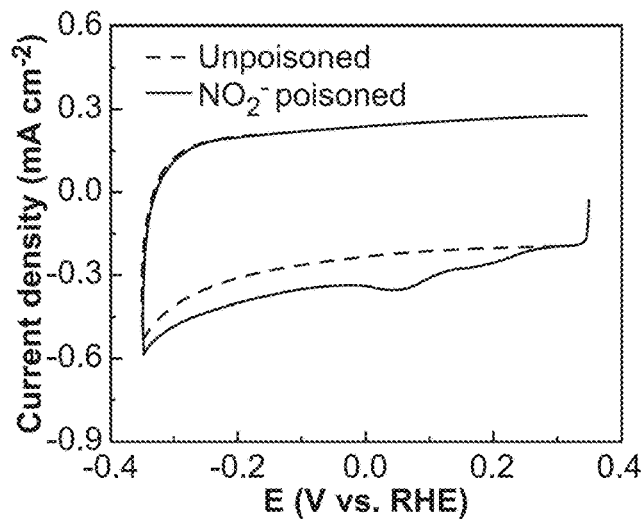
FIG. 34D is a graph depicting cyclic voltammetry (CV) curves before and during nitrile adsorption in the nitrile reductive stripping region for a 10FeNC-3NH$_4$Cl catalyst, with catalyst loading of 0.27 mg cm$^{-2}$.
Figure 34E:
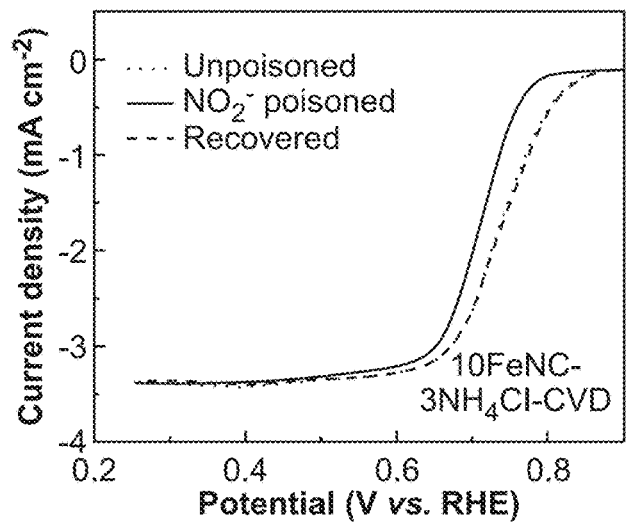
FIG. 34E is a graph depicting linear sweep voltammetry (LSV) curves before, during, and after nitrile adsorption in a 0.5 M acetate buffer at pH 5.2 for a 10FeNC-3NH$_4$Cl-CVD catalyst, with catalyst loading of 0.27 mg cm$^{-2}$.
Figure 34F:
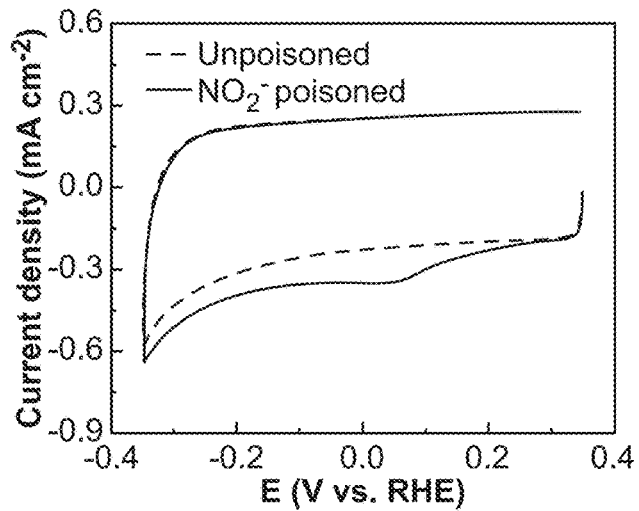
FIG. 34F is a graph depicting cyclic voltammetry (CV) curves before and during nitrile adsorption in the nitrile reductive stripping region for a 10FeNC-3NH$_4$Cl-CVD catalyst, with catalyst loading of 0.27 mg cm$^{-2}$.

The variation in ORR activities of 10FeNC–xNH$_4$Cl (x=0, 1, 3, and 6) catalysts treated with different amounts of NH$_4$Cl was studied to gain insight into how the carbon defects affect the kinetic reaction rate and ORR activity of the catalysts. FIG. 32 shows the resultant ORR activities of 10FeNC–xNH$_4$Cl catalysts treated with different amounts of NH$_4$Cl. Gradually increasing the x value from 0 to 3, the corresponding ORR activities of the 10FeNC–xNH$_4$Cl (x=0, 1, and 3) catalysts gradually improved, with E$_{1/2}$ values of 0.84 V, 0.86 V, and 0.902 V obtained for 10FeNC-0NH$_4$Cl, 10FeNC-1NH$_4$Cl, and 10FeNC-3NH$_4$Cl, respectively. As the NH$_4$Cl amount increased, the ORR activities of the 10FeNC–xNH$_4$Cl catalysts improved. The FeN$_4$ active site densities for 10FeNC-0NH$_4$Cl, 10FeNC-1NH$_4$Cl, and 10FeNC-3NH$_4$Cl catalysts were qualified to provide an understanding of the role of NH$_4$Cl treatment and the role of the carbon vapor deposition of carbon species. As shown in FIGS. 33A-33H, the increase of FeN$_4$ active site densities in 10FeNC–xNH$_4$Cl correlates well with the increasing of NH$_4$Cl treatment. As expected, carbon vapor deposition of carbon species into the 10FeNC-3NH$_4$Cl catalyst is expected to bury some FeN$_4$ active sites in the resulting 10FeNC-3NH$_4$Cl-CVD catalyst, thus making them more inaccessible so that decreased FeN$_4$ active site density is detected (see FIG. 34A-34F). Carbon defects created by NH$_4$Cl treatment lead to an optimized porosity in the catalysts, which is more favorable for site accessibility, thus resulting in the detection of a high FeN$_4$ active site density. The tendency for this result is in good agreement with the measured 10FeNC–xNH$_4$Cl catalysts with a higher x value corresponding to more carbon defects as evidenced by a higher I$_D$/I$_G$ value and BET surface area, leading to the accessibility of more FeN$_4$ active sites. This tendency is also consistent with the theory that carbon defects in the Fe—N—C catalyst regulate the electronic structure of FeN$_4$ active sites, the decreased adsorption energy between FeN$_4$ active sites and oxygen intermediates contributing to the increased kinetic current density and ORR activity. However, further increasing the NH$_4$Cl amount until the x climbs to 6 (i.e., 10FeNC-6NH$_4$Cl catalyst) resulted in a decreased ORR activity due to a great deal of FeN$_4$ active sites that were also etched by excess NH$_4$Cl. This correlates well with the notion that FeN$_4$ active site qualification results (see FIGS. 33G and 33H) from the 10FeNC-6NH$_4$Cl catalyst presenting a reduced FeN$_4$ active site density.

Figure 35:
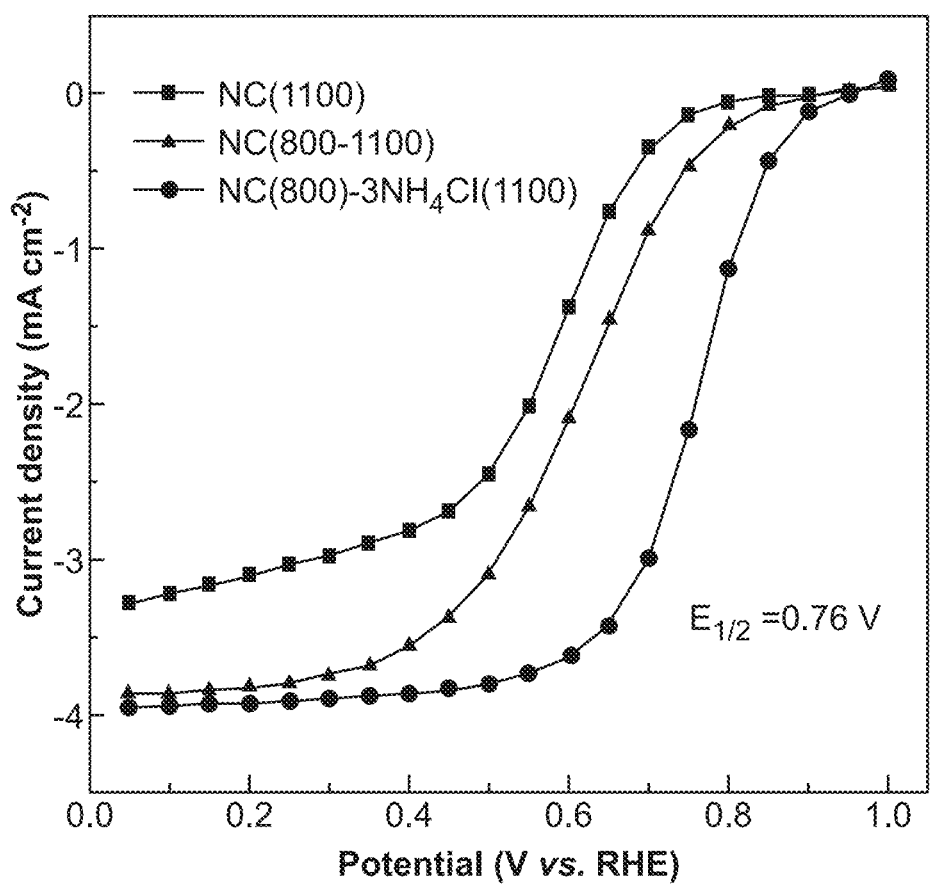
FIG. 35 is a graph depicting steady-state oxygen reduction reaction (ORR) polarization plots of NC(1100), NC(800-1100), and NC(800)-3NH$_4$Cl(1100) catalysts, wherein the NC(1100) catalyst was fabricated by direct pyrolysis of ZIF-8 at 1100° C. for 1 h under Ar gas, wherein the NC(800-1100) catalyst was fabricated by a first pyrolysis of the ZIF-8 at 800° C. for 1 h and a second pyrolysis at 1100° C. for another 1 h under Ar gas, and wherein the NC(800)-3NH$_4$Cl(1100) catalyst was prepared by a first pyrolysis of the ZIF-8 at 800° C. under Ar gas for 1 h, then taken out and mixed well with NH$_4$Cl (3 represents the mass ratio of NH$_4$Cl to NC(800)), and then a second pyrolysis at 1100° C. for another 1 h under Ar gas.
Figure 36:
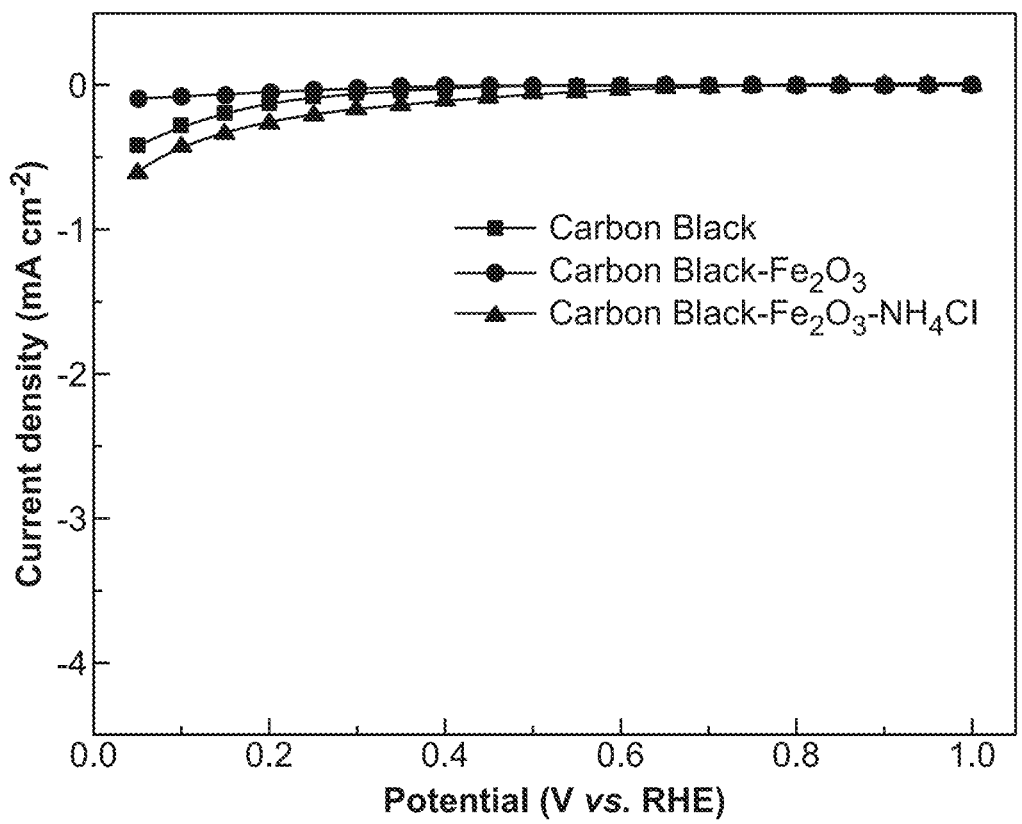
FIG. 36 is a graph depicting steady-state ORR polarization plots of Carbon Black, Carbon Black-Fe$_2$O$_3$, and Carbon Black-Fe$_2$O$_3$—NH$_4$Cl catalysts, wherein Carbon Black-Fe$_2$O$_3$ was fabricated by pyrolysis of well-mixed Carbon Black-Fe$_2$O$_3$ at 1100° C. for 1 h under Ar gas, and wherein Carbon Black-Fe$_2$O$_3$—NH$_4$Cl was prepared by a first pyrolysis of the Carbon Black-Fe$_2$O$_3$ at 800° C. under Ar gas for 1 h, then taken out and mixed well with NH$_4$Cl and a second pyrolysis at 1100° C. for another 1 h under Ar gas.
Figure 37:
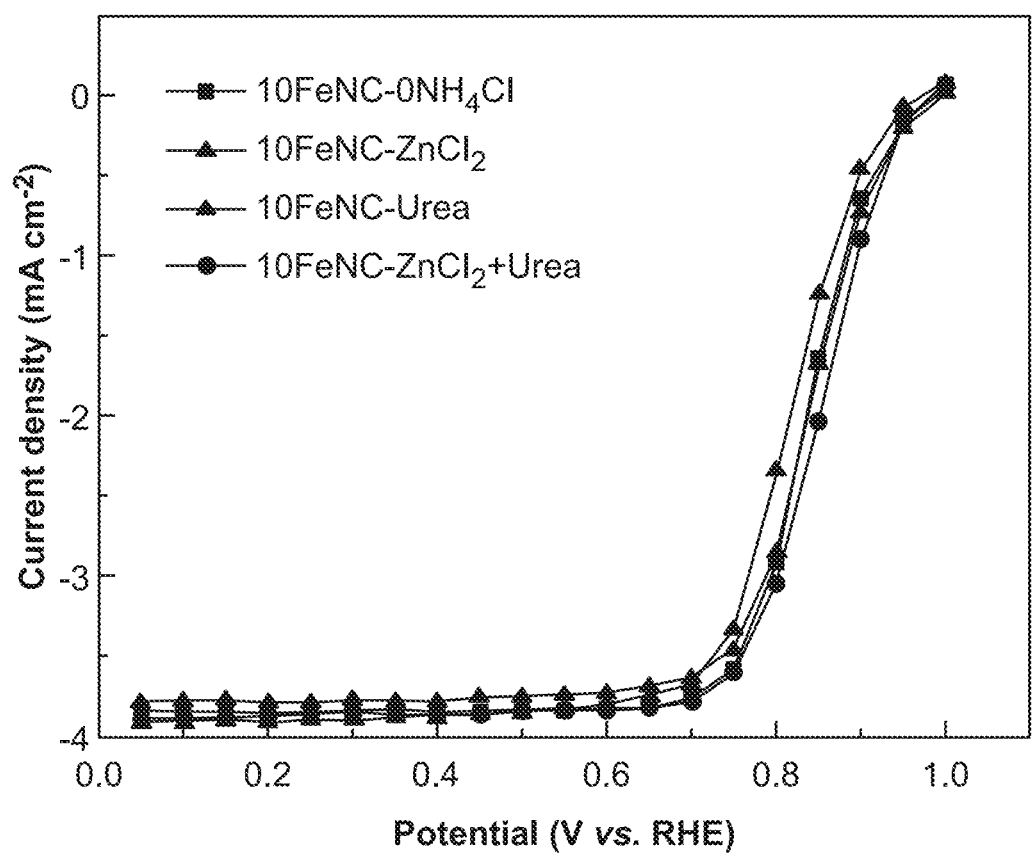
FIG. 37 is a graph depicting steady-state ORR polarization plots of 10FeNC-0NH$_4$Cl, 10FeNC—ZnCl$_2$, 10FeNC-Urea, and 10FeNC—ZnCl$_2$-Urea catalysts, wherein 10FeNC—ZnCl$_2$ was prepared by a first pyrolysis of a 10Fe$_2$O$_3$@ZIF-8 composite at 800° C. for 1 h under Ar gas, then taken out and mixed well with ZnCl$_2$ and a the second pyrolysis at 1100° C. for 1 h under Ar gas, and wherein 10FeNC-Urea and 10FeNC—ZnCl$_2$+Urea catalysts were synthesized with similar procedures, except that the ZnCl$_2$ was replaced by urea or by a mixture of urea and ZnCl$_2$, respectively.

The unveiled relationship between ORR activity and the physical structure of catalysts integrates with the predicted theory and controlled electrochemical experiment results (see FIGS. 35 through 37), and the present inventors demonstrate that the controllable generation of carbon defects in the catalyst is capable of regulating the electronic structure of FeN$_4$ active sites, thus leading to an alteration of adsorption energies of O$_2$ and other intermediates on the FeN$_4$ active sites.

Figure 38:
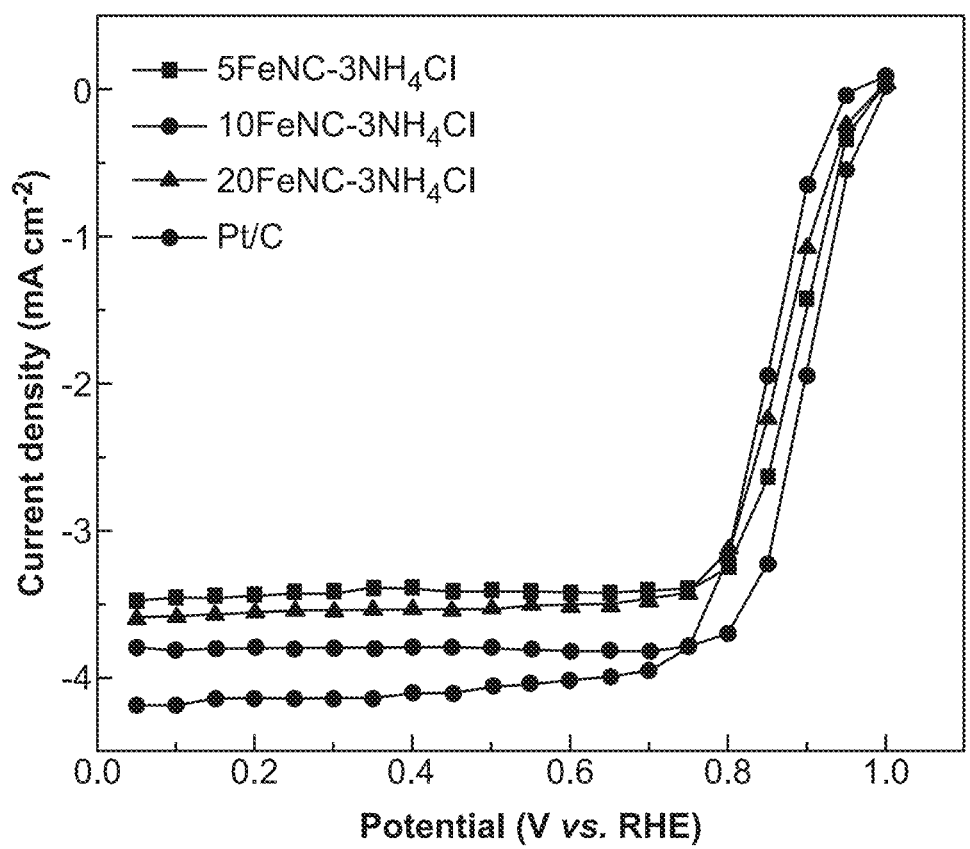
FIG. 38 is a graph depicting steady-state ORR polarization plots of 5FeNC-3NH$_4$Cl, 10FeNC-3NH$_4$Cl, 20FeNC-3NH$_4$Cl, and Pt/C catalysts.
Figure 39A:
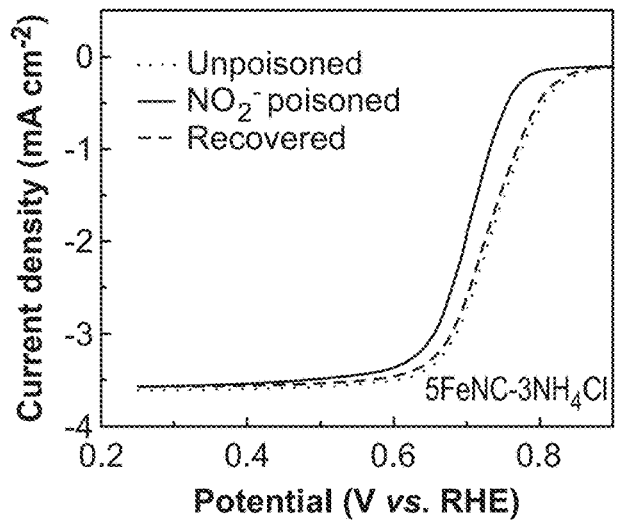
FIG. 39A is a graph depicting linear sweep voltammetry (LSV) curves before, during, and after nitrile adsorption in a 0.5 M acetate buffer at pH 5.2 for a 5FeNC-3NH$_4$Cl catalyst, with catalyst loading of 0.27 mg cm$^{-2}$.
Figure 39B:
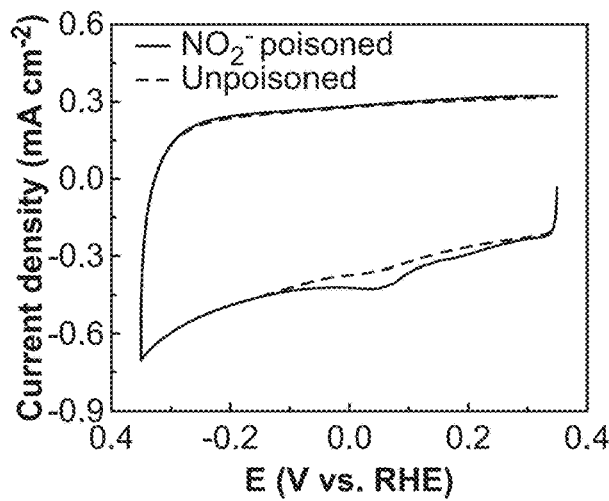
FIG. 39B is a graph depicting cyclic voltammetry (CV) curves before and during nitrile adsorption in the nitrile reductive stripping region for a 5FeNC-3NH$_4$Cl catalyst, with catalyst loading of 0.27 mg cm$^{-2}$.
Figure 39C:
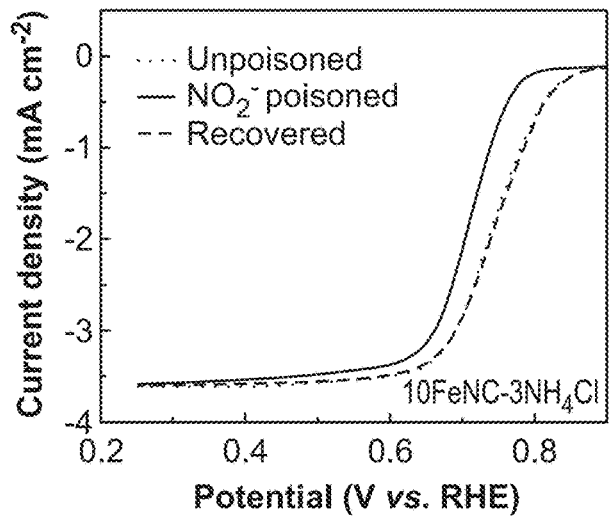
FIG. 39C is a graph depicting linear sweep voltammetry (LSV) curves before, during, and after nitrile adsorption in a 0.5 M acetate buffer at pH 5.2 for a 10FeNC-3NH$_4$Cl catalyst, with catalyst loading of 0.27 mg cm$^{-2}$.
Figure 39D:
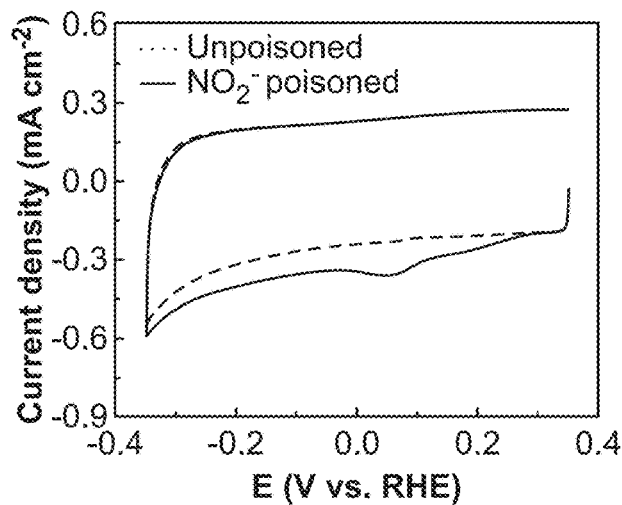
FIG. 39D is a graph depicting cyclic voltammetry (CV) curves before and during nitrile adsorption in the nitrile reductive stripping region for a 10FeNC-3NH$_4$Cl catalyst, with catalyst loading of 0.27 mg cm$^{-2}$.
Figure 39E:
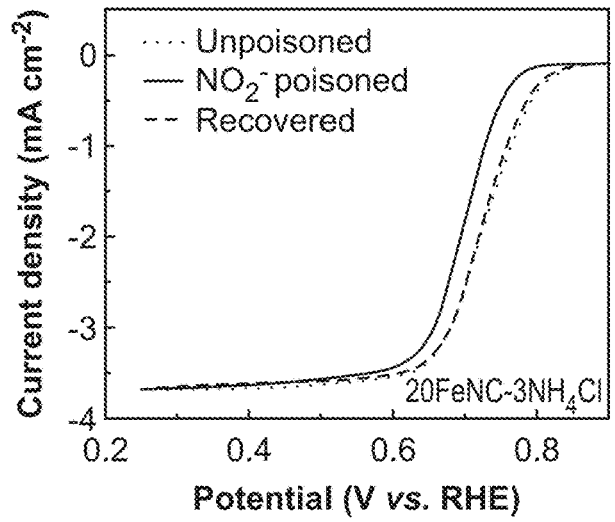
FIG. 39E is a graph depicting linear sweep voltammetry (LSV) curves before, during, and after nitrile adsorption in a 0.5 M acetate buffer at pH 5.2 for a 20FeNC-3NH$_4$Cl catalyst, with catalyst loading of 0.27 mg cm$^{-2}$.
Figure 39F:
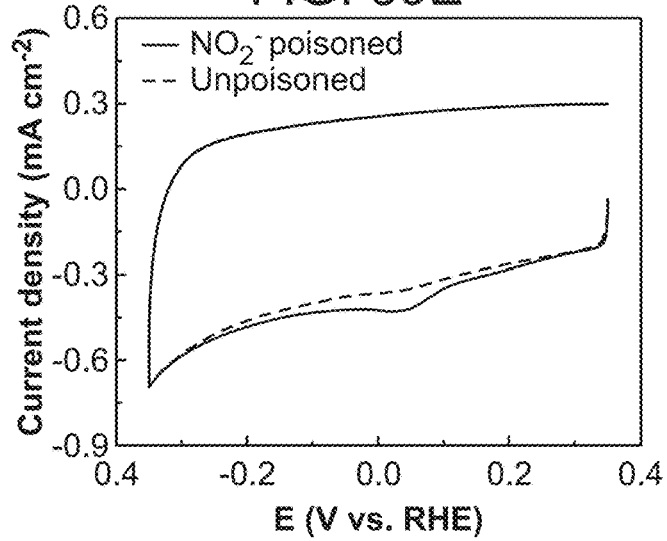
FIG. 39F is a graph depicting cyclic voltammetry (CV) curves before and during nitrile adsorption in the nitrile reductive stripping region for a 20FeNC-3NH$_4$Cl catalyst, with catalyst loading of 0.27 mg cm$^{-2}$.
Figures 40A, 40B, 40C:
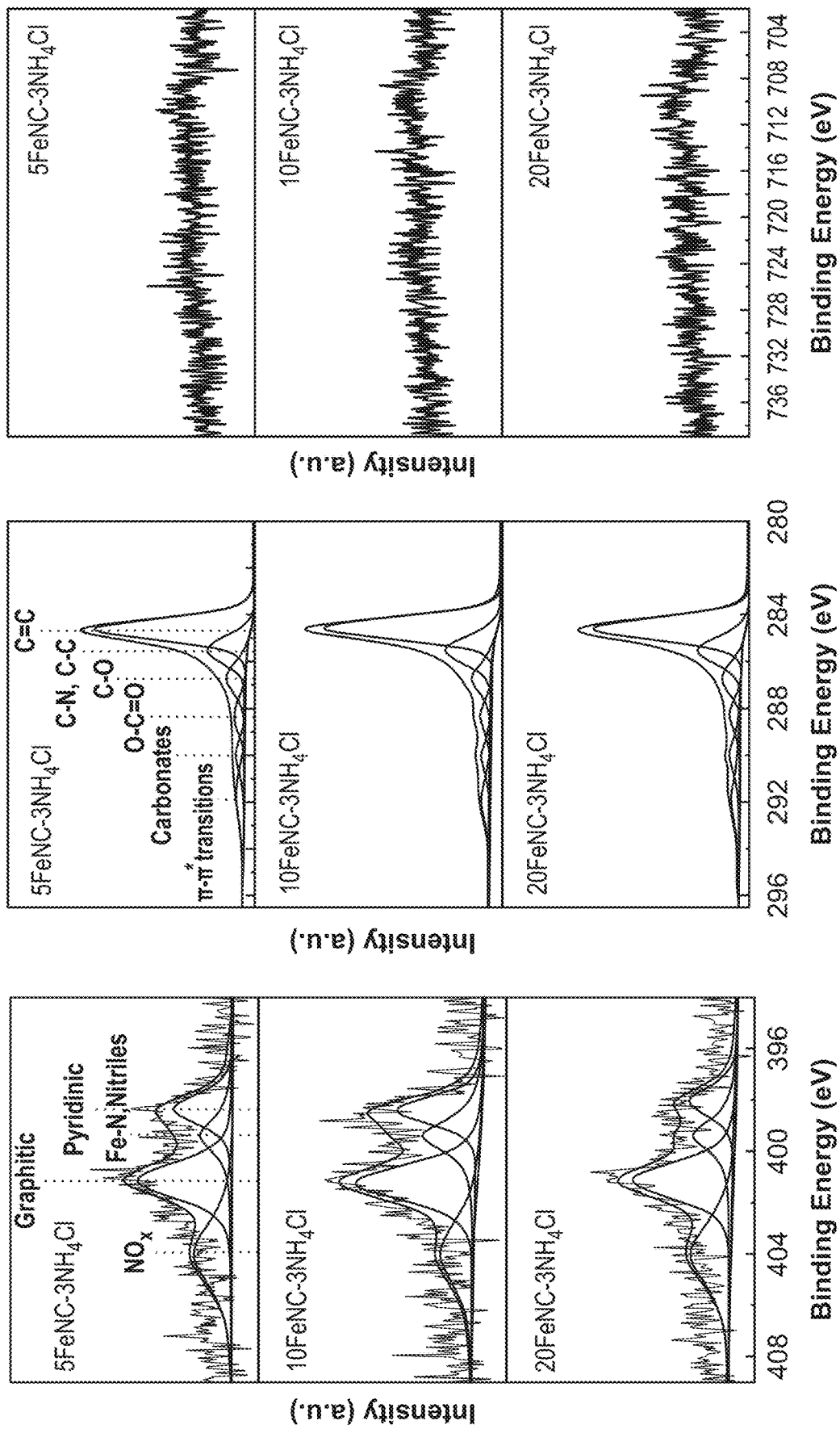
FIG. 40A is a graph depicting X-ray photoelectron spectroscopy (XPS) analysis of nitrogen doping for 5FeNC-3NH$_4$Cl, 10FeNC-3NH$_4$Cl, and 20FeNC-3NH$_4$Cl catalysts.
FIG. 40B is a graph depicting X-ray photoelectron spectroscopy (XPS) analysis of carbon structure for 5FeNC-3NH$_4$Cl, 10FeNC-3NH$_4$Cl, and 20FeNC-3NH$_4$Cl catalysts.
FIG. 40C is a graph depicting X-ray photoelectron spectroscopy (XPS) analysis of iron species for 5FeNC-3NH$_4$Cl, 10FeNC-3NH$_4$Cl, and 20FeNC-3NH$_4$Cl catalysts.
Figure 43:
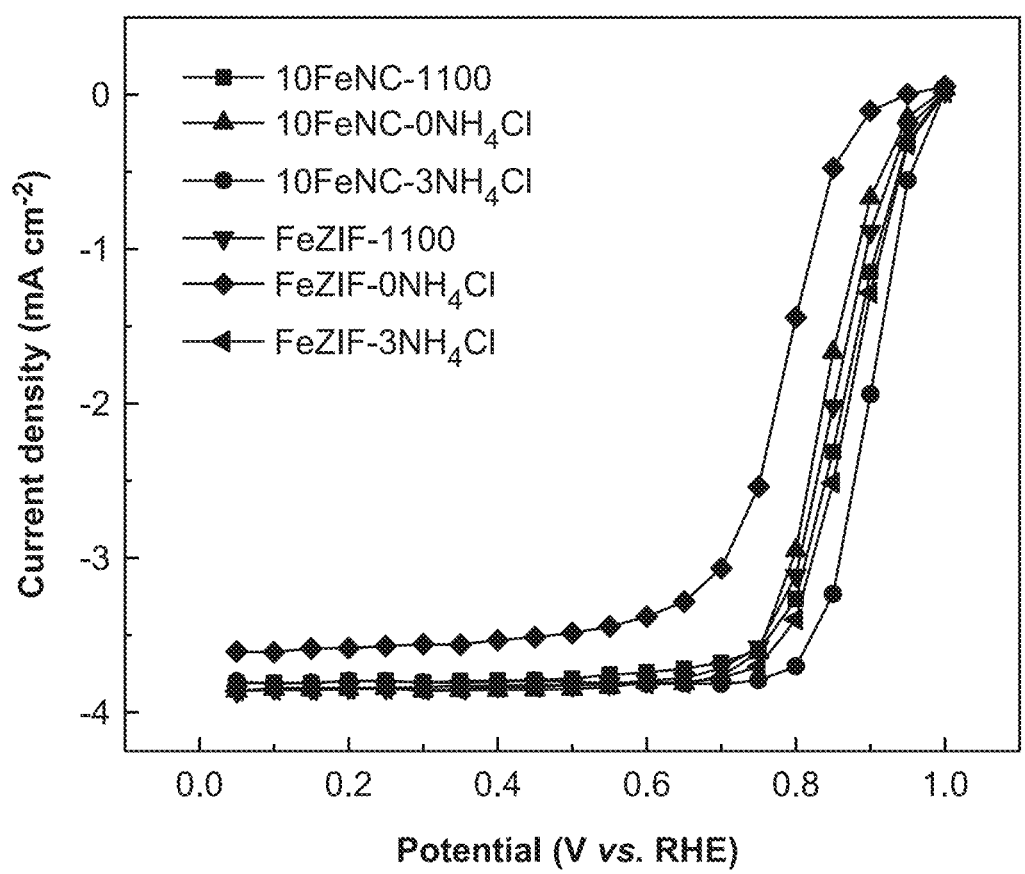
FIG. 43 is a graph depicting steady-state ORR polarization plots of 10FeNC-1100, 10FeNC-0NH$_4$Cl, 10FeNC-3NH$_4$Cl, FeZIF-1100, FeZIF—0NH$_4$Cl, and FeZIF-3NH$_4$Cl catalysts, wherein the 10FeNC-1100, 10FeNC-0NH$_4$Cl, and 10FeNC-3NH$_4$Cl catalysts were prepared using Fe$_2$O$_3$ as the iron source, wherein the FeZIF-1100, FeZIF—0NH$_4$Cl, FeZIF-3NH$_4$Cl catalysts were fabricated using Fe$^{3+}$ as the iron source, with FeZIF-1100 prepared by direct pyrolysis of the Fe doped ZIF-8 at 1100° C. for 1 h under Ar gas, with FeZIF—0NH$_4$Cl fabricated by a first pyrolysis of the Fe doped ZIF-8 at 800° C. for 1 h and a second pyrolysis at 1100° C. for another 1 h under Ar gas, and with FeZIF-3NH$_4$Cl fabricated by pyrolyzing Fe doped ZIF-8 precursors at 800° C. for 1 h under Ar gas to obtain FeZIF-800, then 100 mg FeZIF-800 ground with 300 mg NH$_4$Cl powder, and then a second pyrolysis performed at 1100° C. under Ar flow for 1 h.
Figure 44A:
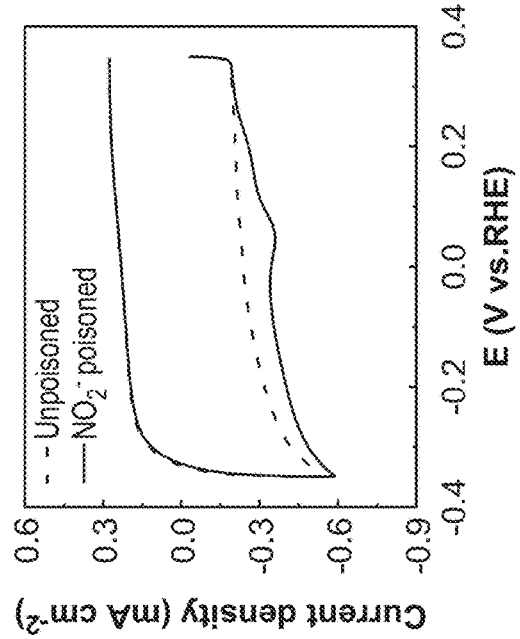
FIG. 44A is a graph depicting linear sweep voltammetry (LSV) curves before, during, and after nitrile adsorption in a 0.5 M acetate buffer at pH 5.2 for a 10FeNC-3NH$_4$Cl catalyst, with catalyst loading of 0.27 mg cm$^{-2}$.
Figure 44B:
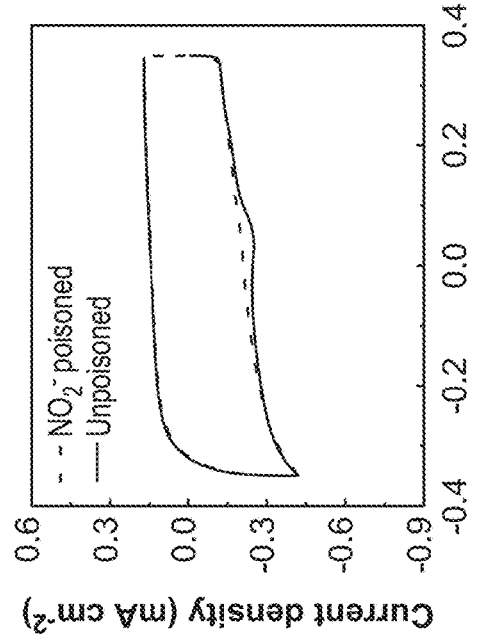
FIG. 44B is a graph depicting cyclic voltammetry (CV) curves before and during nitrile adsorption in the nitrile reductive stripping region for a 10FeNC-3NH$_4$Cl catalyst, with catalyst loading of 0.27 mg cm$^{-2}$.
Figure 44C:
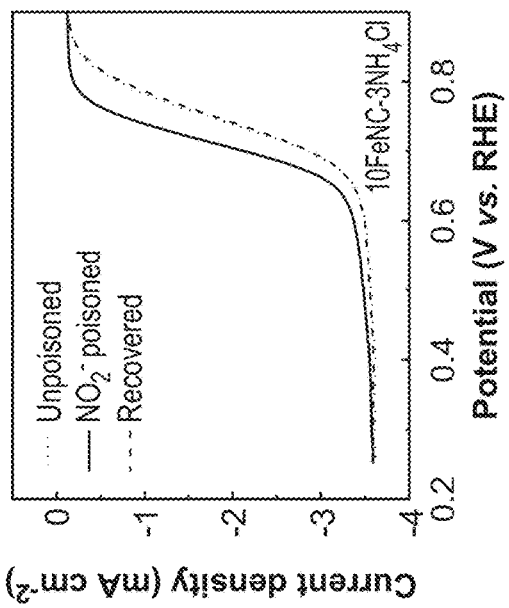
FIG. 44C is a graph depicting linear sweep voltammetry (LSV) curves before, during, and after nitrile adsorption in a 0.5 M acetate buffer at pH 5.2 for a FeZIF-3NH$_4$Cl catalyst, with catalyst loading of 0.27 mg cm$^{-2}$.
Figure 44D:
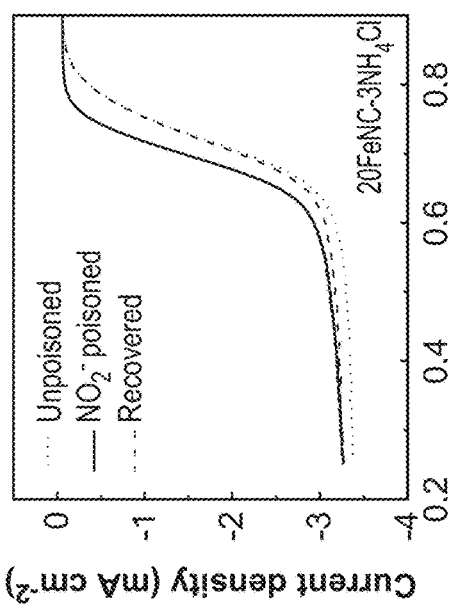
FIG. 44D is a graph depicting cyclic voltammetry (CV) curves before and during nitrile adsorption in the nitrile reductive stripping region for a FeZIF-3NH$_4$Cl catalyst, with catalyst loading of 0.27 mg cm$^{-2}$.
Figure 45A:
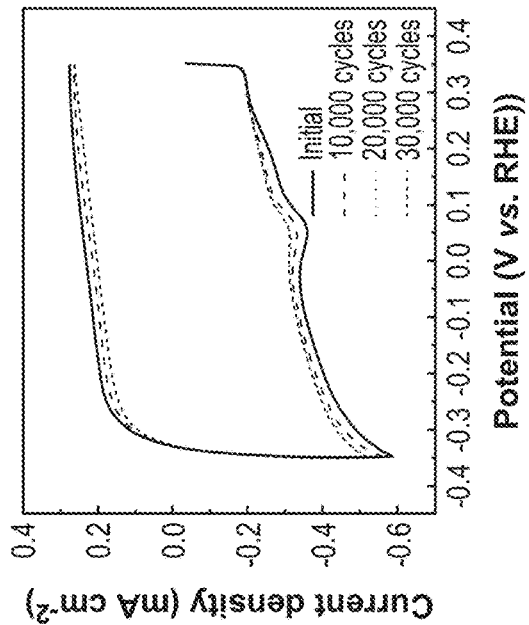
FIG. 45A is a graph depicting cyclic voltammetry (CV) curves of nitrite adsorption in the nitrite reductive stripping region of a 10FeNC-0NH$_4$Cl catalyst recorded at intervals of 0 cycles, 10,000 cycles, 20,000 cycles, and 30,000 cycles during stability accelerated stress (AST) tests.
Figure 45B:
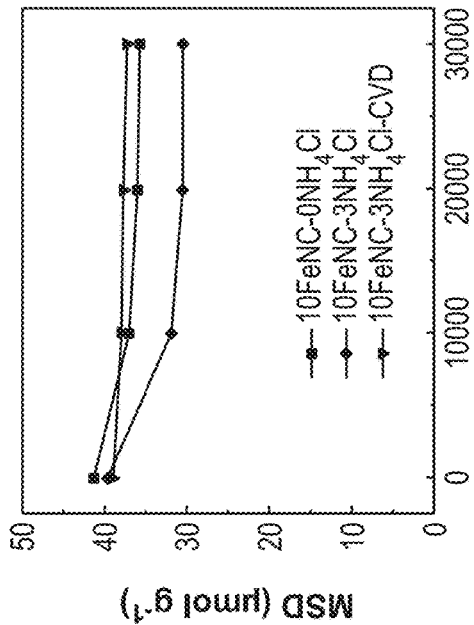
FIG. 45B is a graph depicting cyclic voltammetry (CV) curves of nitrite adsorption in the nitrite reductive stripping region of a 10FeNC-3NH$_4$Cl catalyst recorded at intervals of 0 cycles, 10,000 cycles, 20,000 cycles, and 30,000 cycles during stability accelerated stress (AST) tests.
Figure 45C:
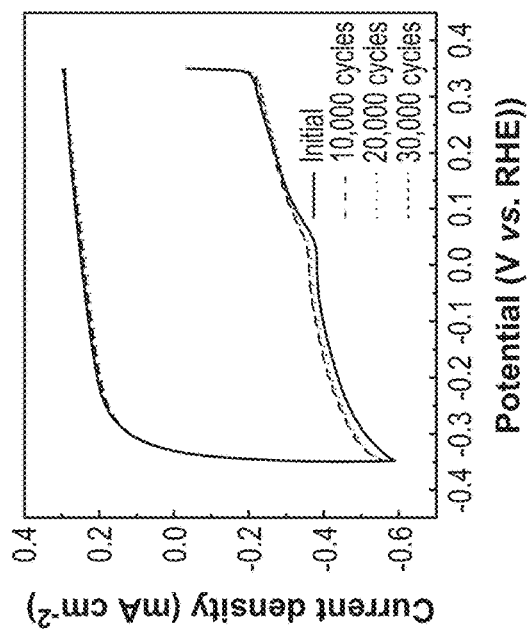
FIG. 45C is a graph depicting cyclic voltammetry (CV) curves of nitrite adsorption in the nitrite reductive stripping region of a 10FeNC-3NH$_4$Cl-CVD catalyst recorded at intervals of 0 cycles, 10,000 cycles, 20,000 cycles, and 30,000 cycles during stability accelerated stress (AST) tests.
Figure 45D:
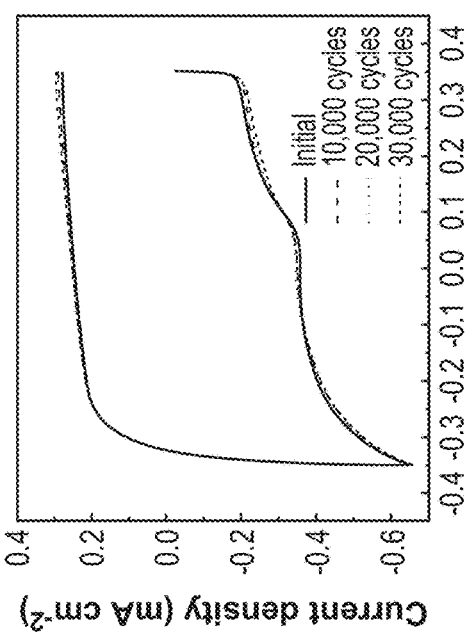
FIG. 45D is a graph comparing degradation in FeN$_4$ site density (SD) of 10FeNC-0NH$_4$Cl, 10FeNC-3NH$_4$Cl, and 10FeNC-3NH$_4$Cl-CVD catalysts through reversible nitrite poisoning.

From the above, the present inventors believe that optimized electronic structure and porous structure, along with the improvement of FeN$_4$ active site density, together contribute to the superior ORR activity of the 10FeNC-3NH$_4$Cl catalyst. The effect of Fe$_2$O$_3$ content in Fe$_2$O$_3$@ZIF-8 composites on ORR activity and FeN$_4$ active site density of catalysts derived therefrom was also investigated. The reduced ORR activities (see FIG. 38) and FeN$_4$ active site densities (see FIG. 30, FIGS. 39A through 39F, FIGS. 40A through 40C, FIG. 41 and FIG. 42) of 5FeNC-3NH$_4$Cl and 20FeNC-3NH$_4$Cl catalysts indicate that regulating Fe$_2$O$_3$ content in a precursor is very important for achieving a maximum density of FeN$_4$ active sites in the derived catalyst. Meanwhile, the ORR activity of a FeZIF-3NH$_4$Cl catalyst fabricated from traditional Fe$^{3+}$ as the Fe source was also improved after NH$_4$Cl treatment (see FIG. 43), demonstrating that the engineering of the carbon structure of Fe—N—C catalysts via NH$_4$Cl treatment is effective to be a universal method capable of boosting ORR activity. From FIGS. 4A through 4D and FIGS. 44A through 44D, it is noted not only that FeN$_4$ active site density in 10FeNC-1100 (SD=1.49×10$^{-4}$ μmol g$^{-1}$) is much higher than that of FeZIF-1100 (SD=8.30×10$^{-5}$ μmol g$^{-1}$) but also that the 10FeNC-3NH$_4$Cl (1.79×10$^{-4}$ μmol g$^{-1}$) contains a higher FeN$_4$ active site density than does FeZIF-3NH$_4$Cl (1.66× 10$^{-4}$ μmol g$^{-1}$) after NH$_4$Cl treatment, further confirming that solid-state Fe$_2$O$_3$ is more beneficial as an Fe source for generating high FeN$_4$ active site density in Fe—N—C catalysts than traditional Fe$^{3+}$ and Fe-based molecules.

Figure 29A:
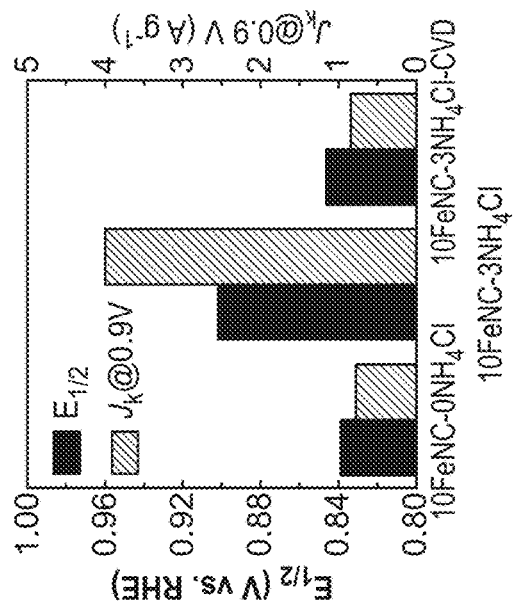
FIG. 29A is a graph depicting steady-state oxygen reduction reaction (ORR) polarization plots of 10FeNC-0NH$_4$Cl, 10FeNC-3NH$_4$Cl, 10FeNC-3NH$_4$Cl-CVD, and Pt/C catalysts tested in 0.5 M H$_2$SO$_4$.
Figure 29D:
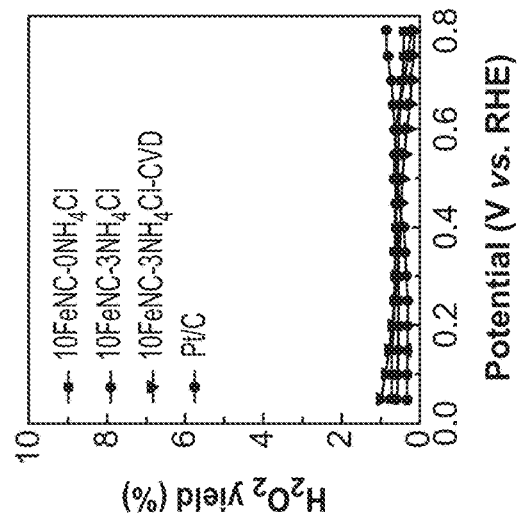
FIG. 29D is a graph showing the results of a stability accelerated stress test (AST) performed by cycling the potential (0.6-1.0 V, 30,000 cycles) in O$_2$-saturated 0.5 M H$_2$SO$_4$ for 10FeNC-0NH$_4$Cl.
Figure 29B:
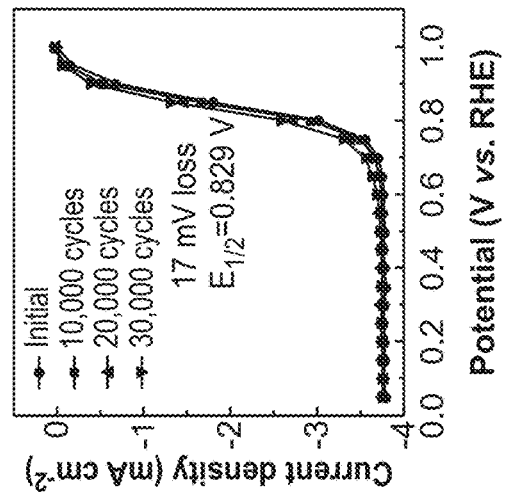
FIG. 29B is a graph depicting H$_2$O$_2$ yields of 10FeNC-0NH$_4$Cl, 10FeNC-3NH$_4$Cl, 10FeNC-3NH$_4$Cl-CVD, and Pt/C catalysts tested in 0.5 M H$_2$SO$_4$.
Figure 29E:
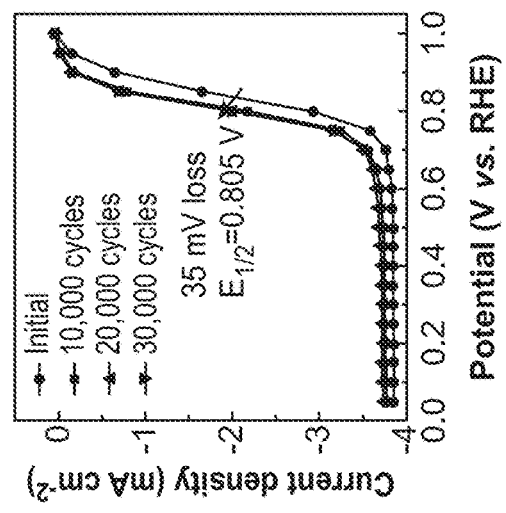
FIG. 29E is a graph showing the results of a stability accelerated stress test (AST) performed by cycling the potential (0.6-1.0 V, 30,000 cycles) in O$_2$-saturated 0.5 M H$_2$SO$_4$ for 10FeNC-3NH$_4$Cl.
Figure 29C:
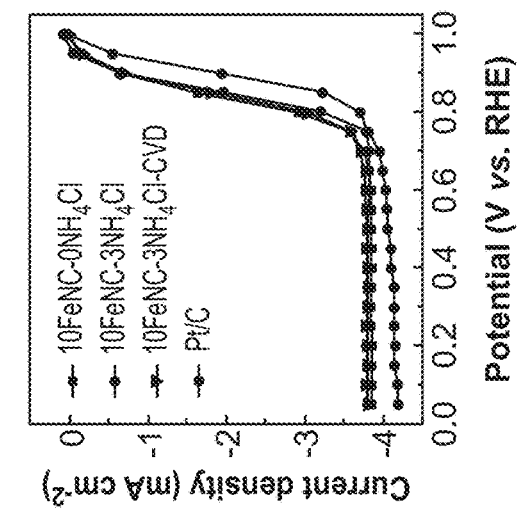
FIG. 29C is a graph comparing the $E_{1/2}$ and kinetic current densities at 0.9 V vs. reversible hydrogen electrode (RHE) of 10FeNC-0NH$_4$Cl, 10FeNC-3NH$_4$Cl and 10FeNC-3NH$_4$Cl-CVD catalysts.
Figure 29F:
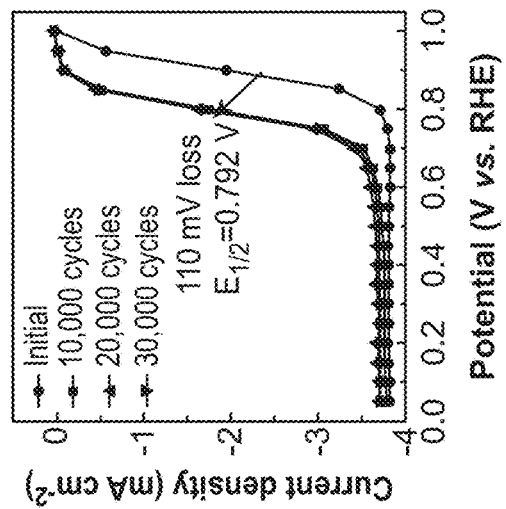
FIG. 29F is a graph showing the results of a stability accelerated stress test (AST) performed by cycling the potential (0.6-1.0 V, 30,000 cycles) in O$_2$-saturated 0.5 M H$_2$SO$_4$ for 10FeNC-3NH$_4$Cl-CVD.

The present inventors believe that the amount of carbon defects in the Fe—N—C catalyst is the main factor regulating the ORR activity. However, too many carbon defects created in the Fe—N—C catalyst leads to the easy oxidization of carbon structure and demetalation of FeN$_4$ active sites, which lowers the stability of the catalyst. Consequently, not only creating carbon defects in the catalyst but also reducing the number of carbon defects in the catalyst is critical not only for regulating ORR activity but also for enhancing stability. A high degree of graphitization is known to be able to boost corrosion resistance of the carbon structure and to shield the hosted FeN$_4$ active sites. The corresponding ORR stabilities of 10FeNC-0NH$_4$Cl, 10FeNC-3NH$_4$Cl, and 10FeNC-3NH$_4$Cl-CVD catalysts were measured in a 0.5 M H$_2$SO$_4$ solution through the accelerated stress test (AST) technique by cycling the potential at 0.6-1.0 V for 30,000 cycles. As shown in FIGS. 29D through 29F, the 10FeNC-0NH$_4$Cl catalyst showed some promising stability, namely, a 35 mV loss in E$_{1/2}$ after the AST stability test. However, after NH$_4$Cl treatment, the 10FeNC-3NH$_4$Cl catalyst presented deteriorative stability. After 10,000 cycles, the 10FeNC-3NH$_4$Cl catalyst exhibited a rapid ORR activity decrease, with a loss of 110 mV in E$_{1/2}$. However, the catalyst remained stable after an initial ORR activity loss in the first 10,000 cycles, which still presented a high ORR activity with E$_{1/2}$ of 0.792 V after 30,000 cycles. By contrast, the 10FeNC-3NH$_4$Cl-CVD catalyst with many of the carbon defects repaired delivered tremendously reinforced stability. The 10FeNC-3NH$_4$Cl-CVD catalyst generated an initial E$_{1/2}$ of 0.846 V, and its final E$_{1/2}$ reached 0.829 V after 30,000 cycles, with only a 17 mV loss in E$_{1/2}$ (see FIG. 29E). Remarkably, only a 5 mV loss was recorded in the first 10,000 cycles, which was distinct from the reported Fe—N—C catalysts suffering a rapid decay in the first stage of the stability test in an acid electrolyte.

Figure 46C:
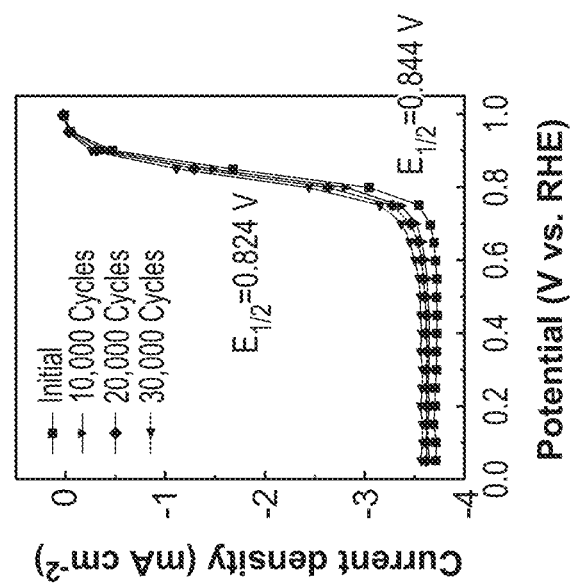
FIG. 46C is a graph showing the results of stability accelerated stress (AST) tests run by cycling potential (0.6-1.0 V) in O$_2$-saturated 0.5 M H$_2$SO$_4$, with steady-state oxygen reduction reaction (ORR) polarization plots recorded at intervals of 0 cycles, 10,000 cycles, 20,000 cycles, and 30,000 cycles for a 10FeNC-3NH$_4$Cl-CVD catalyst.
Figure 46B:
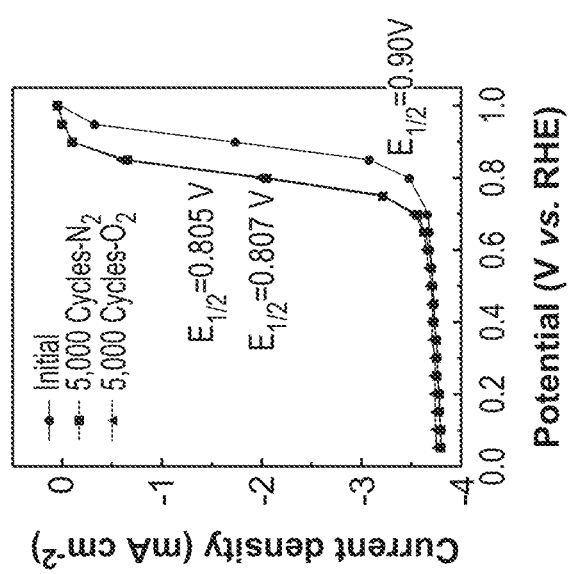
FIG. 46B is a graph showing the results of stability accelerated stress (AST) tests run by cycling potential (0.6-1.0 V) in O$_2$-saturated 0.5 M H$_2$SO$_4$, with steady-state oxygen reduction reaction (ORR) polarization plots recorded at intervals of 0 cycles and 5,000 cycles for a 10FeNC-3NH$_4$Cl catalyst.
Figure 46A:
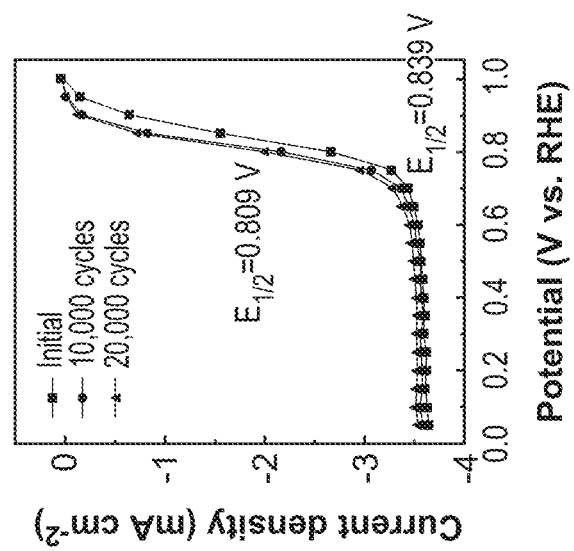
FIG. 46A is a graph showing the results of stability accelerated stress (AST) tests run by cycling potential (0.6-1.0 V) in O$_2$-saturated 0.5 M H$_2$SO$_4$, with steady-state oxygen reduction reaction (ORR) polarization plots recorded at intervals of 0 cycles, 10,000 cycles, and 20,000 cycles for a 10FeNC-0NH$_4$Cl catalyst.

To understand the degradation mechanism of 10FeNC-0NH$_4$Cl, 10FeNC-3NH$_4$Cl and 10FeNC-3NH$_4$Cl-CVD catalysts, the variation of FeN$_4$ active site densities of the catalysts was traced simultaneously when recording the LSV curves during the AST test. Interestingly, as shown in FIGS. 45A through 45D, it was observed that the tendency of FeN$_4$ active site densities for the catalysts to be reduced was consistent with the E$_{1/2}$ loss trend in their corresponding ORR activities. The 10FeNC-3NH$_4$Cl catalyst owns a higher FeN$_4$ active site density (1.79×10$^{-4}$ μmol g$^{-1}$) at an initial stage than does 10FeNC-0NH$_4$Cl catalyst (1.58×10$^{-4}$ μmol g$^{-1}$). This is due to the carbon structure being etched by NH$_4$Cl treatment, with additional carbon defects and pore volume rendering more FeN$_4$ active sites accessible. However, the 10FeNC-3NH$_4$Cl catalyst suffered a faster FeN$_4$ active site loss after a 10,000 cycles AST test, with an 18% FeN$_4$ active site density loss versus a 4.4% loss in the relatively durable 10FeNC-0NH$_4$Cl catalyst. After the rapid loss of FeN$_4$ active sites in the first 10,000 cycles AST, both underwent a subtle loss in the next 20,000 and 30,000 cycles AST. By contrast, though the FeN$_4$ active site density of 10FeNC-3NH$_4$Cl-CVD catalyst is lower than that of 10FeNC-3NH$_4$Cl, because the elimination of partial carbon defects is expected to bury some FeN$_4$ active sites, thus rendering them inaccessible, it suffered very low FeN$_4$ active site loss (1.9%) in the first 10,000 cycles AST test and a slight decrease in the next 20,000 and 30,000 cycles AST test as compared to the 10FeNC-0NH$_4$Cl and 10FeNC-3NH$_4$Cl catalysts. Many explanations were proposed to explain the degradation mechanism of the Fe—N—C catalyst, including (i) oxidative attack of the ORR intermediates, (ii) demetalation of the FeN$_4$ active sites, (iii) protonation followed by anionic adsorption. As shown in FIGS. 46A through 46C, similar E$_{1/2}$ loss of ORR activities, both in N$_2$ and O$_2$ saturated 0.5 M H$_2$SO$_4$ solution, illustrates that the demetalation of FeN$_4$ active sites is the apparent cause contributing to the degradation of the catalysts. The qualification of FeN$_4$ active site loss during the ORR stability test confirms our belief that the highly graphitized carbon structure stemming from carbon defects being repaired can resist carbon corrosion, thus preventing FeN$_4$ active sites from demetalation.

Figure 47:
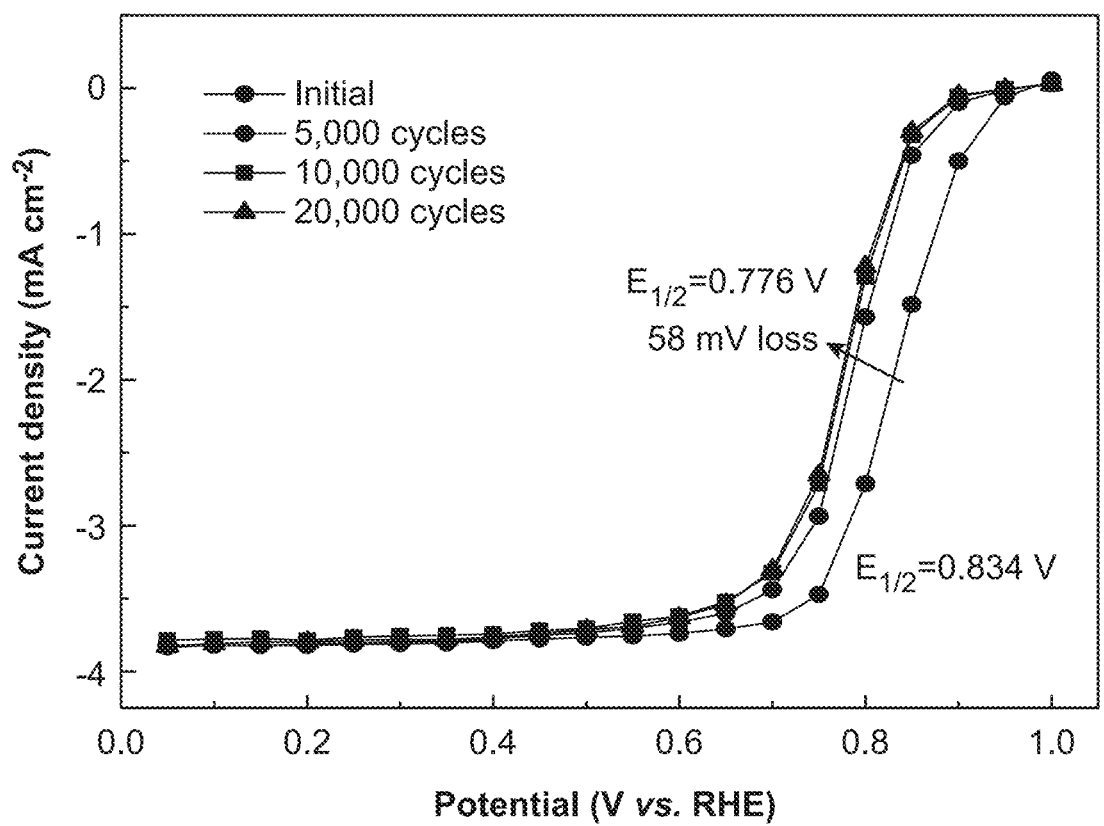
FIG. 47 is a graph showing the results of stability accelerated stress (AST) tests run by cycling potential (0.6-1.0 V) in O$_2$-saturated 0.5 M H$_2$SO$_4$ for a 10FeNC-3NH$_4$Cl-1 h catalyst, with steady-state ORR polarization plots recorded at intervals of 0 cycles, 10,000 cycles, 20,000 cycles, and 30,000 cycles, the 10FeNC-3NH$_4$Cl-1 h catalyst being fabricated by pyrolysis of a 10FeNC-3NH$_4$Cl catalyst for another 1 h under 1100° C. under Ar gas.
Figure 48:
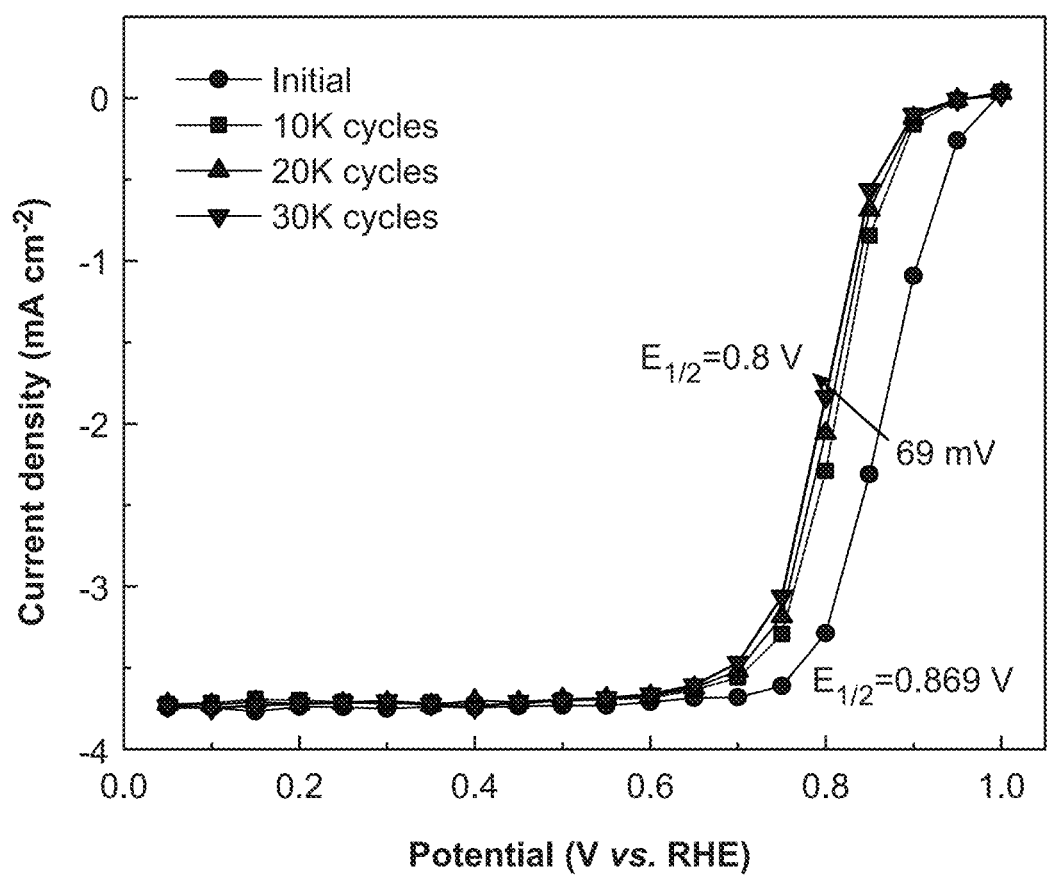
FIG. 48 is a graph showing the results of stability accelerated stress (AST) tests run by cycling potential (0.6-1.0 V) in $O_2$-saturated 0.5 M $H_2SO_4$ for a 10FeNC-1NH$_4$Cl catalyst, with steady-state ORR polarization plots recorded at intervals of 0 cycles, 10,000 cycles, 20,000 cycles, and 30,000 cycles.

Therefore, the highly durable 10FeNC-3NH$_4$Cl-CVD catalyst with a highly graphitized carbon structure, because of partial carbon defects being repaired, possesses the capability to resist carbon corrosion, thus leading to a weakened degree of demetalation of FeN$_4$ active sites. The present inventors also uncovered that it is not viable to improve the stability of the 10FeNC-3NH$_4$Cl catalyst simply by prolonging the pyrolysis time to strengthen the graphitization degree of the catalyst without deposition of adventitious carbon species (see FIG. 47), which supports well the extensively acknowledged viewpoint of the extraordinary difficulty in synthesizing a Fe—N—C catalyst with high FeN$_4$ active site density and stability simultaneously via a traditional pyrolysis method. Significantly, it was found that FeN$_4$ active site density in the highly stable 10FeNC-3NH$_4$Cl-CVD catalyst is much higher than that of 10FeNC-0NH$_4$Cl catalyst, which provides a universal strategy to synthesize highly durable and active Fe—N—C catalysts first by producing high FeN$_4$ active site density via carbon structure engineering and then by carbon vapor deposition of carbon species into it to strengthen its graphitization degree, thus enhancing the stability of the catalyst. The effect of NH$_4$Cl treatment on the stability of 10FeNC-xNH$_4$Cl catalysts was conducted to validate the notion that fewer carbon defects in the catalyst is beneficial for stability. FIG. 48 shows the enhanced stabilities of 10FeNC-1NH$_4$Cl catalysts treated by dwindling NH$_4$Cl amounts. As can be seen, decreasing the x value from 3 to 1, the stability of the derived 10FeNC-1NH$_4$Cl catalyst was reinforced, with a 69 mV loss in E$_{1/2}$, this being in good agreement with the stability of the 10FeNC–xNH$_4$Cl catalyst upgraded with an increased graphitization degree of carbon structure in which FeN$_4$ active sites were hosted.

Example 4: MEA

Figure 49C:
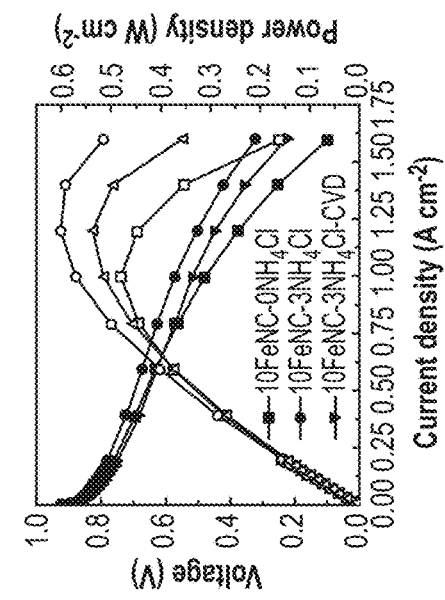
FIG. 49C is a graphic representation of the $H_2$-air fuel cell I-V polarization (solid symbols and lines) and power density (hollow symbols and lines) plots recorded under 150 KPa$_{abs}$ of air pressure with the cathode of 10FeNC-0NH$_4$Cl, 10FeNC-3NH$_4$Cl, and 10FeNC-3NH$_4$Cl-CVD at the flow rate of air of 500 sccm and of $H_2$ of 300 sccm.
Figure 49B:
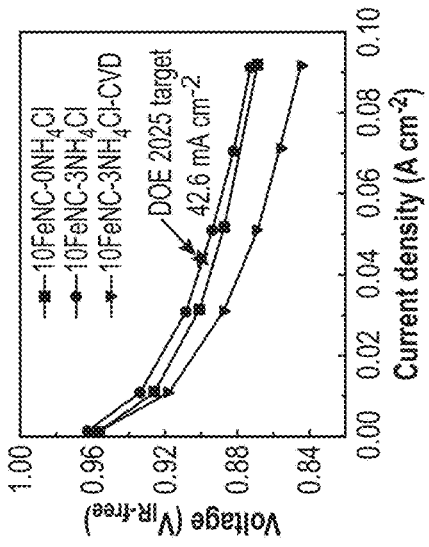
FIG. 49B is a graphic representation of the activities of 10FeNC-0NH$_4$Cl, 10FeNC-3NH$_4$Cl, and 10FeNC-3NH$_4$Cl-CVD catalysts at 0.9 $V_{iR-free}$ under 150 KPa$_{abs}$ back pressure for both anodic and cathodic sides (with the star denoting the U.S. Department of Energy target)
Figure 49A:
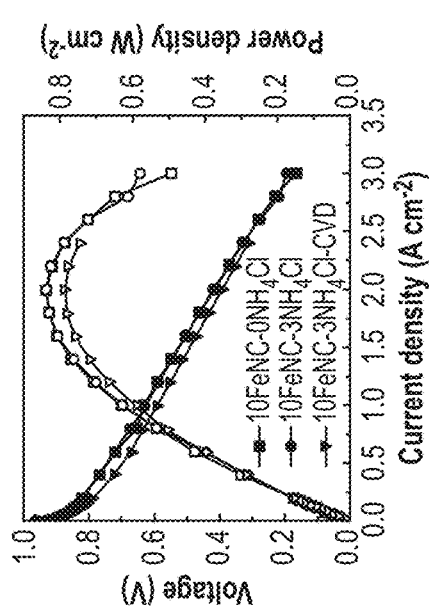
FIG. 49A is a graphic representation of $H_2$—$O_2$ fuel cell I-V polarization (solid symbols and lines) and power density (hollow symbols and lines) plots recorded under 150 KPa$_{abs}$ (KPa absolute pressure) anodic and cathodic back pressure of $H_2$ for 10FeNC-0NH$_4$Cl, 10FeNC-3NH$_4$Cl, and 10FeNC-3NH$_4$Cl-CVD catalysts at the flow rate of 500 standard cubic centimeter per minute (sccm) for $O_2$ and 0.3 sccm for Hz.
Figure 50B:
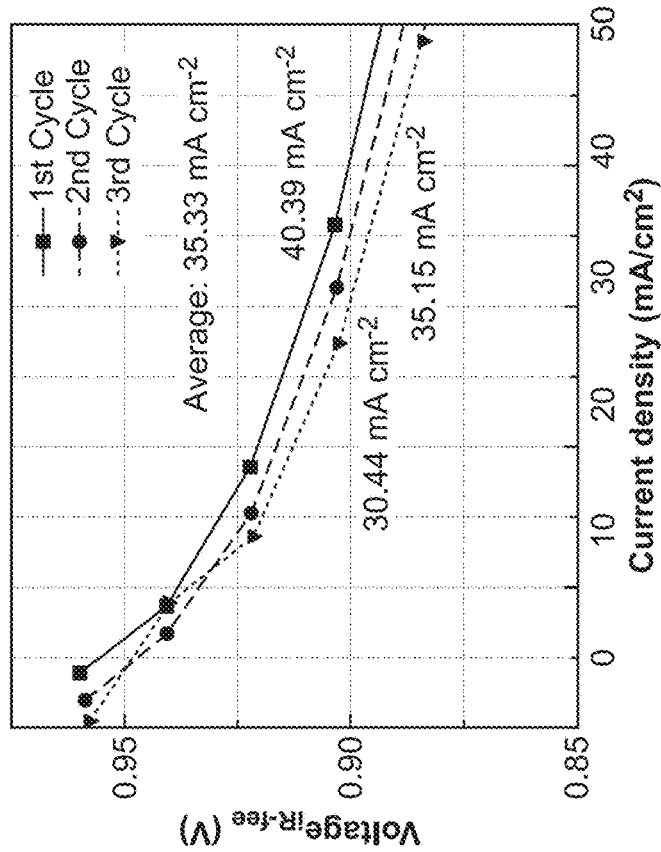
FIGS. 50A and 50B are graphs showing the $H_2$—$O_2$ fuel cell performance of a 10FeNC-3NH$_4$Cl catalyst measured at 35.33 mA cm$^{-2}$ (0.90 V, iR-free) in a separate cell by averaging the first three polarization curves.
Figure 50A:
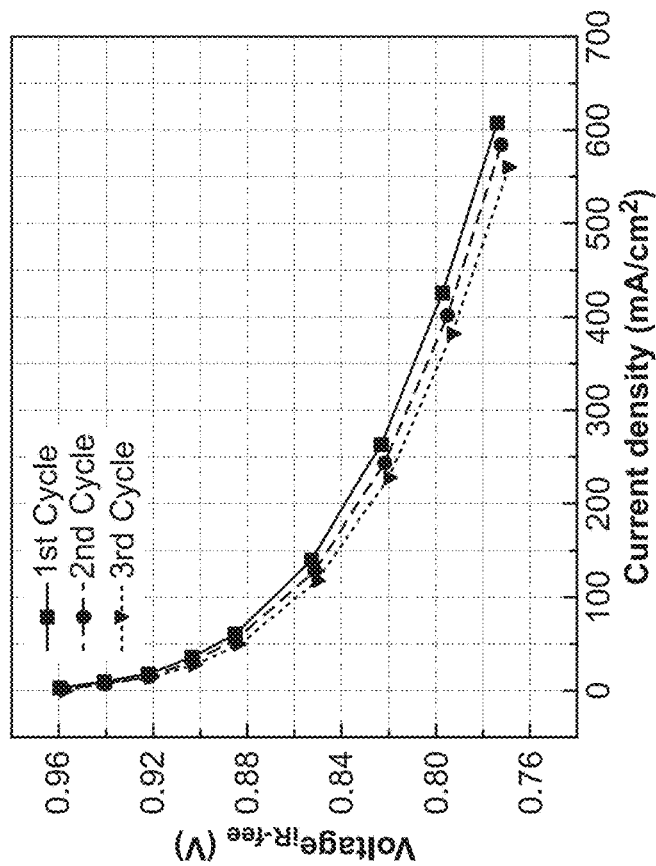
Figure 51B:
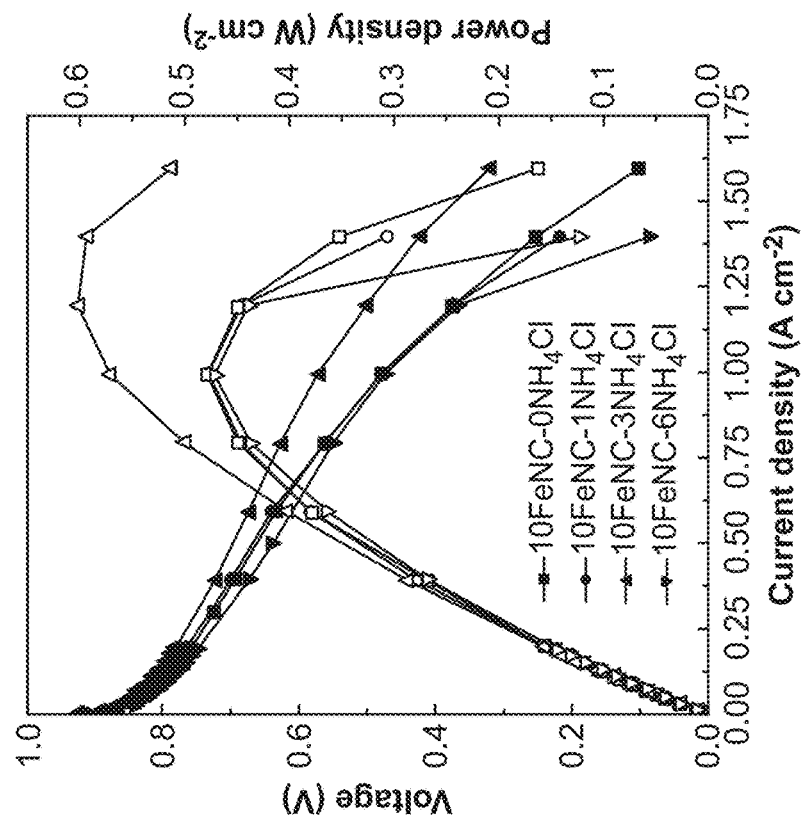
FIG. 51B is a graphic representation of I-V polarization (solid symbols and lines) and power density (hollow symbols and lines) plots of an $H_2$-air fuel cell using 10FeNC-0NH$_4$Cl, 10FeNC-1NH$_4$Cl, 10FeNC-3NH$_4$Cl, and 10FeNC-6NH$_4$Cl as cathode catalysts.
Figure 51A:
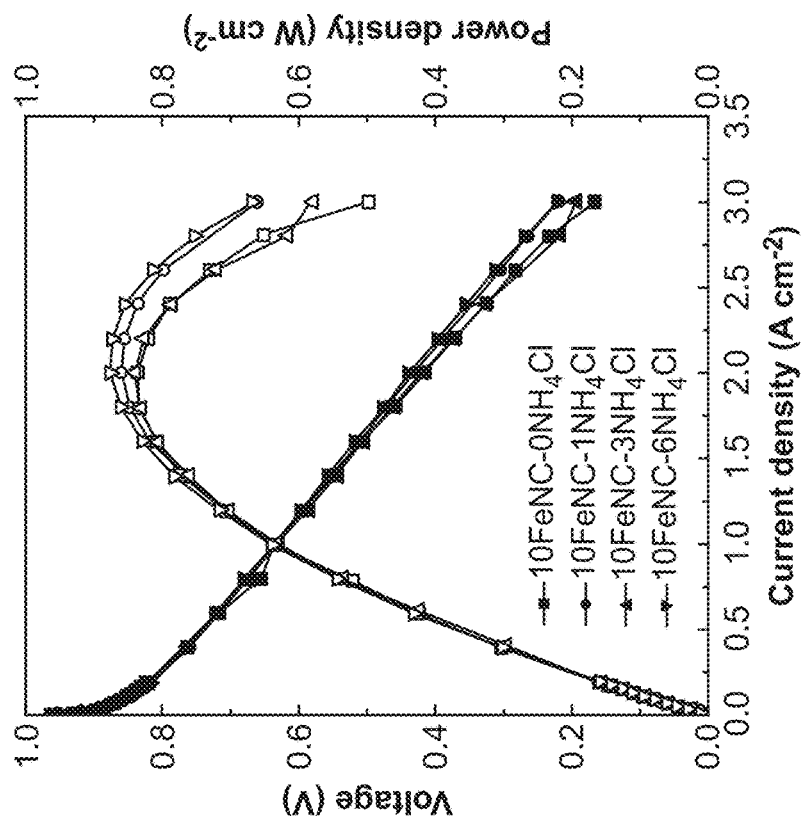
FIG. 51A is a graphic representation of I-V polarization (solid symbols and lines) and power density (hollow symbols and lines) plots of an $H_2$—$O_2$ fuel cell using 10FeNC-0NH$_4$Cl, 10FeNC-1NH$_4$Cl, 10FeNC-3NH$_4$Cl, and 10FeNC-6NH$_4$Cl as cathode catalysts.
Figure 52B:
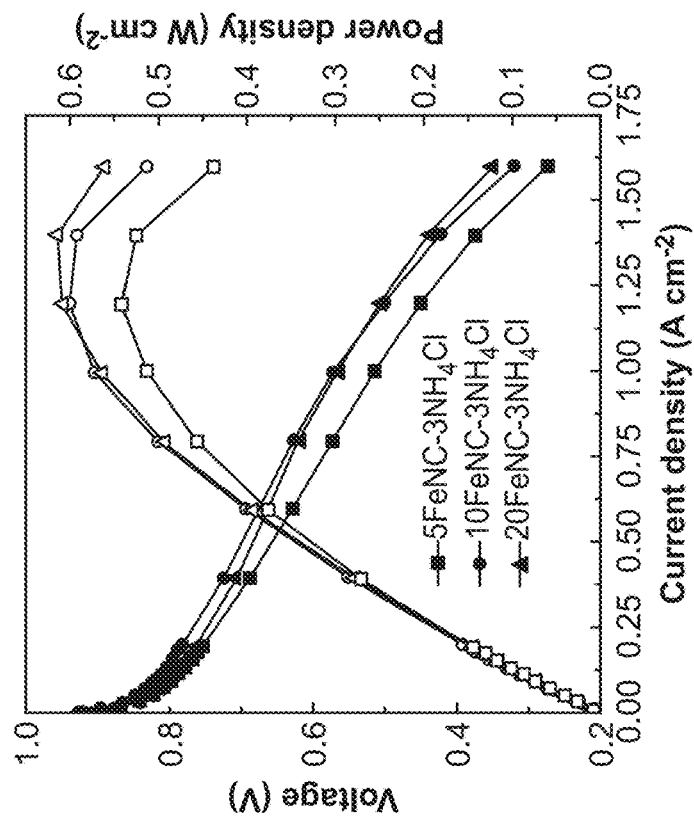
FIG. 52B is a graphic representation of I-V polarization (solid symbols and lines) and power density (hollow symbols and lines) plots of an $H_2$-air fuel cell using 5FeNC-3NH$_4$Cl, 10FeNC-1NH$_4$Cl, and 20FeNC-3NH$_4$Cl as cathode catalysts.
Figure 52A:
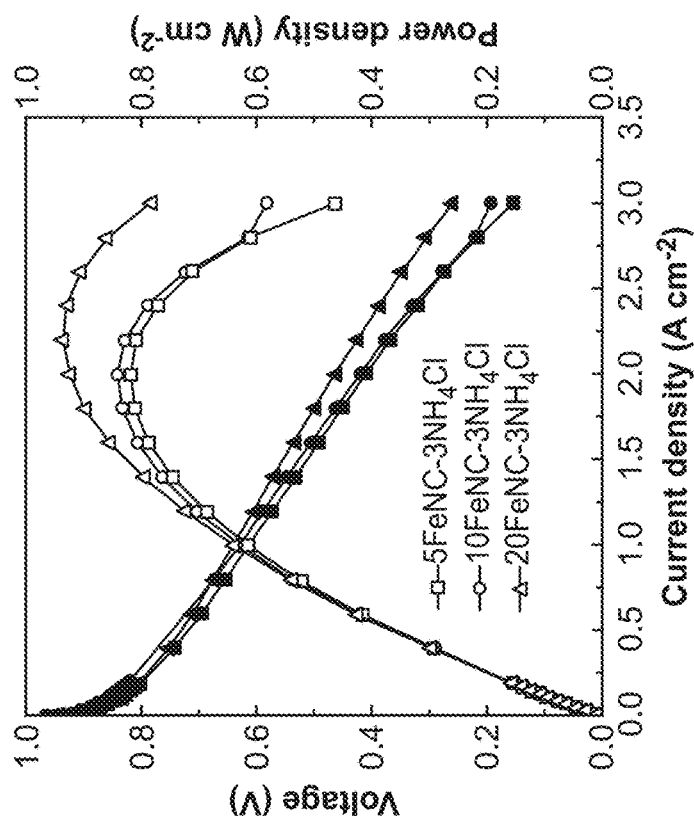
FIG. 52A is a graphic representation of I-V polarization (solid symbols and lines) and power density (hollow symbols and lines) plots of an $H_2$—$O_2$ fuel cell using 5FeNC-3NH$_4$Cl, 10FeNC-1NH$_4$Cl, and 20FeNC-3NH$_4$Cl as cathode catalysts.
Figure 54A:
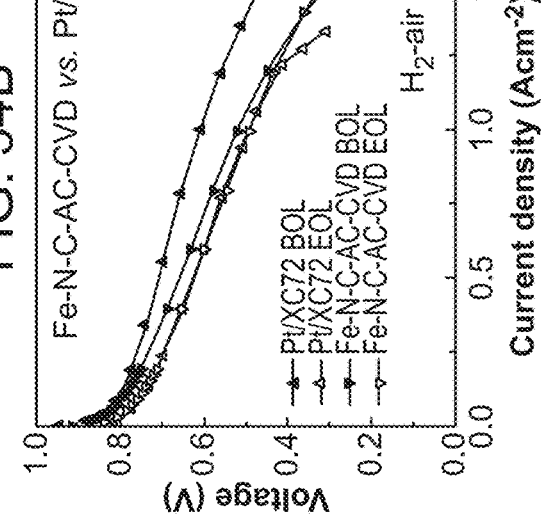
FIG. 54A is a graph comparing the activities of Fe—N—C—NH$_4$Cl and Fe—N—C—NH$_4$Cl-CVD at 0.9 $V_{Ir-free}$ in MEA at 100 kPa$_{abs}$ $O_2$ pressure, the star denoting the U.S. Department of Energy 2025 target (44 mA cm$^{-2}$)
Figure 54B:
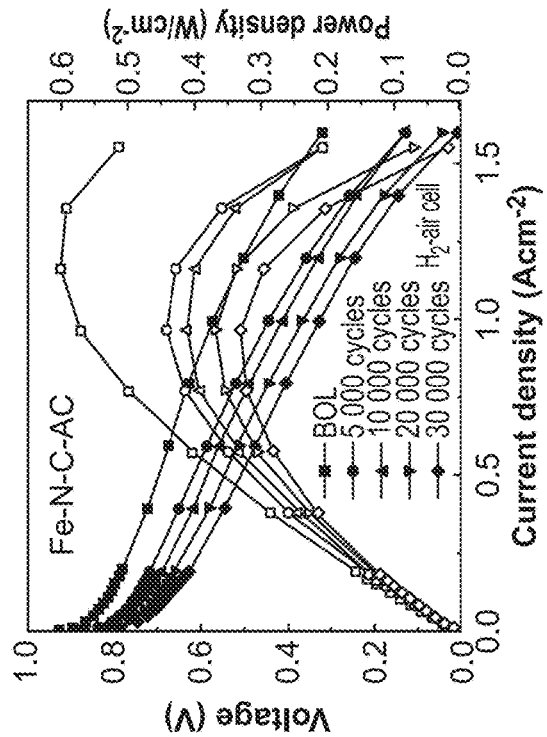
FIGS. 54B and 54C are $H_2$-air fuel cell polarization plots of Fe—N—C—NH$_4$Cl and Fe—N—C—NH$_4$Cl-CVD cathodes, respectively, recorded under 100 kPa air pressure at air and $H_2$ flow rates of 500 and 300 sccm, respectively, after various members of square wave accelerated stress test (AST) cycles (0.6 V to OCV, ~0.92 V) at $H_2$ and air flows and under ambient pressure.
Figure 54C:
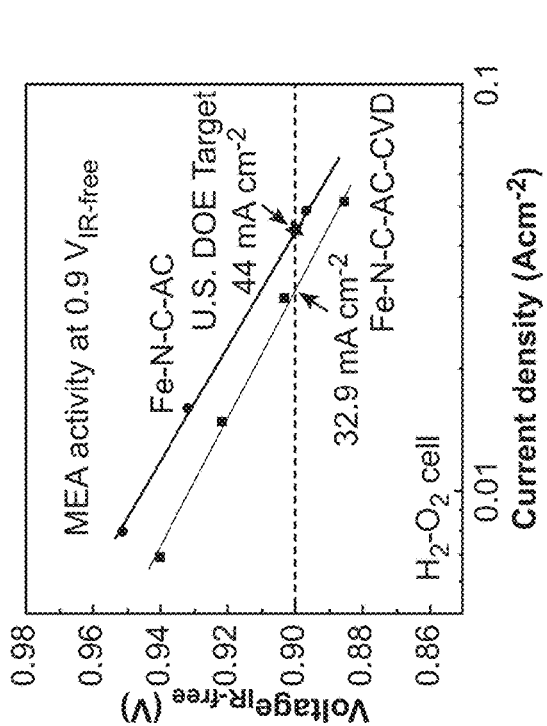
Figure 54D:
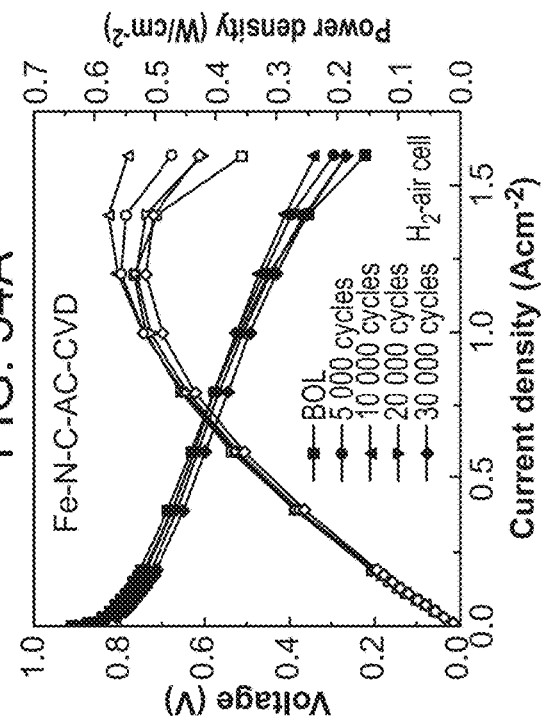
FIG. 54D is a graph comparing $H_2$-air fuel cell polarization plots of a Fe—N—C—NH$_4$Cl-CVD catalyst and a commercial Pt/XC-72 catalyst recorded at beginning of test (BOT) and after a 30,000 cycle accelerated stress test.
Figure 54E:
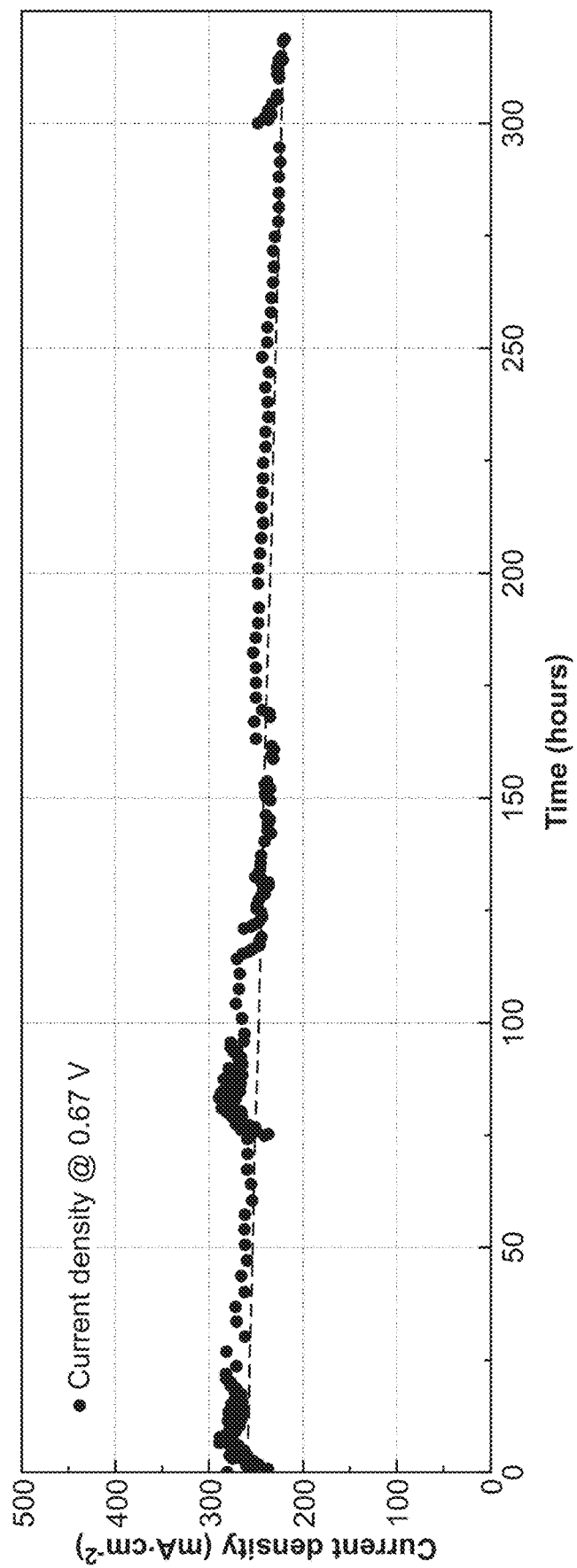
FIG. 54E is a graph depicting a long-term fuel cell life test under $H_2$-air conditions at a constant potential of 0.67 V (with 100 kPa air pressure and flow rates of air 200 sccm and $H_2$ 200 sccm).

The catalysts discussed above were incorporated into MEAs with a total catalyst loading of ~4.0 mg cm$^{-2}$ to study their fuel cell performances. The H$_2$—O$_2$ fuel cell performances for 10FeNC-0NH$_4$Cl, 10FeNC-3NH$_4$Cl, and 10FeNC-3NH$_4$Cl-CVD catalysts are presented in FIG. 49A. As expected, the 10FeNC-3NH$_4$Cl catalyst exhibited the best performance. More specifically, a current density of 42.6 mA cm$^{-2}$ produced at 0.9 V$_{IR-free}$ under 1.0 bar pressure of O$_2$ was recorded on the polarization I-V curve of 10FeNC-3NH$_4$Cl catalyst (see FIG. 49B), approaching the U.S. Department of Energy (DOE) target of 2025 (44 mA cm$^{-2}$ at 0.9 V$_{IR\text{-}free}$). As far as the present inventors are aware, this is the highest current density at 0.9 V$_{IR\text{-}free}$ reported to date. Meanwhile, according to the latest protocols proposed by DOE, a current density of 35.33 mA cm$^{-2}$ (0.90 V, iR-free) is measured in a H$_2$—O$_2$ cell by averaging the first three polarization curves (see FIGS. 50A and 50B for a fuel cell as follows: Anode: 0.2 mgPt cm$^{-2}$ Pt/C; Hz, 500 sccm; 150 KPa$_{abs}$ of H$_2$ partial pressure; cathode: ca. 6.80 mg cm$^{-2}$; 10FeNC-3NH$_4$Cl; NAFION™ 520 sulfonated tetrafluoroethylene based fluoropolymer-copolymer; 1000 sccm; 150 KPa$_{abs}$ of O$_2$ partial pressure; membrane: NAFION™ 212 sulfonated tetrafluoroethylene based fluoropolymer-copolymer; cell: 5 cm$^{-2}$; test conditions: 80° C.; 0.96 V to 0.88 V in 20 mV steps; 0.88 V to 0.72 V in 40 mV steps; 45 s/step).

In contrast, 10FeNC-0NH$_4$Cl and 10FeNC-3NH$_4$Cl-CVD catalysts exhibited decreased current densities at 0.9 V, which is consistent with the trend of their ORR activities in an acid electrolyte. Fuel cell performances of 10FeNC-0NH$_4$Cl, 10FeNC-3NH$_4$Cl, and 10FeNC-3NH$_4$Cl-CVD catalysts in the cathode were further evaluated by using a more practical Hz/air at 150 KPa$_{abs}$ back pressure. Similar to the performance attained under the H$_2$—O$_2$ cell, the 10FeNC-3NH$_4$Cl catalyst generated the best H$_2$-air cell performance in current density at 0.8 V and maximum power density (see FIG. 49C). The current density at 0.80 V achieved 151 mA cm$^{-2}$, and the maximum power density reached a value of 601 mW cm$^{-2}$, which is higher than the maximum reported to date for PGM-free catalysts (see FIG. 30). The MEAs performance was in line with the trend of ORR activities of the three catalysts, suggesting that the FeN$_4$ active site density of the Fe—N—C catalysts is one of the main factors correlating with fuel cell performance. The enhanced MEA performance of the 10FeNC-3NH$_4$Cl catalyst in H$_2$-air cell was probably due to its increased intrinsic activity and FeN$_4$ active site density, as well as improved porosity both in micropore and mesopore. In this case, the above results suggest that the porosities, intrinsic activities, and active site densities in catalysts play significant roles in MEAs performance. The MEA performances of the 10FeNC–xNH$_4$Cl (x=1, and 6), 5FeNC-3NH$_4$Cl and 20 FeNC-3NH$_4$Cl catalysts were tested (see FIGS. 51A, 51B, 52A and 52B) and were consistent with their ORR activities in acid electrolyte. For FIGS. 51A, 51B, 52A and 52B, the following conditions apply: The flow rates of O$_2$ and air are 500 sccm and H$_2$ 300 sccm, respectively; all fuel cells cathode: loading ~4.0 mg cm$^{-2}$; 100% RH; 150 KPa$_{abs}$ back pressure; anode: Pt/C, 0.20 mg$_{Pt}$ cm$^{-2}$, 100% RH; 150 KPa$_{abs}$ back pressure; membrane: NAFION™ 212 sulfonated tetrafluoroethylene based fluoropolymer-copolymer; temperature: 80° C.; and MEA area: 5.0 cm$^{-2}$.

Figure 49F:
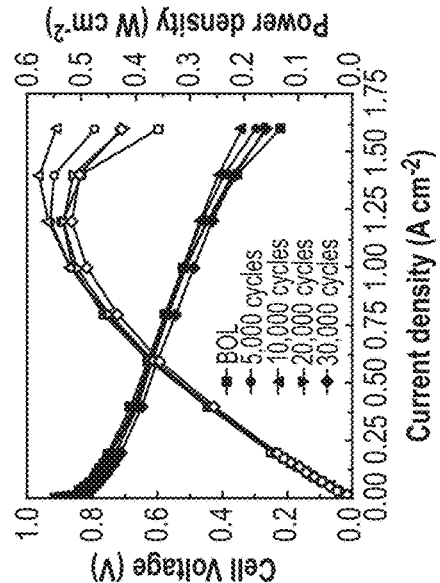
FIGS. 49D, 49E, and 49F are $H_2$-air fuel cell polarization plots of 10FeNC-0NH$_4$Cl, 10FeNC-3NH$_4$Cl, and 10FeNC-3NH$_4$Cl-CVD catalyst cathodes, respectively, recorded at different cycles during a 30,000 cycles stability test at a potential range between 0.6 and open-circuit voltage (OCV) under ambient pressure (100 KPa$_{abs}$) at the flow rate of air of 400 sccm and of $H_2$ of 200 sccm.
Figure 49E:
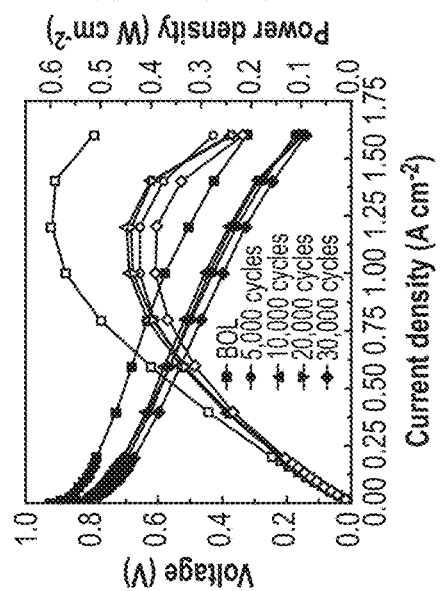
Figure 49D:
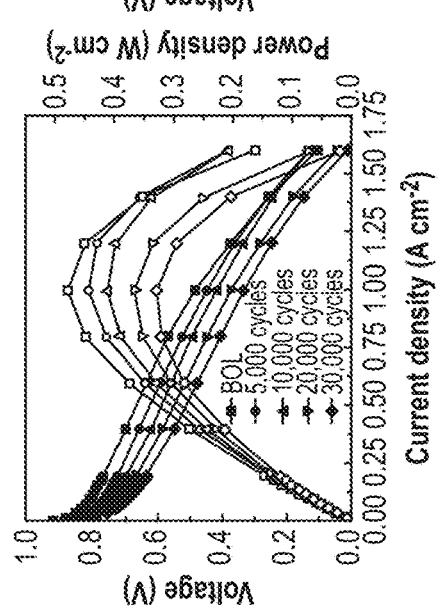

The stability of 10FeNC-0NH$_4$Cl, 10FeNC-3NH$_4$Cl and 10FeNC-3NH$_4$Cl-CVD catalysts in MEAs was assessed by cycling square-wave between 0.6 and OCV for 30,000 cycles under ambient back pressure of both Hz/air according to DOE's protocol. Fuel cell polarization plots were also tracked and plotted at different cycles during the stability test (see FIGS. 49D through 49F). The current densities at 0.8 V for each polarization plot are presented in FIG. 49G. Compared to the 10FeNC-0NH$_4$Cl catalyst, the MEA of the 10FeNC-3NH$_4$Cl catalyst exhibited unsatisfied stability; the loss in current density at 0.8 V after the first 5,000 cycles reached 75% but was followed by a slower decay of 7.9% for the next 15,000 cycles and 3.3% for the remaining 10,000 cycles (see FIG. 49H). The rapid MEA performance decay of 10FeNC-3NH$_4$Cl in the first 5,000 cycles is consistent with its stability behavior in an aqueous acid electrolyte, suggesting that instability of the catalyst, itself, is the main factor contributing to the deterioration of MEA performance. With its low graphitized carbon structure, more carbon defects were created, thereby inducing a rapid demetalation of FeN$_4$ active sites and resulting in the degradation of MEA performance. By contrast, the 10FeNC-3NH$_4$Cl-CVD catalyst delivered a significantly enhanced stability for MEA performance. More specifically, there was only a 7.1% loss in current density at 0.8 V after the first 5,000 cycles, then a 1.5% loss after the 20,000$^{th}$ cycle and a 1.4% loss for the last 10,000 cycles. Encouragingly, the 10FeNC-3NH$_4$Cl-CVD catalyst, with only 30 mV loss (5.1%) at the current density of 0.8 A cm$^{-2}$, meets the DOE's target, which is crucial for practical fuel cell application. Compared to the 10FeNC-3NH$_4$Cl catalyst and the reported Fe—N—C catalysts with rapid initial fuel cell performance loss, the highly stable 10FeNC-3NH$_4$Cl-CVD catalyst exhibited extremely low initial performance degradation in current density at 0.8 V but increased peak power density (see FIG. 53), aligning with a sluggish degradation of ORR activities in an acid electrolyte. Though the degradation mechanism of MEAs is much more complicated than that of the catalyst in an aqueous acid electrolyte, micropore flooding, active-site protonation and anion accessibility, demetallation, and carbon oxidation were considered to be the main causes contributing to the deterioration of fuel cell performance.

Referring now to FIGS. 54A through 54E, additional information is provided regarding the MEA performance of various Fe—N—C catalysts fabricated according to the present invention. For such MEAs, some of the conditions/characteristics were as follows: Cathode—catalyst loading 4.0 mg cm$^{-2}$ for Fe—N—C—NH$_4$Cl-CVD and 0.1 mg cm$^{-2}$ Pt for Pt/XC72, 100% RH, 0.6 I/C, 150 kPa$_{abs}$ total pressure; Anode—Pt/C, 0.20 mgPt cm$^{-2}$, 100% RH, 150 kPa$_{abs}$ pressure; Membrane: Nafion™ 212; Temperature—80° C.; MEA area: 5.0 cm$^{-2}$.

In this work, reducing the number of carbon defects to promote graphitization degree in the carbon structure of Fe—N—C catalyst, thereby giving rise to strengthened stability of the FeN$_4$ active sites was believed to be an efficient strategy to enhance the stability of Fe—N—C catalysts, both in aqueous and MEA. The present inventors have found a highly durable and active Fe—N—C catalyst that can be attained by rationally regulating the carbon structure of an Fe—N—C catalyst to strike the best balance between activity and stability. More specifically, this may be done by fabricating a highly active Fe—N—C catalyst by creating more carbon defects, thereby increasing its intrinsic activity and density of FeN$_4$ active sites, and then by chemical vapor deposition of carbon species to strengthen its graphitization degree via reducing the number of partial carbon defects, thus achieving a highly durable and active Fe—N—C catalyst.

Some of the specific protocols used herein and/or additional information is provided below.

Example 5: Synthesis of 10FeNC–xNH$_4$Cl Catalyst

In a typical procedure, 10 mg Fe$_2$O$_3$ nanoparticles (Alfa-Aesar, 5 nm APS Powder) with a particle size of ~5 nm and 6.78 g zinc nitrate hexahydrate were dispersed and dissolved into a 150 mL methanol solution. Another 150 mL methanol solution was prepared that contained 7.92 g 2-methylimidazole. Then, both solutions were mixed together and heated at 60° C. for 24 h. Next, the resulting precipitate was collected, washed with ethanol, and then dried at 60° C. in a vacuum oven to obtain a 10Fe$_2$O$_3$@ZIF-8 composite. Next, for pyrolysis, the Fe$_2$O$_3$@ZIF-8 composite took 0.5 h to go from room temperature to 800° C. and was kept at 800° C. for 1 h under Ar gas to obtain 10FeNC-800. Next, 100 mg 10FeNC-800 were ground with 300 mg NH$_4$Cl powder. Then, for pyrolysis, the mixture took 0.5 h to go from room temperature to 1100° C. and was kept at 1100° C. under Ar flow for 1 h to obtain 10FeNC-3NH$_4$Cl (10FeNC–xNH$_4$Cl, where x represents the mass ratio of NH$_4$Cl to 10FeNC-800) catalyst. Instead of using 10 mg Fe$_2$O$_3$ nanoparticles, 5 mg Fe$_2$O$_3$ and 20 mg Fe$_2$O$_3$ nanoparticles were used to synthesize 5FeNC-3NH$_4$Cl and 20FeNC-3NH$_4$Cl catalysts, respectively, with the same experimental procedure.

Example 6: Synthesis of ZIF-8 and Nitrogen-Doped Carbon (NC)

6.78 g Zn(NO$_3$)$_2$.6H$_2$O were dissolved in 150 mL methanol, and another 150 mL methanol solution was prepared that contained 7.92 g 2-methylimidazole. Then, the two methanol solutions were mixed together, and the resultant mixture was then heated at 60° C. for 24 h. Next, the precipitate was collected, washed with ethanol, and dried at 60° C. in a vacuum oven to obtain ZIF-8. The obtained ZIF-8 was then pyrolyzed at 1100° C. for 1 h under Ar gas to fabricate nitrogen-doped carbon (NC).

Example 7: Synthesis of 10FeNC-3NH$_4$Cl-CVD Catalyst 50 mg 10FeNC-3NH$_4$Cl catalyst and 150 mg ZIF-8 were separately placed on a high-temperature alumina combustion boat located at downstream and upstream directions, respectively, in a tube furnace. The tube furnace was then heated to 1100° C. under a stream of argon. After 1 h of chemical vapor deposition, a 10FeNC-3NH$_4$Cl-CVD catalyst was generated.

Example 8: Synthesis of FeZIF-1100 and FeZIF-3NH$_4$Cl Catalysts 3.39 g of Zn(NO$_3$)$_2$.6H$_2$O and 100 mg of Fe(NO$_3$) 3.9H2O were dissolved in 300 mL methanol. Another 300 mL methanol solution that contained 3.92 g 2-methylimidazole was prepared. Then, the two methanol solutions were mixed together and heated at 60° C. for 24 h. Next, the precipitate was collected, washed with ethanol, and then dried at 60° C. in a vacuum oven. The obtained Fe-doped ZIF-8 was then pyrolyzed at 1100° C. for 1 h under Ar gas to obtain a FeZIF-1100 catalyst. For the synthesis of an FeZIF-3NH$_4$Cl catalyst, an Fe-doped ZIF-8 was pyrolyzed at 800° C. for 1 h under Ar gas to obtain FeZIF-800. Next, 100 mg FeZIF-800 were ground with 300 mg NH$_4$Cl powder, and the mixture was then pyrolyzed at 1100° C. under Ar flow for 1 h to obtain an FeZIF-3NH$_4$Cl catalyst. No additional acidic leaching was required.

Example 9: Morphology and Structure Characterization

X-ray photoelectron spectroscopy (XPS) was performed using a Thermo K-Alpha system. Micromeritics TriStar II measured the N$_2$ isothermal adsorption/desorption for the catalysts at 77 K. Atomic resolution high-angle annular dark-field (HAADF) images of dispersed Fe in the nitrogen-doped carbon phase were captured in a Nion UltraSTEM and equipped with a Gatan Enfina electron energy loss spectrometer (EELS) at Oak Ridge National Laboratory. Fe K-edge X-ray absorption spectroscopy was measured at beamline 5BM, DND-CAT, Advanced Photon Source (APS), Argonne National Laboratory (ANL). Data reduction, data analysis, and EXAFS fitting were performed with the Athena, Artemis, and IFEFFIT software packages.

Example 10: Electrochemical Measurements

An electrochemical workstation (CHI760b) equipped with Pine AFMSRCE 3005 in a three-electrode cell at room temperature was employed to take all rotation disk electrode (RDE) measurements. The Hg/HgSO$_4$ (K$_2$SO$_4$-saturated) electrode and a graphite rod were used as the reference and counter electrodes, respectively. A glassy carbon rotating-disk electrode (RDE) coated with the catalyst ink was used as the working electrode, the working electrode having a controlled loading of 0.6 mg cm$^{-2}$ in this work for all measurements. Before each test, the reference electrode was calibrated to a reversible hydrogen electrode (RHE) in the same electrolyte. The catalyst ink for the RRDE tests was prepared by mixing 5 mg catalyst with a diluted NAFION sulfonated tetrafluoroethylene based fluoropolymer-copolymer solution under ultrasonic conditions for 30 min. Steady-state polarization curves were recorded in O$_2$-saturated 0.5 M H$_2$SO$_4$ to determine the ORR activity of the studied catalysts by using a potential staircase at a step of 0.05 V at an interval of 30 s from 1.0 to 0 V versus RHE with a rotation rate of 900 rpm. Four-electron selectivity and H$_2$O$_2$ yield during the ORR were determined by applying a high potential (1.20 V versus RHE) on the ring electrode, leading to the electro-oxidation of H$_2$O$_2$ during the ORR process.

Example 11: Fuel Cell Tests

Both anodic and cathodic electrodes were prepared by a catalyst coated membrane (CCM) method. For the anodic electrode, prepare 20 wt. % Pt/XC-72 catalyst (Jiping, Shanghai, China) and ionomer ink by mixing the catalyst powder and ionomer dispersion (25 wt. %, Aquivion D-79-25BS), by controlled 0.45 ionomer to carbon ratio, as well as the mixture of 1-propanol and deionized-water (DI-water) with 1:6 ratio. The prepared ink was first sonicated for 30 minutes in a water bath with a temperature under 30° C., followed by sonicating 4 minutes using a sonic dismembrator, Model 120 (Fisher Scientific, Waltham, MA). The thus prepared ink was then sprayed onto a 5 cm$^{-2}$ square NAFION 212 sulfonated tetrafluoroethylene based fluoropolymer-copolymer membrane by an Exacta Coat spray machine (Sono-Tek, NY), and the Pt loading was controlled as 0.2 mg$_{Pt}$ cm$^{-2}$. The cathode was prepared following a similar protocol, but the ionomer to carbon ratio was controlled to 0.6, and the solvent mixture was replaced by a mixture of 2-propanol and DI-water with a 1:1 volume ratio. The prepared ink was sprayed on opposite side of anode aligning with anode, and the loading was controlled between 3.5 mg$_{catalyst}$ cm$^{-2}$ and 4.0 mg$_{catalyst}$ cm$^{-2}$. Two pieces of SGL-22BB served as gas diffusion layer in the MEA. The MEAs were measured by a fuel cell test station (Fuel Cell Technology, Inc., Albuquerque, NM, USA). First, the cell was heated to 80° C. without flow, then 200 ml min$^{-1}$ of N$_2$ in the anode and cathode for 2 hours to hydrate the membrane and ionomer. Then, air/oxygen flowing at 500 mL min$^{-1}$ and H$_2$ (purity 99.999%) flowing at 300 mL min$^{-1}$ were supplied to the cathode and anode, respectively. The back pressures during the fuel cell tests were 150 KPa$_{abs}$ each for reactant gases. Dew points of anodic flow and cathodic flow were 80° C. and 80° C., and cell temperatures were maintained during the recording of VIR polarization.

MEA stability was evaluated by square wave cycling at a range from 2.5 sec hold on 0.6 V to OCV for 2.5 sec. The rising time from 0.6 V to 0.95V was 0.5 sec, and the reverse was the same for 30,000 cycles, with a flow rate of 200 sccm and 400 sccm of $H_2$ and air in the anode and cathode at 100% R.H., respectively. Meanwhile, the polarization curves were separately recorded at 5,000 cycles, 10,000 cycles, 20,000 cycles, and 30,000 cycles.

In summary, using the environment-TEM (E-TEM) technique, the present inventors in situ observed that the direct transformation of $Fe_2O_3$ into $FeN_4$ sites originates from the Fe atom released from ultrafine $Fe_2O_3$ and captured by surrounding defect nitrogen. Because spatial confinement and low diffusion capability of solid-state $Fe_2O_3$ inhibits Fe atoms from diffusing and agglomerating to form larger Fe—NPs or $Fe_2O_3$, Fe atoms directly released from $Fe_2O_3$ and captured by surrounding defect nitrogen lead to a higher density of $FeN_4$ active sites in an Fe—N—C catalyst. Additionally, through experiments and theoretical analysis, we systemically studied how the intrinsic activity and stability of $FeN_4$ active sites in an Fe—N—C catalyst can be tailored by regulating the carbon structure of the catalyst. By regulating carbon defects in Fe—N—C catalyst derived from $Fe_2O_3$ as Fe source, a best-performing 10FeNC-3$NH_4$Cl catalyst shows superior ORR activity and PEMFCs performance, high half-wave potential ($E_{1/2}$=0.902 V vs. RHE) and kinetic current density of 4.0 mA cm$^{-2}$ at 0.9 V for the acid electrolyte. When used as a catalyst for PEMFCs, the $H_2$—$O_2$ fuel cell shows a current density of 42.6 mA cm$^{-2}$ at 0.9 V and 151 mA cm$^{-2}$ at 0.8 V and a peak power density of 601 mW cm$^{-2}$ for $H_2$-air fuel cell. Reducing carbon defects by chemical vapor deposition of carbon species into the as-synthesized catalyst results in a higher graphitization degree, which brings much-improved stability both in acid electrolyte and PEMFCs. The enhanced activity and stability obtained in this manner open up the possibilities for Fe—N—C catalysts in industrially viable PEMFCs applications. This work paves a new avenue to increase the density of MNx (M=Co, Mn, Cu, etc.) active sites in M-N—C catalysts and provides a unique insight to understand the relationship between activity and stability.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of preparing a catalyst, the method comprising the steps of:
   (a) incorporating nanoparticles of a metal oxide into a zeolitic imidazolate frameworks (ZIF) nanocrystal to form a metal oxide/ZIF composite, wherein the metal oxide comprises an oxide of at least one metal that is selected from the group consisting of iron, cobalt, nickel, manganese, and copper and wherein the nanoparticles are ultrafine nanoparticles having an average size of about 5 nm; and
   (b) then, pyrolyzing the metal oxide/ZIF composite to form an M-N—C catalyst.

2. The method as claimed in claim 1 wherein the metal oxide comprises $Fe_2O_3$ nanoparticles.

3. The method as claimed in claim 1 wherein the ZIF is selected from the group consisting of ZIF-7, ZIF-8, and ZIF-11.

4. The method as claimed in claim 1 wherein the ZIF is ZIF-8.

5. The method as claimed in claim 1 wherein the pyrolyzing step comprises heating the metal oxide/ZIF composite at a temperature of at least about 500° C.

6. The method as claimed in claim 1 wherein the pyrolyzing step comprises heating the metal oxide/ZIF composite at a temperature of at least about 700° C.

7. The method as claimed in claim 1 wherein the pyrolyzing step comprises heating the metal oxide/ZIF composite at a temperature in the range of about 700° C.-1100° C. for about 1 hour in an Ar gas environment.

8. The catalyst prepared by the method of claim 1.

9. A method of preparing a catalyst, the method comprising the steps of:
   (a) incorporating nanoparticles of a metal oxide into a zeolitic imidazolate frameworks (ZIF) nanocrystal to form a metal oxide/ZIF composite, wherein the metal oxide comprises an oxide of at least one metal that is selected from the group consisting of iron, cobalt, nickel, manganese, and copper;
   (b) then, pyrolyzing the metal oxide/ZIF composite to form an M-N—C catalyst;
   (c) then, mixing a quantity of the M-N—C catalyst with a quantity of $NH_4$Cl; and
   (d) then, pyrolyzing the M-N—C/$NH_4$Cl mixture.

10. The method as claimed in claim 9 wherein the M-N—C is Fe—N—C.

11. The method as claimed in claim 10 wherein the quantities of Fe—N—C catalyst and $NH_4$Cl are mixed together in a mass ratio of $NH_4$Cl to FeNC of up to 10:1.

12. The method as claimed in claim 11 wherein the quantities of Fe—N—C catalyst and $NH_4$Cl are mixed together in a mass ratio of $NH_4$Cl to FeNC of 3:1.

13. The catalyst prepared by the method of claim 12.

14. The catalyst prepared by the method of claim 11.

15. The method as claimed in claim 9 further comprising, after pyrolyzing the M-N—C/$NH_4$Cl mixture, adding carbon species or nitrogen-doped carbon species to the $NH_4$Cl-treated M-N—C catalyst by chemical vapor deposition (CVD).

16. The method as claimed in claim 15 wherein the carbon species or nitrogen-doped carbon species are added as a surface layer having a thickness ranging from a monolayer up to about 1 nm.

17. The method as claimed in claim 15 wherein the M-N—C is Fe—N—C and wherein the quantities of Fe—N—C catalyst and $NH_4$Cl are mixed together in a mass ratio of $NH_4$Cl to FeNC of up to 10:1.

18. The method as claimed in claim 17 wherein the quantities of Fe—N—C catalyst and $NH_4$Cl are mixed together in a mass ratio of $NH_4$Cl to FeNC of 3:1.

19. The catalyst prepared by the method of claim 18.

20. The catalyst prepared by the method of claim 17.

21. The catalyst prepared by the method of claim 15.

22. The catalyst prepared by the method of claim 9.

23. A method of preparing a catalyst, the method comprising the steps of:
   (a) combining (i) nanoparticles of a metal oxide, wherein the metal oxide comprises an oxide of at least one metal that is selected from the group consisting of iron, cobalt, nickel, manganese, and copper, and wherein the nanoparticles are ultrafine nanoparticles having an average size of about 5 nm, (ii) a hydrated zinc salt, and (iii) an imidazole to form a metal oxide/ZIF composite; and (b) then, pyrolyzing the metal oxide/ZIF composite to form an M-N—C catalyst.

24. The method as claimed in claim 23 wherein the metal oxide comprises $Fe_2O_3$.

25. The method as claimed in claim 23 wherein the hydrated zinc salt comprises zinc nitrate hexahydrate.

26. The method as claimed in claim 23 wherein the imidazole comprises 2-methylimidazole.

27. The method as claimed in claim 23 wherein the combining step comprises preparing a first solution and a second solution, the first solution comprising the metal oxide and the hydrated zinc salt in methanol and the second solution comprises the imidazole in methanol, and then mixing the first solution and the second solution.

28. The method as claimed in claim 23 wherein the metal oxide/ZIF composite comprises an $Fe_2O_3$@ZIF-8 composite.

29. The method as claimed in claim 23 wherein the pyrolyzing step comprises heating the metal oxide/ZIF composite at a temperature of at least about 500° C.

30. The method as claimed in claim 23 wherein the pyrolyzing step comprises heating the metal oxide/ZIF composite at a temperature of at least about 700° C.

31. The method as claimed in claim 23 wherein the pyrolyzing step comprises heating the metal oxide/ZIF composite at a temperature in the range of about 700° C.-1100° C. in an Ar gas environment.

32. A method of preparing a catalyst, the method comprising the steps of:
(a) combining (i) nanoparticles of a metal oxide, wherein the metal oxide comprises an oxide of at least one metal that is selected from the group consisting of iron, cobalt, nickel, manganese, and copper, (ii) a hydrated zinc salt, and (iii) an imidazole to form a metal oxide/ZIF composite;
(b) then, pyrolyzing the metal oxide/ZIF composite to form an M-N—C catalyst;
(c) mixing a quantity of the M-N—C catalyst with a quantity of $NH_4Cl$; and
(d) then, pyrolyzing the M-N—C/$NH_4Cl$ mixture.

33. The method as claimed in claim 32 wherein the M-N—C is Fe—N—C.

34. The method as claimed in claim 33 wherein the quantities of Fe—N—C catalyst and $NH_4Cl$ are mixed together in a mass ratio of $NH_4Cl$ to FeNC of up to 10:1.

35. The method as claimed in claim 34 wherein the quantities of Fe—N—C catalyst and $NH_4Cl$ are mixed together in a mass ratio of $NH_4Cl$ to FeNC of 3:1.

36. The catalyst prepared by the method of claim 35.

37. The catalyst prepared by the method of claim 34.

38. The method as claimed in claim 32 further comprising, after pyrolyzing the M-N—C/$NH_4Cl$ mixture, adding carbon species or nitrogen-doped carbon species to the $NH_4Cl$-treated M-N—C catalyst by chemical vapor deposition (CVD).

39. The method as claimed in claim 38 wherein the carbon species or nitrogen-doped carbon species are added as a surface layer having a thickness ranging from a monolayer up to about 1 nm.

40. The method as claimed in claim 39 wherein the M-N—C is Fe—N—C and wherein the quantities of Fe—N—C catalyst and $NH_4Cl$ are mixed together in a mass ratio of $NH_4Cl$ to FeNC of up to 10:1.

41. The method as claimed in claim 40 wherein the quantities of Fe—N—C catalyst and $NH_4Cl$ are mixed together in a mass ratio of $NH_4Cl$ to FeNC of 3:1.

42. The catalyst prepared by the method of claim 41.

43. The catalyst prepared by the method of claim 40.

44. The catalyst prepared by the method of claim 38.

45. The method as claimed in claim 38 wherein the carbon species or nitrogen-doped carbon species are added to the $NH_4Cl$-treated M-N—C catalyst by chemical vapor deposition (CVD) of a ZIF.

46. The method as claimed in claim 45 wherein the carbon species or nitrogen-doped carbon species are added to the $NH_4Cl$-treated M-N—C catalyst by chemical vapor deposition (CVD) of ZIF-8.

47. The catalyst prepared by the method of claim 32.

* * * * *

UNITED STATES PATENT AND TRADEMARK OFFICE
CERTIFICATE OF CORRECTION

PATENT NO. : 11,978,912 B2
APPLICATION NO. : 17/531461
DATED : May 7, 2024
INVENTOR(S) : Gang Wu et al.

Page 1 of 1

It is certified that error appears in the above-identified patent and that said Letters Patent is hereby corrected as shown below:

In the Specification

Column 1, Lines 20-21, "DE-EE0008075, DE-EE0008076, and DE-EE0008417" should read --DE-EE0008075 and DE-EE0008076--.

Signed and Sealed this
Sixteenth Day of July, 2024

Katherine Kelly Vidal
*Director of the United States Patent and Trademark Office*